(12) United States Patent
Tanikawa

(10) Patent No.: US 8,677,419 B2
(45) Date of Patent: Mar. 18, 2014

(54) PROGRAM SEARCH DEVICE

(75) Inventor: Kentaro Tanikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1334 days.

(21) Appl. No.: 11/631,423

(22) PCT Filed: May 31, 2005

(86) PCT No.: PCT/JP2005/009942
§ 371 (c)(1),
(2), (4) Date: Jan. 3, 2007

(87) PCT Pub. No.: WO2006/003766
PCT Pub. Date: Jan. 12, 2006

(65) Prior Publication Data
US 2008/0307461 A1    Dec. 11, 2008

(30) Foreign Application Priority Data
Jul. 5, 2004    (JP) ................................. 2004-198225

(51) Int. Cl.
*G06F 3/00* (2006.01)
*G06F 13/00* (2006.01)
*H04N 5/445* (2011.01)

(52) U.S. Cl.
USPC .................................. 725/53; 725/37; 725/52

(58) Field of Classification Search
USPC .............................................. 725/37, 52–53
See application file for complete search history.

(56) References Cited

U.S. PATENT DOCUMENTS

| | | | |
|---|---|---|---|
| 6,133,909 A * | 10/2000 | Schein et al. | 725/46 |
| 6,581,207 B1 * | 6/2003 | Sumita et al. | 725/46 |
| 6,704,931 B1 | 3/2004 | Schaffer et al. | |
| 6,865,746 B1 * | 3/2005 | Herrington et al. | 725/53 |
| 6,925,650 B1 * | 8/2005 | Arsenault et al. | 725/53 |
| 7,209,942 B1 * | 4/2007 | Hori et al. | 709/203 |
| 8,037,496 B1 * | 10/2011 | Begeja et al. | 725/53 |
| 2002/0087979 A1 * | 7/2002 | Dudkiewicz et al. | 725/34 |
| 2002/0157096 A1 | 10/2002 | Hane et al. | |
| 2002/0162120 A1 * | 10/2002 | Mitchell | 725/32 |
| 2003/0121041 A1 | 6/2003 | Mineyama | |
| 2003/0172382 A1 * | 9/2003 | Kim | 725/53 |

(Continued)

FOREIGN PATENT DOCUMENTS

| | | |
|---|---|---|
| JP | 2000-341593 | 12/2000 |
| JP | 2002-112186 | 4/2002 |

(Continued)

*Primary Examiner* — Pankaj Kumar
*Assistant Examiner* — Randy Flynn
(74) *Attorney, Agent, or Firm* — Wenderoth, Lind & Ponack, L.L.P.

(57) ABSTRACT

A program search device is described that searches for programs using a keyword search and handles the programs found in the search by classifying the programs into special programs and regular programs. The device searches for broadcast programs corresponding to a current time from an electronic program guide, and includes a program guide storing unit that prestores an electronic program guide a keyword storing unit that prestores one or more extraction keywords and corresponding effective periods, a time obtaining unit operable to obtain a current time, a detecting unit operable to read an extraction keyword corresponding to an effective period and detect, from the electronic program guide, one or more program display information sets including the read extraction keyword, and an extracting unit operable to extract each of one or more program display information sets that indicates a regular program, or a special program.

22 Claims, 33 Drawing Sheets

| EFFECTIVE PERIOD | SEARCH KEYWORD |
|---|---|
| UNSPECIFIED | SPECIAL |
| UNSPECIFIED | SP |
| UNSPECIFIED | FEATURING |
| DECEMBER 1 TO DECEMBER 31 | ROUNDUP |
| APRIL 1 TO APRIL 15, JULY 1 TO JULY 15, OCTOBER 1 TO OCTOBER 15, JANUARY 1 TO JANUARY 15 | NEW |
| 2004 | OLYMPIC |
| DECEMBER 1, 2004 TO JANUARY 31, 2005 | YEAR END AND NEW YEAR |
| MARCH 1 TO MAY 31 | SPRING |
| JUNE 1 TO AUGUST 31 | SUMMER |
| SEPTEMBER 1 TO NOVEMBER 30 | AUTUMN |
| DECEMBER 1 TO FEBRUARY 29 | WINTER |

(56) References Cited

U.S. PATENT DOCUMENTS

| | | | |
|---|---|---|---|
| 2003/0200545 A1* | 10/2003 | Nakada | 725/53 |
| 2003/0226144 A1* | 12/2003 | Thurston et al. | 725/39 |
| 2004/0083490 A1* | 4/2004 | Hane | 725/46 |
| 2004/0158861 A1 | 8/2004 | Terakado et al. | |
| 2005/0240957 A1* | 10/2005 | Tsunokawa et al. | 725/45 |
| 2006/0143658 A1* | 6/2006 | Stone | 725/42 |
| 2006/0156326 A1* | 7/2006 | Goronzy et al. | 725/45 |

FOREIGN PATENT DOCUMENTS

| | | |
|---|---|---|
| JP | 2002-142160 | 5/2002 |
| JP | 2002-320159 | 10/2002 |
| JP | 2003-219298 | 7/2003 |
| JP | 2003-526290 | 9/2003 |
| JP | 2003-298542 | 10/2003 |
| JP | 2003-309787 | 10/2003 |
| JP | 2004-128621 | 4/2004 |
| WO | 01/74060 | 10/2001 |

* cited by examiner

FIG. 3

| EFFECTIVE PERIOD | SEARCH KEYWORD |
|---|---|
| UNSPECIFIED | SPECIAL |
| UNSPECIFIED | SP |
| UNSPECIFIED | FEATURING |
| DECEMBER 1 TO DECEMBER 31 | ROUNDUP |
| APRIL 1 TO APRIL 15, JULY 1 TO JULY 15, OCTOBER 1 TO OCTOBER 15, JANUARY 1 TO JANUARY 15 | NEW |
| 2004 | OLYMPIC |
| DECEMBER 1, 2004 TO JANUARY 31, 2005 | YEAR END AND NEW YEAR |
| MARCH 1 TO MAY 31 | SPRING |
| JUNE 1 TO AUGUST 31 | SUMMER |
| SEPTEMBER 1 TO NOVEMBER 30 | AUTUMN |
| DECEMBER 1 TO FEBRUARY 29 | WINTER |

| T140 |
| --- |
| RECORDING-SCHEDULED PROGRAM NAME |
| COMEDY SPECIAL |
| PROFESSIONAL BASEBALL ROUNDUP |
|  |
|  |
| ⋮ |

FIG. 6

| PREFERENCE KEYWORD | WEIGHT |
|---|---|
| BASEBALL | 50 |
| DRAMA | 40 |
| VARIETY | 60 |
| SPORTS | 80 |
| NEWS | 80 |
| SOCCER | 50 |
| YU SHIBASAKI | 100 |
| TAKUZO KIMURA | 90 |
|  |  |
| ⋮ | ⋮ |

| PROGRAM | START TIME | END TIME | CH NUMBER | FIRST EMPHASIS CONDITION | | SECOND EMPHASIS CONDITION | | THIRD EMPHASIS CONDITION | | EXCLUSION FLAG | RECOMMENDATION RATE |
|---|---|---|---|---|---|---|---|---|---|---|---|
| | | | | FIRST FLAG | FIRST CHARACTER STRING | SECOND FLAG | SECOND CHARACTER STRING | THIRD FLAG | THIRD CHARACTER STRING | | |
| "NEW" YELLOW DAYS | 2004/4/2 21:00 | 2004/4/2 21:54 | 4 | 1 | NEW | 1 | NEW | 0 | | 0 | 140 |
| OLYMPIC FEATURING ○○ | 2004/4/2 19:00 | 2004/4/2 21:15 | 10 | 0 | | 1 | OLYMPIC, FEATURING | 1 | OLYMPIC FEATURING ○○ | 0 | 80 |
| MHK SPECIAL | 2004/4/3 21:00 | 2004/4/3 21:50 | 2 | 0 | | 0 | | 0 | | 1 | |
| MHK SPECIAL | 2004/4/4 21:00 | 2004/4/4 21:50 | 2 | 0 | | 0 | | 0 | | 1 | |
| BROADCAST STATION SP | 2004/4/5 21:54 | 2004/4/5 23:10 | 6 | 0 | | 1 | SP | 1 | BROADCAST STATION SP | 0 | 180 |
| ... | | | | | | | | | | | |
| "REPEAT" COMMEDY SPECIAL | 2004/4/8 19:00 | 2004/4/8 20:54 | 6 | 0 | | 0 | | 0 | | 1 | |
| SPRING SPECIAL DRAMA | 2004/4/8 20:00 | 2004/4/8 20:54 | 8 | 0 | | 1 | SPRING | 0 | | 0 | 75 |
| ... | | | | | | | | | | | |

FIG. 8

| TARGET RANGE | CHARACTER COLOR | BACKGROUND COLOR |
|---|---|---|
| 0~100 | BLUE | WHITE |
| 100~200 | YELLOW | GRAY |
| ⋮ | ⋮ | ⋮ |
| 900~1000 | RED | BLACK |
| MORE THAN 1000 | YELLOW | BLACK |

| NUMBER | PROGRAM | START TIME | END TIME | CH NUMBER |
|---|---|---|---|---|
| 1 | BROADCAST STATION *SP* | 2004/4/5 21:54 | 2004/4/5 23:10 | 6 |
| 2 | *NEW* YELLOW DAYS | 2004/4/2 21:00 | 2004/4/2 21:54 | 4 |
| 3 | *OLYMPIC FEATURING* ◯◯ | 2004/4/2 19:00 | 2004/4/2 21:15 | 10 |
| 4 | *SPRING* SPECIAL DRAMA | 2004/4/8 20:00 | 2004/4/8 20:54 | 8 |
| 5 | ... | ... | ... | ... |

T191 — TARGET DATE: SATURDAY, APRIL 2, 2004

T192

| | 2CH | 4CH | 6CH | 8CH | 10CH | |
|---|---|---|---|---|---|---|
| 19 | ... | ... | ... | ... | ... | |
| 20 | ... | ... | ... | ... | ... | |
| 21 | ... | 1 "NEW" YELLOW DAYS | ... | ... | 2 | ... |
| 22 | ... | ... | ... | ... | OLYMPIC FEATURING ○○ | ... |
| | | | | | | |

| NUMBER | PROGRAM | START TIME | END TIME | CH NUMBER |
|---|---|---|---|---|
| 1 | BROADCAST STATION *SP* | 2004/4/5 21:54 | 2004/4/5 23:10 | 6 |
| 2 | SPRING *"NEW" YELLOW DAYS* | 2004/4/2 21:00 | 2004/4/2 21:54 | 4 |
| 3 | *OLYMPIC FEATURING* ○○ | 2004/4/2 19:00 | 2004/4/2 21:15 | 10 |
| 4 | SPRING *SPRING SPECIAL DRAMA* | 2004/4/8 20:00 | 2004/4/8 20:54 | 8 |
| 5 | | ... | ... | ... |

| NUMBER | PROGRAM | START TIME | END TIME | CH NUMBER |
|---|---|---|---|---|
| 1 | ... | ... | ... | ... |
| 2 | SUMMER  *SUMMER* HOLIDAY ANIMATION | 2004/8/1 10:00 | 2004/8/1 10:54 | 4 |
|  | ... | ... | ... | ... |

| NUMBER | PROGRAM | START TIME | END TIME | CH NUMBER |
|---|---|---|---|---|
| 1 | ... | ... | ... | ... |
| 2 | AUTUMN  *AUTUMN* SPECIAL DRAMA | 2004/10/1 20:00 | 2004/10/1 20:54 | 10 |
|  | ... | ... | ... | ... |

| NUMBER | PROGRAM | START TIME | END TIME | CH NUMBER |
|---|---|---|---|---|
| 1 | ... | ... | ... | ... |
| 2 | WINTER  *WINTER* SPECIAL DRAMA | 2004/12/10 20:00 | 2004/12/10 20:54 | 10 |
|  | ... | ... | ... | ... |

T187b

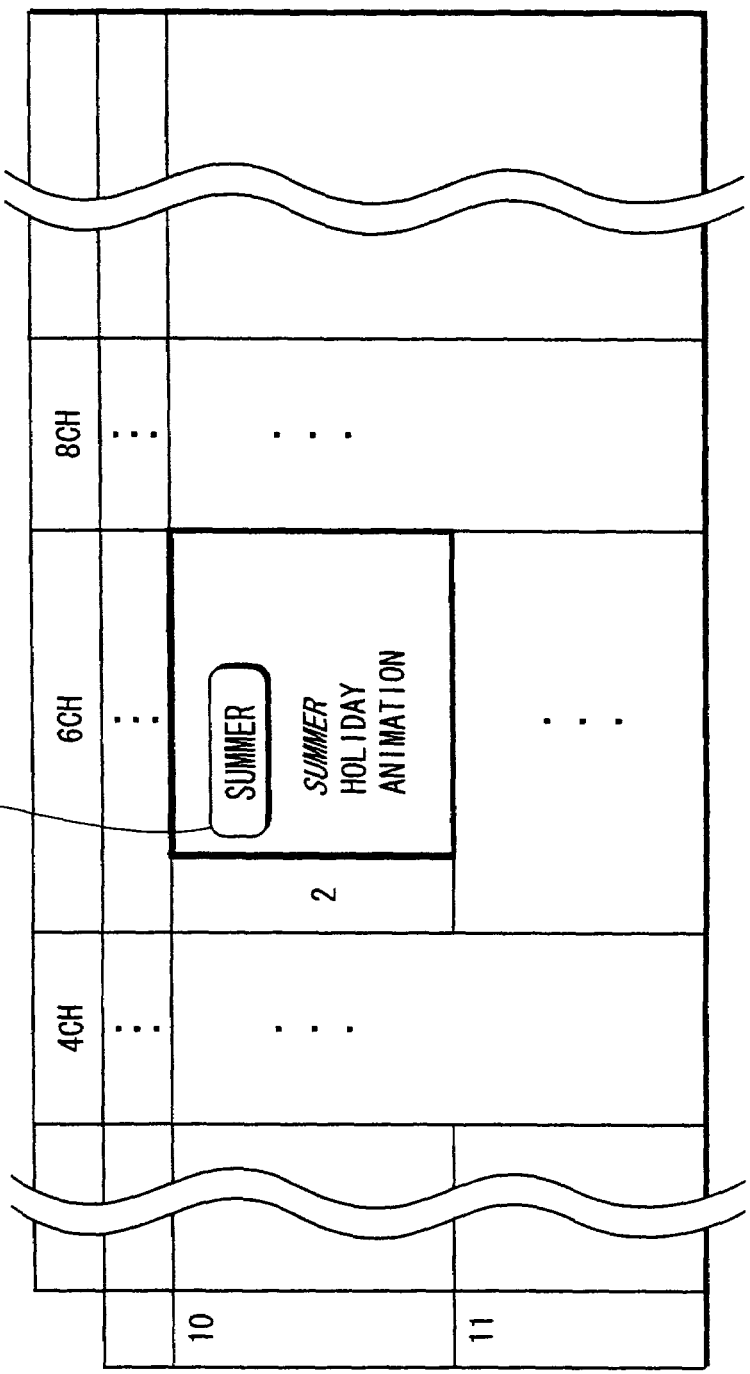

| NUMBER | PROGRAM | START TIME | END TIME | CH NUMBER |
|---|---|---|---|---|
| 1 | BROADCAST STATION SP | 2004/4/5 21:54 | 2004/4/5 23:10 | 6 |
| 2 | *NEW* YELLOW DAYS | 2004/4/2 21:00 | 2004/4/2 21:54 | 4 |
| 3 | *OLYMPIC FEATURING* ○○ | 2004/4/2 19:00 | 2004/4/2 21:15 | 10 |
| 4 | *SPRING* SPECIAL DRAMA | 2004/4/8 20:00 | 2004/4/8 20:54 | 8 |
| 5 | ... | ... | ... | ... |
| n-1 | MHK SPECIAL | 2004/4/2 21:00 | 2004/4/2 21:50 | 2 |
| n | MHK SPECIAL | 2004/4/3 21:00 | 2004/4/3 21:50 | 2 |
| m | BROADCAST STATION SP | 2004/4/8 20:00 | 2004/4/8 20:54 | 8 |

FIG. 30

TARGET DATE: SATURDAY, APRIL 2, 2004 — T221

T220

T222

| | 2CH | 4CH | 6CH | 8CH | 10CH |
|---|---|---|---|---|---|
| | ... | ... | ... | ... | ... |
| 19 | | | | | |
| 20 | ... | ... | ... | ... | ... |
| 21 | n<br>MHK SPECIAL | 1<br>"NEW" YELLOW DAYS | | | 2<br>OLYMPIC FEATURING ○○ |
| 22 | ... | ... | | | ... |

FIG. 32

| COUNTRY ID | CH NUMBER | TIME PERIOD |
|---|---|---|
| 1 | 2 | 12 : 00 ~ 16 : 00 |
| 1 | 3 | 12 : 00 ~ 16 : 00 |
| 1 | 5 | 12 : 00 ~ 16 : 00 |
| ⋮ | ⋮ | ⋮ |
| 2 | 30 | 13 : 00 ~ 16 : 00 |
| ⋮ | ⋮ | ⋮ |

T300

PROGRAM SEARCH DEVICE

TECHNICAL FIELD

The present invention relates to a technique for searching for and extracting information indicating a broadcast program from an electronic program guide.

BACKGROUND ART

A keyword search has been used as a conventional search technique. The keyword search is very useful for searching for data from a database.

Usually, when performing a search from a database, the user uses a general keyword to obtain desired data.

Such a technique is used for searching for a TV program from an electronic program guide.

DISCLOSURE OF THE INVENTION

Problem to be Solved by Present Invention

However, using the conventional keyword search technique to search for a TV program, it is not always possible to realize a precise search.

This is because, in many cases, even though TV programs have a common keyword, they might have different values for a user.

A special program and a program broadcast regularly (a regular program) are examples of such TV programs. Specifically, when the user searches for programs including a keyword "NEWS", the both of the following two programs might be found: a program named "BIGGEST NEWS" (an example of the special program), which is a roundup summarizing big news of the past year; and a program named "12 O'CLOCK NEWS" (an example of a regular program), which is broadcast at a scheduled time.

In such a case, if the user is interested only in special programs, the search result including the regular program having the same keyword is redundant. Also, even if the user wishes to conduct a broad search for programs having the keyword, the strength of desire to view the program is different between the special program and the regular program.

In view of this problem, the object of the present invention is to provide a program search device, a search method and a search program for searching for programs by using the keyword search, and managing a special program and a regular program found by the search in different manners.

Means for Solving the Problem

To achieve the above-described object, the present invention provides a program search device that searches for broadcast programs corresponding to a current time from an electronic program guide, comprising: a program guide storing unit that prestores an electronic program guide including one or more program display information sets each indicating a broadcast program; a keyword storing unit that prestores one or more extraction keywords and effective periods respectively corresponding thereto; a time obtaining unit operable to obtain a current time; a detecting unit operable to read an extraction keyword corresponding to an effective period including the obtained current time from the keyword storing unit, and detect, from the electronic program guide, one or more program display information sets including the read extraction keyword; and an extracting unit operable to extract, from among the detected one or more program display information sets, each of one or more program display information sets that indicates a regular program, as a regular program display information set, and each of one or more program display information sets that indicates an irregular program, as a special program display information set.

Advantageous Effect of the Present Invention

With the stated structure, the program search device reads the extraction keyword corresponding to the effective period including the current time from the keyword storing unit, detects the one or more program display information sets using the read extraction keywords, and extracts the regular program display information set and the special program display information set from the detected one or more program display information sets. As a result, the program search device can handle the special program and the regular program separately. The demand for handling the regular programs and the special programs separately is especially strong as to a particular period. Therefore, using the extraction keywords having the effective period, it becomes possible to perform more precise extraction.

The program search device may further comprise an excluding unit operable to exclude the regular program display information set extracted by the extracting unit.

With the stated structure, the program search device excludes the extracted regular program display information set. Therefore, the program search device can obtain only the one or more special program display information sets.

The regular program indicated by the regular program display information set may be broadcast in cycles, the electronic program guide may include one or more program display information sets each indicating a program broadcast in the cycles, the regular program display information set may be a program display information set of a program redundantly broadcast in the cycles, and the extracting unit may search for redundant program display information sets from the one or more program display information sets detected by the detecting unit, and define each of the redundant program display information sets found by the search as the regular program display information set.

With the stated structure, the program search device can obtain, from one or more program display information sets detected from the electronic program guide including the one or more program display information sets indicating programs broadcast in the cycles, identical program display information sets and define them as the regular program display information sets. As a result, the program search device can extract the special program display information sets from the electronic program guide including the program display information sets indicating the programs broadcast in the cycles, because the regular programs are broadcast in the cycles plural times, and the program display information sets indicating such regular programs are extracted plural times. The program search device extracts the plurality of the program display information sets as the regular program display information sets.

The regular program indicated by the regular program display information set may be broadcast in cycles, the electronic program guide may include one or more program display information sets each indicating a program broadcast in each of the cycles, the extracting unit may include a regular program name storing subunit that prestores a regular program name indicating the regular program; and a regular program obtaining subunit operable to search for a program display information set indicating a program that is broadcast in each cycle and indicated by the regular program name from the one or more program display information sets detected by the detecting unit, and obtain the program display information set found by the search as the regular program display information set.

With the stated structure, the program search device can extract the regular program display information set using the regular program names. As a result, the program search device can extract the special program display information set from the electronic program guide including the one or more program display information sets indicating programs broadcast in the one cycle, because the regular programs are broadcast once in the one cycle, and the program display information sets indicating such regular programs are extracted once. Using the regular program name, the program search device can extract the program display information sets indicating the program information sets as the regular program display information sets.

The program search device may further comprise a program name storing unit that prestores a recording-scheduled program name as to which recording has been scheduled by a user, wherein the extracting unit may further search for a program display information set indicated by the recording-scheduled program name stored in the program name storing unit from the one or more program display information sets detected by the detecting unit, and obtain the program display information set found by the search as a recording-scheduled program display information set, and the excluding unit may further exclude the program display information representing a program indicated by the recording-scheduled program display information set obtained by the extracting unit.

With the stated structure, the program search device can obtain the recording-scheduled program display information sets from the one or more program display information sets detected by the detecting unit, using the recording-scheduled program names, and exclude the obtained recording-scheduled program display information sets. As a result, the program search device can exclude the program display information sets indicating the recording-scheduled programs.

Among the extracted one or more program display information sets, the extracting unit may define a program display information set indicating a regular program as the regular program display information set, and defines the other one or more of the one or more program display information sets as the special program display information sets, and the program search device may further comprise a displaying unit operable to display the one or more special program display information sets and the regular program display information set in different display modes.

With the stated structure, the program search device displays the special program display information sets and the regular program display information sets in the different display modes. Therefore, the user can visually distinguish the special program display information sets and the regular program display information sets.

The displaying unit may prestore a character color and a background color used for displaying the special program display information sets, and the displaying unit may display the special program display information sets based on the character color and the background color.

With the stated structure, the program search device displays the one or more special program display information sets based on the character color and the background color stored therein. Therefore, the user can visually distinguish the special program display information sets and the regular program display information sets based on the character color and the background color.

The displaying unit may prestore image information sets corresponding to the effective periods respectively, and the displaying unit may obtain dates relating to displaying, determine effective periods respectively corresponding to the obtained dates, obtains image information sets respectively corresponding to the determined effective periods, and display the special program display information sets in correspondence with the obtained image information sets.

With the stated structure, the program search device displays each special program display information set and the stored image information set in association with the each other. Therefore, the user can visually distinguish the special program display information sets and the regular program display information sets based on whether the program display information set is displayed in association with the image information set.

The displaying unit may prestore a character color and a background color used for displaying the regular program display information set, and the displaying unit may display the regular display information set based on the character color and the background color.

With the stated structure, the program search device displays the regular program display information sets based on the character color and the background color stored therein. Therefore, the user can visually distinguish the special program display information sets and the regular program display information sets based on the character color and the background color.

The displaying unit may obtain a broadcast frequency of a program represented by the regular program display information set, and display the regular program display information set and the broadcast frequency in association with each other.

With the stated structure, the program search device displays the broadcast frequency of the program represented by the regular program display information set in association with the regular program display information set. Therefore, the user can know the broadcast frequency of the program represented by the regular program display information set.

The program search device may further comprising: a sort key storing unit that prestores a sort key for sorting the regular program display information set and the one or more special program display information sets; and a result generating unit operable to sort the regular program display information set and the one or more special program display information sets based on the sort key, and generate a result information set including the sorted regular program display information set or each of the sorted one or more special program display information sets and a number representing an order, for each of the regular program display information set and the one or more special program display information sets, and the displaying unit may display, based on the generated result information set, the one or more special program display information sets and the regular program display information set in the different display modes.

With the stated structure, the program search device sorts the extracted program display information sets, generates the result information sets, and display the special program display information sets and the regular program display information sets in the different display modes, based on the generated result information set. Therefore, the user can visually distinguish the special program display information sets and the regular program display information sets.

The result generating unit may generate the result information set such that each of the sorted special program display information sets or the regular program display information and the number forms a row in a table.

With the stated structure, the program search device generates the result information set such that each of the sorted special program display information sets and the regular program display information and the number forms a row. Therefore, the user can visually distinguish the special program display information sets and the regular program display information sets, and know the order of each of the special program display information sets and the regular program display information set.

The result generating unit may generate the result information set such that each of the sorted special program display information sets or the regular program display information and the number in association with a two-dimensional table consisting of a first axis indicating channel numbers of broadcast programs and a second axis indicating times and orthogonal to the first axis.

With the stated structure, the program search device generates the extraction result table such that the sorted program display information sets and the order are displayed in the two-dimensional table. Therefore, the user can visually distinguish the special program information sets and the regular program information sets, and know the order of each of the special program display information sets and the regular program display information set.

Each special program display information set may include a character string indicating a program name of a broadcast program, the program search device may further comprise: an emphasis condition storing unit that prestores an emphasis character string to be displayed with emphasis and a character type of the emphasis character string in association with each other; and a character string obtaining unit operable to search for a special program display information set including the emphasis character string, and only if the special program display information set including the emphasis character string is found by the search, obtain a character string to be emphasized that is the same as the emphasis character string from the special program display information set found by the search, and the displaying unit sets the character type corresponding to the emphasis character string for the character string to be emphasized obtained by the character string obtaining unit, and displays the character string to be emphasized in the character type.

With the stated structure, the program search device can emphasize the character string to be emphasized found by the search, using the emphasis character string. Therefore, the user can distinguish the special program display information sets based on the emphasis.

The keyword storing unit may prestore a plurality of extraction keywords and the effective periods respectively corresponding thereto, among the plurality of extraction keywords, the emphasis character string is an emphasis keyword whose start time of the effective period differs from the current time obtained by the time obtaining unit by a predetermined period or a period shorter than the predetermined period, and the character string obtaining unit may search for a special program display information set including the emphasis keyword, and only if the special program display information set including the emphasis keyword is found by the search, define the emphasis keyword included in the obtained special program display information set as the character string to be emphasized.

With the stated structure, the program search device defines, among the extraction keywords, the emphasis keyword whose start time of the effective period differs from the current time obtained by the time obtaining unit by a predetermined period or a period shorter than the predetermined period, as the emphasis character string. Therefore, the user can distinguish the special program display information sets based on the emphasis keyword.

The keyword storing unit may prestore a plurality of extraction keywords and the effective periods respectively corresponding thereto, among the plurality of extraction keywords, the emphasis character string may be an effective keyword whose effective period includes the current time obtained by the time obtaining unit, and the character string obtaining unit may search for a special program display information set including the effective keyword, and only if the special program display information set including the effective keyword is found by the search, define the effective keyword included in the obtained special program display information set as the character string to be emphasized.

With the stated structure, the program search device defines, among the extraction keywords, the effective keyword whose effective period includes the current time obtained by the time obtaining unit, as the emphasis character string. Therefore, the user can distinguish the special program display information sets based on the effective keyword.

The program search device may further comprise a recommendation rate obtaining unit operable to obtain a recommendation rate for each of the regular program display information set and the one or more special program display information sets, wherein the sort key may be the recommendation rate, and the result generating unit may sort the regular program display information set and the one or more special program display information sets based on the recommendation rate.

With the stated structure, the program search device sorts each of the special program display information sets and the regular program display information set to be displayed based on the recommendation rate. Therefore, the user can know the order of the recommendation rates respectively corresponding to the programs represented by the one or more special program information sets and the program represented by the regular program display information set at sight.

The electronic program guide may further include attachment information sets corresponding to the program display information sets respectively, and the recommendation rate obtaining unit may include a preference information storing subunit that prestores a preference information set including a preference keyword indicating the user's preference and a preference value indicating a weight on the preference keyword, a keyword detecting subunit operable to detect a character string including the preference keyword, based on the regular program display information set and the one or more special program display information sets and the attachment information sets respectively corresponding to the regular program display information set and the one or more special program display information sets, and a calculating subunit operable to calculate and obtain the recommendation rate based on the preference value corresponding to the preference keyword included in the character string detected by the keyword detecting unit.

With the stated structure, the program search device calculates the recommendation rate using the preference keyword. Therefore, the user can know the order of the recommendation rates in accordance with the preference of the user.

The search result generating unit may further prestore a character color and a background color corresponding to each recommendation rate, the search result generating unit may set the character color and the background color corresponding to each recommendation rate as the character color and the background color used for displaying the special program display information sets, and generate the result information sets each including each of the sorted special program display information sets and the number representing the order such that the special program display information sets are displayed using the set character color and the set background color.

With the stated structure, the program search device sets the character color and the background color in accordance with the recommendation values of the special program display information sets. Therefore, the user can know the recommendation rate of the special program at sight by the displayed color.

The program search device may be connected with a terminal device via a network, the displaying unit may display the one or more special program display information sets and the regular program display information set by outputting a display information set to the terminal device, the display information set may be used for displaying the one or more special program information sets and the regular program display information set in the different display modes.

With the stated structure, the program search device displays the special program display information sets and the regular program display information sets in different display modes by outputting the display information sets to the terminal device. Therefore, the user can visually distinguish the special program display information sets and the regular program display information sets.

The program display information set may further include a new-program information set indicating that a program indicated by the program display information set is a new program, and if the extraction keyword is included in the new-program information set, the extracting unit may define the program display information set including the new-program information set as the special program display information set.

With the stated structure, the program display information set indicating a new program can be defined as the special program display information set. Therefore, the user can distinguish the special program display information set representing the new program and the regular program display information set.

BRIEF DESCRIPTION OF THE DRAWINGS

FIG. 3 shows a data structure of a keyword managing table T100 stored in a keyword storing unit 102;

FIG. 5 shows a data structure of a history managing table T140 stored in a recording history storing unit 104;

FIG. 6 shows a data structure of a user profile T150 stored in a user profile storing unit 105;

FIG. 7 shows a data structure of a search result table T160 stored in a search result storing unit 106;

FIG. 8 shows a data structure of a color managing table T170 stored in a display color managing unit 107;

FIG. 9 shows an example of a list T180;

FIG. 10 shows an example of a TV guide T190;

FIG. 20 is a block diagram showing a structure of a program search device 100a;

FIG. 22 shows an example of a list T180b into which an icon is added;

FIG. 24A shows an example of a list T185b into which an icon indicating "Summer" is added, FIG. 24B is an example of a list T186b into which an icon indicating "Autumn" is added, and FIG. 24C is an example of a list T187b into which an icon indicating "Winter" is added;

FIG. 25 shows an example of a TV guide T195b into which an icon indicating "Summer" is added;

FIG. 29 shows an example of a list T210;

FIG. 30 shows an example of a TV guide T220;

FIG. 32 shows a data structure of a broadcast prohibition period table T300 stored in a search control unit 111d.

EXPLANATION OF REFERENCES

100 PROGRAM SEARCH DEVICE
101 EPG STORING UNIT
102 KEYWORD STORING UNIT
103 CONDITION STORING UNIT
104 RECORDING HISTORY STORING UNIT
105 USER PROFILE STORING UNIT
106 SEARCH RESULT STORING UNIT
107 DISPLAY COLOR MANAGING UNIT
108 RECEIVING UNIT
109 EPG REGISTRATION UNIT
110 CLOCK UNIT
111 SEARCH CONTROL UNIT
112 DISPLAY CONTROL UNIT
113 INSTRUCTION RECEIVING UNIT
114 INFORMATION REGISTRATION UNIT
115 PROCESSING UNIT
116 OUTPUT UNIT
117 INPUT/OUTPUT UNIT
200 EMPHASIS CONDITION STORING UNIT
201 EXCLUSION CONDITION STORING UNIT
202 SORT CONDITION STORING UNIT

BEST MODE FOR CARRYING OUT THE INVENTION

The following describes a program search device 100 as an embodiment of the present invention.

1. Overview of Program Search Device 100

Figure 1:
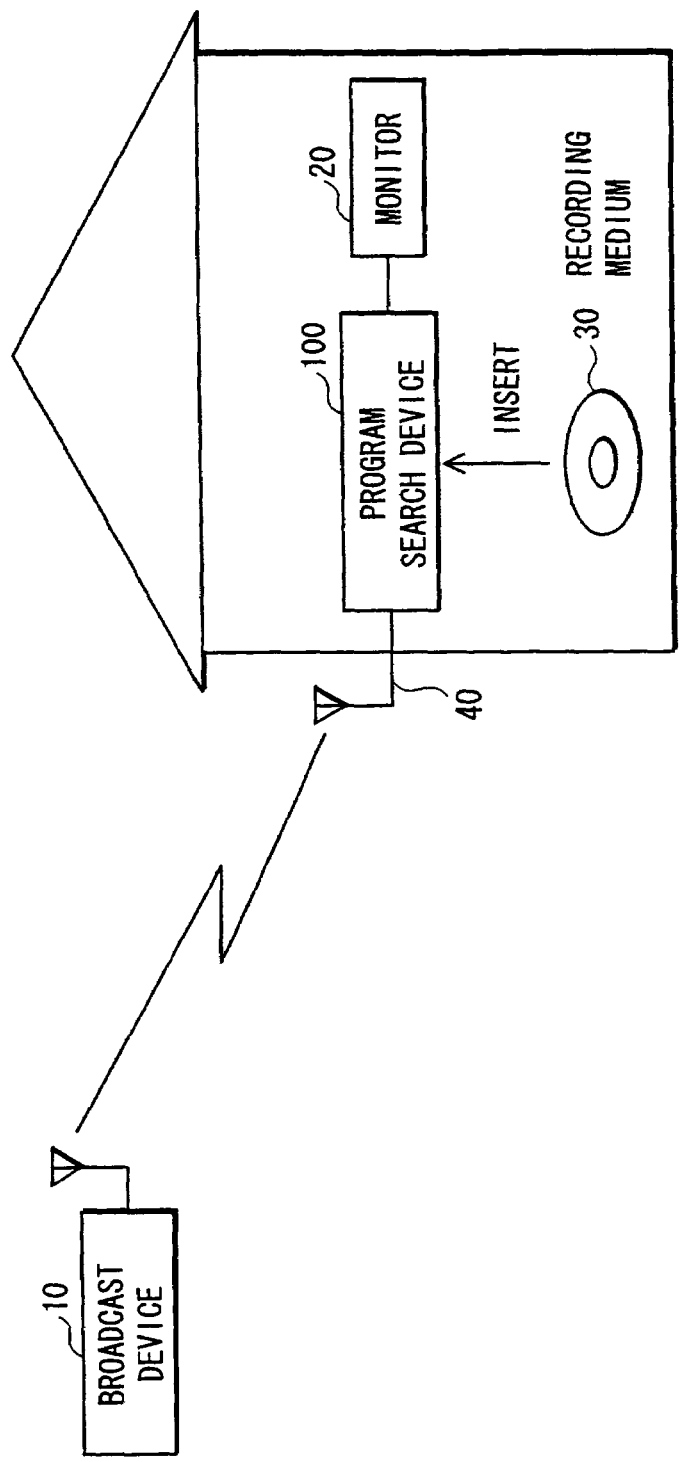
FIG. 1 shows a usage pattern of a program search device 100.

FIG. 1 shows a usage pattern of a program search device 100 according to the present invention.

A broadcast device 10 transmits contents of broadcast programs (hereinafter called the "program contents"), and also regularly transmits an Electronic Program Guide (hereinafter called the "EPG") including program information sets respectively corresponding to the program contents to be broadcast within two weeks from the transmission date. Here, each program information set includes a program display information set, a start time and an end time of the program, a broadcast channel number of the program, detail information set showing the details of the program, a genre of the program, and so on.

The program display information set includes a program name of the program content, or the program name of the program content and type information set. The type information set indicates whether the program content corresponding thereto is a new program or a repeat program.

If the program content is a new program, the type information set is consisted of a character string "NEW". If the program content is a repeat program, the type information set is consisted of a character string "REPEAT". For example, if a program content whose program name is "AAA" is a new program, the program display information set consists of a character string "NEW AAA", and if a program content whose program name is "AAA" is a repeat program, the program display information set consists of a character string "REPEAT AAA". In the other cases, the program display information set consists of a character string "AAA". In other words, the program display information set includes at least the program name.

The detail information set includes information about performers of the corresponding program, an explanation (e.g. a summary) of the corresponding program, and so on. The genre indicates the type of the corresponding program. For example, if the genre is "DRAMA", the program is a drama. If the genre is "SPORT", the program is a sport. If the genre is "VARIETY SHOW" the program is a variety show.

The program search device 100 is, for example, a DVD recorder to which a recording medium 30 is attachable. In the same manner as the conventional technique, the program search device 100 receives program contents broadcast by a broadcast device 10 and outputs the received program contents to a monitor 20. Also, the program search device 100 records the program contents on the recording medium 30 as scheduled, or records the contents on the recording medium 30, according to an instruction by the user, and plays back the contents recorded on the recording medium 30. The recording medium 30 is, for example, a DVD-RAM or a DVD-R.

The program search device 100 further receives an EPG of two weeks worth, of programming and searches for the program display information set (specific program display information set) of a specific program content, using the received EPG and a search keyword prestored therein. The program search device 100 displays the result of the search performed in accordance with the user's instruction, using the monitor 20. Also, the program search device 100 registers recording schedule as instructed by the user, using the search result displayed on the monitor 20. The program search device 100 may be a HDD-equipped DVD recorder, a HDD recorder, or the like. The specific program content is the special program content or the new program content.

The monitor 20 is connected with the program search device 100, and outputs images and sounds received from the program search device 100.

2. Structure of Program Search Device 100

The following describes the structure of the program search device 100.

Figure 2:
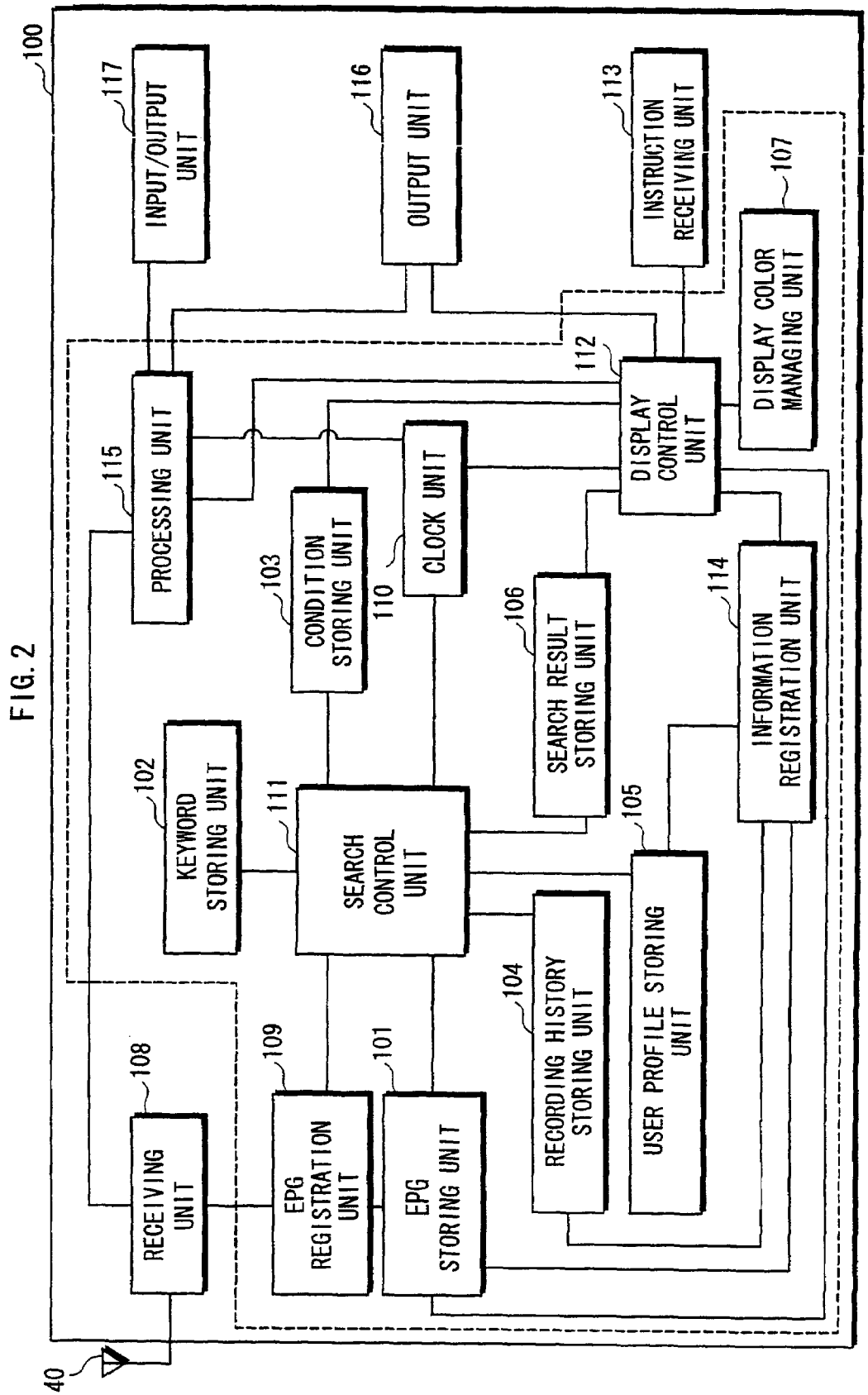
FIG. 2 is a block diagram showing a structure of a program search device 100.

As FIG. 2 shows, the program search device 100 includes an EPG storing unit 101, a keyword storing unit 102, a condition storing unit 103, a recording history storing unit 104, a user profile storing unit 105, a search result storing unit 106, a display color managing unit 107, a receiving unit 108, an EPG registration unit 109, a clock unit 110, a search control unit 111, a display control unit 112, an instruction receiving unit 113, an information registration unit 114, a processing unit 115, an output unit 116 and an input/output unit 117.

The program search device 100 is, specifically, a computer system structured from a microprocessor, a ROM, a RAM, a hard disk unit and so on. A computer program is stored in the ROM or the hard disk unit. The functions of the program search device 100 are realized by the microprocessor operating in accordance with the computer program.

(1) EPG Storing Unit 101

The EPG storing unit 101 includes an area for storing the EPG consisting of program contents for two weeks received from a broadcast station.

Note that nothing is stored in the EPG storing unit 101 until the program search device 100 receives the EPG for the first time.

(2) Keyword Storing Unit 102

The keyword storing unit 102 stores search keywords for searching for the specific program display information set.

The keyword storing unit 102 stores a keyword managing table T100 as shown in FIG. 3 an example.

The keyword managing table T100 prestores one or more pairs of an effective period and a search keyword.

The effective period represents a period within which the keyword is effective. If the effective period is "unspecified", the search keyword corresponding to this effective period is always available. If the effective period is a period represented by month and day, the keyword is available only if the month and day of the search target is within the effective period. If the effective period is a period represented by year, month and day, the keyword is available only if the year, month and day of the search target is within the effective period. If the effective period is represented only by year, the keyword is available only if the year of the search target is the same as the year indicated by the effective period.

The search keyword is a keyword used by the program search device 100 for searching for the specific program display information set from the EPG.

(3) Condition Storing Unit 103

Figure 4:
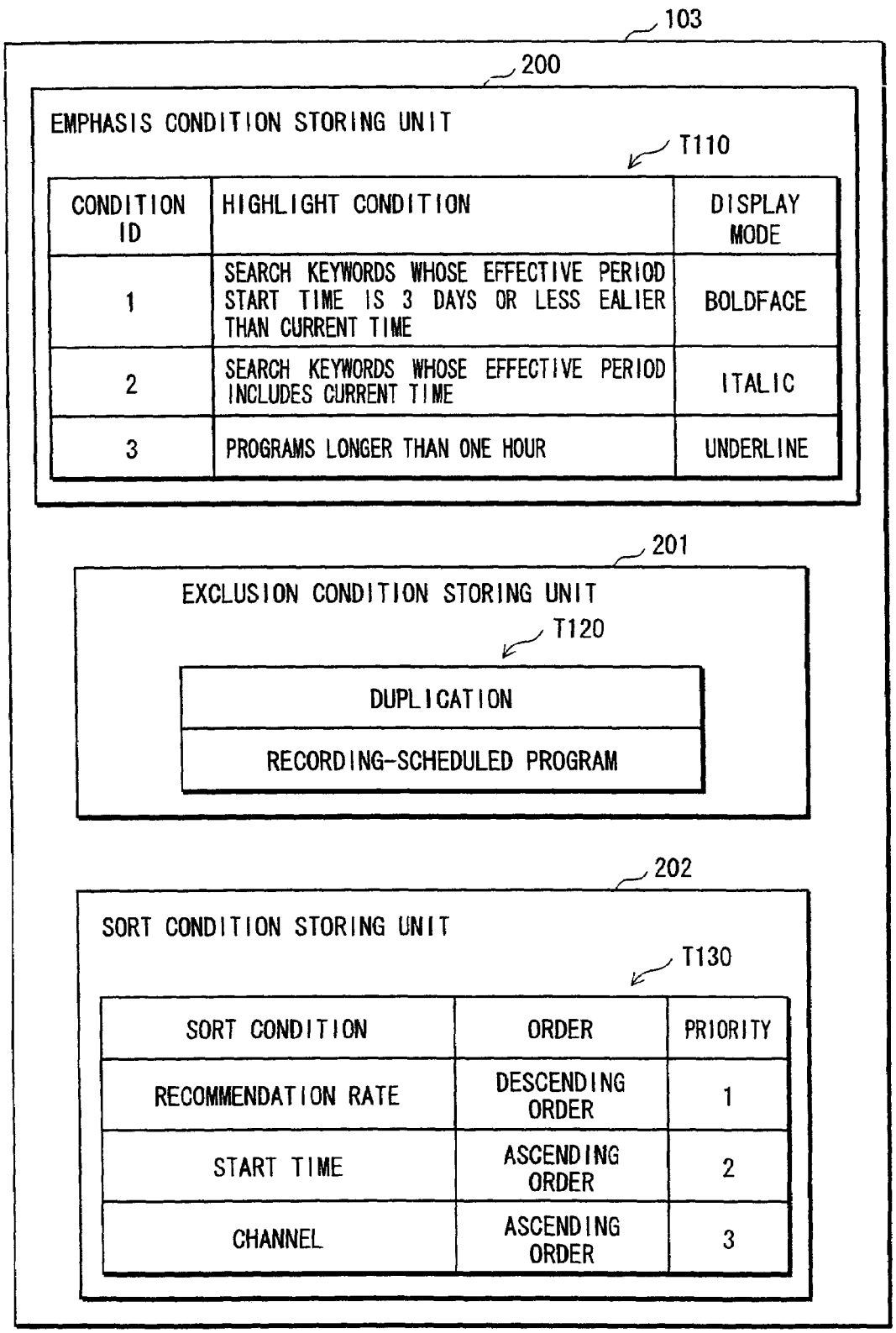
FIG. 4 is a functional block diagram showing a structure of a condition storing unit 103.

As FIG. 4 shows, the condition storing unit 103 includes an emphasis condition storing unit 200, an exclusion condition storing unit 201 and a sort condition storing unit 202.

Emphasis Condition Storing Unit 200

The emphasis condition storing unit 200 includes an emphasis condition table T110 as shown in FIG. 4 as an example.

The emphasis condition table T110 prestores one or more groups each including a condition ID, an emphasis condition, and a display mode. Note that although three groups each including the condition ID, the emphasis condition, and the display mode are prestored in the emphasis condition storing unit 200 in this embodiment, the present invention is not limited to this as long as the number of the groups is one or more.

The condition ID is an identifier identifying the emphasis condition.

The emphasis condition represents a condition for extracting one or more character strings to be emphasized when the search result is displayed. If the emphasis condition indicates "search keywords whose effective period start time is 3 days or less earlier than current time", the condition is that the character string to be extracted is, among search keywords used for the search, a search keyword has an effective period whose start date is not older than three days old with respect to the time when the search is performed. Here, "three days" is just an example, and any other lengths of time may be used. In this example, if the date when the search is performed is April 2, a keyword "NEW", whose effective period start date is April 1, is not older than three days old. Therefore, the condition for extracting character strings to be extracted is that the character string includes a search keyword "NEW".

If the emphasis condition is "search keywords whose effective period includes current time", the condition is that the character strings to be extracted is a search keyword as to which the time when the search is performed is within the effective period thereof, that is, the search keyword used in the search. If the emphasis condition is "programs longer than one hour", the condition is that the character strings to be extracted are a program display information set of a program whose broadcast time is more than one hour. Here, "one hour" is just an example, and any other lengths of time may be used. Note that program content that is longer than one hour is called a "long program" in this embodiment.

The display mode indicates a mode for displaying the character string to be emphasized. If the display mode is "boldface", the character string to be emphasized is displayed in boldface type. If the display mode is "italic", the character string to be emphasized is displayed in italic type. If the display mode is "underline", the character string to be emphasized is displayed with underlined.

Exclusion Condition Storing Unit 201

The exclusion condition storing unit 201 stores an exclusion condition table T120 as shown in FIG. 4 as an example.

The exclusion condition table T120 prestores one or more conditions for excluding, from the search result, programs not to be displayed. Note that although the exclusion condition table T120 in this embodiment prestores two exclusion conditions, the number of the exclusion conditions is not limited to this as long as a condition "duplication" is included in the exclusion condition table T120.

If the exclusion condition is "duplication", duplicate program display information sets are excluded from targets of displaying. As a result, it becomes possible to exclude the program display information set of regular programs from the program display information sets found by the search. If the exclusion condition is "recording-scheduled program", program names that are the same as the program name of the program that has been scheduled to be recorded by preprogramming are to be excluded from the targets of displaying. As a result, it becomes possible to exclude, from the targets of displaying, the program display information set that includes a program name indicating a program that has been scheduled to be recorded by preprogramming before.

Note that the program name of a program content that is regularly broadcast is hereinafter called "the regular program name".

Sort Condition Storing Unit 202

The sort condition storing unit 202 stores a sort condition table T130 as shown in FIG. 4 as an example.

The sort condition table T130 prestores one or more groups of a sort condition, an order, and a priority. Note that although the number of sort conditions in this embodiment is three, the number is not limited to this as long as it is one or more.

The sort condition indicates a condition for sorting the search results to be displayed. The order indicates the order of pieces of data to be displayed. The priority indicates a priority of the sort condition. The priority "1" is the highest, and the priority lowers as the value of the priority increases.

(4) Recording History Storing Unit 104

The recording history storing unit 104 stores a history managing table T140 as shown in FIG. 5 as an example.

The history managing unit T140 has an area for storing one or more recording-scheduled program names. The recording-scheduled program name is a program name of a program that has been scheduled to be recorded by a program specification.

Here, nothing is stored the history managing table T140 until when the program search device 100 receives a preprogramming instruction for recording for the first time, with a program specification from the user. Note that the history managing table T140 in this embodiment stores two recording-scheduled program names, namely "comedy special" and "professional baseball roundup"

(5) User Profile Storing Unit 105

The user profile storing unit 105 stores a user profile T150 as shown in FIG. 6 as an example.

The user profile T150 has an area for storing one or more pairs of a preference keyword and a weight. In the following, the pair of the preference keyword and the weight is called "the user information set".

The preference keyword is a keyword included in the program information set corresponding to program contents preferred by the user.

The weight is a numeral value for weighting the preference keyword.

Here, the user profile T150 is updated every time a preprogramming instruction for recording a program with a program specification is received and a new preference keyword is extracted. If the program search device 100 has received no preprogramming instruction, the user profile T150 does not store any information.

(6) Search Result Storing Unit 106

The search result storing unit 106 stores a search result table T160 as shown in FIG. 7 as an example.

The search result table T160 has an area for storing one or more groups of a program, a start time, an end time, a CH number, a first emphasis condition, a second emphasis condition, a third emphasis condition, an exclusion flag, and recommendation rate.

The program indicates program display information sets found by the search using the search keyword.

The start time indicates a start time of a program content corresponding to the program display information set indicated by the "program". The end time indicates an end time of a program content corresponding to the program display information set indicated by the "program".

The CH number indicates a channel number at which a program content corresponding to the program display information set indicated by the "program".

The first emphasis condition consists of a pair of a first flag and a first character string, associated with a condition ID "1" of the emphasis condition table T110. The first flag indicates whether any character string to be emphasized in the display mode corresponding to the condition ID "1" exists or not. If such a character string exists, the first flag stores a value "1".

If such a character string does not exist, the first flag stores a value "0". The first character string indicates a character string to be emphasized in the display mode corresponding to the condition ID "1".

The second emphasis condition consists of a pair of a second flag and a second character string, associated with a condition ID "2" of the emphasis condition table T110. The second flag indicates whether any character string to be emphasized in the display mode corresponding to the condition ID "2" exists or not. If such a character string exists, the second flag stores a value "1". If such a character string does not exist, the second flag stores a value "0". The second character string indicates a character string to be emphasized in the display mode corresponding to the condition ID "2".

The third emphasis condition consists of a pair of a third flag and a third character string, associated with a condition ID "3" of the emphasis condition table T110. The third flag indicates whether any character string to be emphasized in the display mode corresponding to the condition ID "3" exists or not. If such a character string exists, the third flag stores a value "1". If such a character string does not exist, the third flag stores a value "0". The third character string indicates a character string to be emphasized in the display mode corresponding to the condition ID "3".

The exclusion flag is a flag indicating whether the program display information set is a target of displaying or not, and the value to be stored therein is "0" or "1". The value "0" indicates that the program display information set is a target of displaying, which means that the program display information set corresponding to the exclusion flag is specific program display information set. The value "1" indicates that the program display information set is not a target of displaying, which means that the program name included in the program display information set corresponding to the exclusion flag is a regular program name or a program name of a program scheduled to be recorded. In the following description, the program display information set whose exclusion flag "1" is called as the "excluded program display information set".

The recommendation rate is a numeric value which is calculated by using the program information set corresponding to the found program display information set and the user profile T150. This value indicates a recommendation rate of a program content corresponding to the program name included in the program display information set found by the search.

Here, if a search has not been performed even once, the search result table T160 does not store any information. FIG. 7 shows a result after the program search device 100 has performed a search.

In the following description, the group including the program the start time, the end time, the CH number, the first emphasis condition, the second emphasis condition, the third emphasis condition, the exclusion condition and the recommendation rate is called as the "registration information set".

(7) Display Color Managing Unit 107

The display color managing unit 107 stores a color managing table T170 as shown in FIG. 8 as an example.

The color managing table T170 prestores one or more groups of a target range, a character color and a background color.

The target range indicates a range of the recommendation rate. For example, the target range represented by "numeric value m to numeric value n" means the target is not les than m and less than n.

The character color indicates the color of the characters to be displayed, and the background color indicates the background color of the characters to be displayed.

(8) Receiving Unit 108

The receiving unit 108 has an antenna 40. The receiving unit 108 receives broadcast waves from the broadcast device 10 via the antenna 40, obtains program contents from the received broadcast wave, and outputs the obtained program contents to the processing unit 115.

The receiving unit 108 receives broadcast waves from the broadcast device 10 via the antenna 40, obtains an EPG including two weeks' worth program information sets from the received broadcast wave and outputs the EPG to the EPG registration unit 109.

(9) EPG Registration Unit 109

Upon receiving an EPG from the receiving unit 108, the EPG registration unit 109 writes the received EPG in the EPG storing unit 101, and registers the received EPG. When writing the EPG received from the receiving unit 108 into the storing unit 101, if an EPG already exists in the EPG storing unit 101, the EPG registration unit 109 overwrites the existing EPG with the EPG received from the receiving unit 108.

After finishing the registration of the EPG received from the receiving unit 108 into the EPG storing unit 101, the EPG registration unit 109 outputs a search instruction to the search control unit 111.

(10) Clock Unit 110

The clock unit 110 is a clock for timing with a calendar function.

(11) Search Control Unit 111

The search control unit 111 extracts, from keyword managing table T100, one or more keywords to be used for a search. Then, the search control unit 111 detects the specific program display information sets from the program information sets included in the EPG, by performing search using the extracted keywords. Moreover, the search control unit 111 extracts, from the detected one or more program display information sets, a program display information set to be excluded from the target of displaying, calculates the recommendation rate of the program content indicated by the excluded program display information set, extracts emphasis characters, and then write the results in the search result table T160.

The search control unit 111 stores a worktable T161 consisted of the same components as the search result table T160. In other words, the work table T161 has an area for storing one or more group of a program, a start time, an end time, a CH number, a first emphasis condition, a second emphasis condition, a third emphasis condition, an exclusion flag and a recommendation rate. These components are the same as those of the search result table T160. Therefore, the explanations thereof are omitted here.

The search control unit 111 has an exclusion program storing area for storing one or more excluded program display information sets recorded in the search result table T160.

The search control unit 111 has a search flag indicating whether a search has ever been performed or not. The search flag stores a numeric value "0" or "1". The search flag "0" indicates that a search has not been performed even once, and the search flag "1" indicates that a search has already been performed.

Upon receiving a search instruction from the EPG registration unit 109, the search control unit 111 obtains current time from the clock unit 110.

Using the obtained current time and the effective periods respectively corresponding to the search keywords, the search control unit 111 obtains, from the keyword managing table T100 stored in the keyword storing unit 102, all the keywords whose effective period includes the current time, in other words, all the keywords that can be used for the search. Here, it is assumed that a search keyword corresponding to an effective period "unspecified" is a search keyword that is always effective regardless of the current time. For example, if the obtained current time is "15:00, Apr. 4, 2004", the search keyword "SPECIAL", "SP" and "FEATURING", whose effective period is "unspecified", and the search keyword "NEW", whose effective period is "April 1 to April 15", and the search keyword "OLYMPIC", whose effective period is "2004" are obtained.

The search control unit 111 judges whether a search has already been performed or not. In other words, the search control unit 111 judges whether the search flag is "0" or "1".

<The Case where the Search Flag is "0">

The search control unit 111 judges that a search has not been performed even once. In other words, if the search flag is "0", the search control unit 111 rewrites the value of the search flag with "1", and obtains program information sets for two weeks' worth from the EPG storing unit 101. In other words, the search control unit 111 obtains all the program information sets stored in the EPG storing unit 101.

Using the one or more search keywords obtained from the keyword storing unit 102, the search control unit 111 searches (OR search) for and obtains a program display information set partially matching with the search keywords, the start time, the end time and the channel of the corresponding program, from the program display information sets included in the program information sets for two weeks' worth. The search control unit 111 writes all the groups including the obtained program display information set, start time, end time and channel number, into corresponding fields in the work table T161, namely fields of the start time, the end time and the CH number, and writes an initial value "0" to the first flag, the second flag, the third flag, and the exclusion flag.

As a result, the search control unit 111 can write, among program information sets of two weeks' worth, all the groups each including a program display information set partially matching with one or more search keywords, a start time, an end time and a channel number into the work table T161, and can also write the initial value "0" in the first flag, the second flag, the third flag and the exclusion flag. At this moment, nothing has been written in the work table T161. Note that the program display information sets to be written at this moment in the work table T161 are candidates for the specific program display information sets.

The search control unit 111 specifies, in the order (top to bottom order) of the storage in the exclusion condition table T120, program display information sets to be excluded from the display target, based on the exclusion condition. In this embodiment, based on the first exclusion condition "duplication", the search control unit 111 performs an exact match retrieval for the program display information sets to judge whether duplicate program display information sets exist. The search control unit 111 changes the exclusion flag corresponding to the program display information set found by the exact match retrieval to "1". For example, if a program "MHK special" to be broadcast on Apr. 3, 2004 and a program "MHK special" to be broadcast on Apr. 4, 2004 are found, the exclusion flags of these programs are changed to be "1" based on the "duplication" condition.

Next, the search control unit 111 performs the following operations based on the second exclusion condition "recording-scheduled program". The search control unit 111 judges whether the program display information set including mode information "repeat" exists in the work table T161. If judges affirmatively, the search control unit 111 obtains all the program display information sets including mode information "repeat" (hereinafter called "repeat program") from the work table T161. To judge whether the program name that is the same as the program name of recording-scheduled program stored in the recording history storing unit 104 exists as a repeat program, the search control unit 111 searches for a repeat program name that is the same as the recording-scheduled program name stored in the recording history storing unit 104. The search control unit 111 changes the exclusion flag corresponding to the program display information set including the repeat program name found by the search to "1". For example, the repeat program name "comedy special" to be broadcast on Apr. 10, 2004 is stored in the history managing table T140. Therefore, the exclusion flag corresponding to the repeat program name "comedy special" is changed to "1".

If judging that any repeat program name does not exist in the work table T161, the search control unit 111 finishes the extraction of the program display information set to be excluded.

Using the user profile T150 and the program display information set stored in the work table T161, the search control unit 111 calculates the recommendation rate for each program display information set whose exclusion flag is "0", and stores the calculated recommendation rate. The calculation of the recommendation rate is described later. Next, using the emphasis condition table T110 and the program information set corresponding to the program display information set stored in the work table T161, the search control unit 111 extracts character strings to be emphasized from the program display information set whose exclusion flag is "0", and stores the extracted character strings. The emphasizing of the character stirrings is described later.

The search control unit 111 registers the contents of the work table T161 in the search result table T160. In other words, the search control unit 111 replaces the contents of the search result table T160 with the contents of the work table T161.

Further, the search control unit 111 deletes the contents of the work table T161.

As a result, the search control unit 111 extracts, from the program display information sets registered in the search result table T160, the program display information set whose exclusion flag is "0" as specific program display information sets, and the program display information sets whose exclusion flag is "1" as exclusion program display information sets.

<The Case where the Search Flag is "1">

If judging that a search has already been performed, in other words, if judging that the search flag is "1", the search control unit 111 obtains all the information display sets whose exclusion flag is "1" from the search result table T160, and stores the obtained program display information sets in the exclusion program storing area.

The search control unit 111 obtains, from the EPG storing unit 101, program information sets of one week's worth with respect to the current date. For example, if the current date is "Apr. 2, 2004", the search control unit 111 obtains the program information sets for from "Apr. 2, 2004" to "Apr. 8, 2004" from the EPG storing unit 101.

The search control unit 111 performs a partial match retrieval (OR search) for a program display information set including one or more search keywords obtained from the keyword storing unit 102, targeting the program display information sets of one week's worth. The search control unit 111 obtains program display information set that partially matches the search keyword, the start time, the end time and the channel number corresponding to the program display information set. Then, the search control unit 111 writes all the groups including the obtained program display information set, the start time, the end time and the channel number into the fields of the work table T161 respectively corresponding thereto, namely the fields of the program, the start time, the end time and the channel number. Furthermore, the search control unit 111 writes a numeric value "0" as an initial value into the first flag, the second flag and the third flag.

As a result, the search control unit 111 can write, among program information sets of one week's worth, all the groups each including a program display information set partially matching with one or more search keywords, a start time, an end time and a channel number into the work table T161, and can also write the initial value "0" in the first flag, the second flag, the third flag and the exclusion flag. At this moment, nothing has been written in the work table T161. Note that the program display information sets to be written at this moment in the work table T161 are candidates for the specific program display information sets.

The search control unit 111 specifies, in the same manner as in the case where the search flag is "0", in the order (top to bottom order) of the storage in the exclusion condition table T120, program display information sets to be excluded from the display target, based on the exclusion condition. The search control unit 111 changes the exclusion flag of the specified program display information set. Also, to judge whether the program display information set that is the same as the program display information stored in the exclusion program storing area exists among one or more program display information sets that are stored in the work table T161 and whose exclusion flag is "0", the search control unit 111 performs the exact match retrieval. The search control unit 111 changes the exclusion flag corresponding to the program display information set found by the exact math search to "1".

In the same manner as in the case where the search flag is "0", using the user profile T150 and the program display information set stored in the work table T161, the search control unit 111 calculates the recommendation rate for each program display information set whose exclusion flag is "0", and stores the calculated recommendation rate. Next, in the same manner as in the case where the search flag is "0", using the emphasis condition table T110 and the program information set corresponding to the program display information set stored in the work table T161, the search control unit 111 extracts character strings to be emphasized from the program display information set whose exclusion flag is "0", and stores the extracted character strings.

The search control unit 111 registers the contents of the work table T161 in the search result table T160. In other words, the search control unit 111 replaces the contents of the search result table T160 with the contents of the work table T161.

Further, the search control unit 111 deletes the contents of the work table T161 and the exclusion program storing area.

As a result, the search control unit 111 extracts, from the program display information sets registered in the search result table T160, the program display information set whose exclusion flag is "0" as specific program display information sets, and the program display information sets whose exclusion flag is "1" as exclusion program display information sets.

Calculation of Recommendation Rate

The search control unit 111 first obtains one program display information set stored in the work table T161, and judges whether the exclusion flag corresponding to the obtained program display information set is "0" or not.

If judging that the exclusion flag is "0", the search control unit 111 obtains program information set corresponding to the obtained program display information set from the EPG obtained from the EPG storing unit 101. Targeting the program display information set, the detail information set, and the genre included in the obtained program information set, the search control unit 111 extracts, among the preference keywords stored in the user profile T150, a preference keyword included in the search target. If no preference keyword has been found in the search target, the search control unit 111 stores a recommendation rate "0" as the recommendation rate corresponding to the obtained program display information set. If one or more preference keywords have been found in the search target, the search control unit 111 obtains weights respectively corresponding to the extracted preference keywords, and stores the total of the weights as a recommendation rate corresponding to the program display information set.

If judging that the exclusion flag is not "0", or if storing the calculated recommendation rate, the search control unit 111 judges whether any program display information set that has not obtained from the work table T161 exists or not. If judging that such a program display information set exists, the search control unit 111 obtains one program display information set that has not been obtained, and performs the above-described operations. If judging that such a program display information set does not exist, in other words, if judging that all the program display information sets are obtained from the work table T161, the search control unit 111 finishes the operations for the calculation.

As a result, the search control unit 111 can calculate and stores the recommendation rate corresponding to the program display information set whose exclusion flag is "0".

Extraction of Emphasized Characters

The search control unit 111 obtains one emphasis condition from the emphasis condition table T110. The search control unit 111 judges which of "1", "2" and "3" the condition ID corresponding to the obtained emphasis condition is.

<The Case where the Condition ID is "1">

If judging that the condition ID is "1", the search control unit 111 obtains the current time from the clock unit 110. The search control unit 111 obtains all the search keywords whose effective period includes the current time and the difference "the current time—the start date of the effective period" is not more than a predetermined length of time (3 days, in the first embodiment). Here, in this embodiment, if the effective period is "unspecified", it will be assumed that the difference is "the current time", and if the effective period is indicated only by "year", it will be assumed that the start date of the effective period is "January 1". In other words, if the effective period is "2004", the start date of the effective period is assumed to be "Jan. 1, 2004".

The search control unit 111 obtains one program display information set stored in the work table T161, and judges whether the exclusion flag corresponding to the obtained program display information set is "0" or not.

If judging that the exclusion flag is "0", the search control unit 111 judges whether one or more of the search keywords obtained from the keyword managing table T100 is included in the obtained program display information set. If judging that one or more search keywords are included in the obtained program display information set, the search control unit 111 changes the first flag corresponding to the obtained program display information to "1", extracts the character strings that are the same as the search keywords from the obtained program display information set, and stores the extracted character strings as the first character string. Here, if a plurality of character strings are extracted, the search control unit 111 separates the character strings by commas.

If judging that the exclusion flag is not "0", or the search keywords are not included or the extracted character strings are stored as the first character strings, the search control unit 111 judges whether any program display information set that has not been obtained from the work table T161 exists or not. If judging that such a program display information set exists, the search control unit 111 obtains one program display information set that has not been obtained, and performs the above-described operations. If judging that such a program display information set does not exist, in other words, if judging that all the program display information sets are obtained from the work table T161, the search control unit 111 judges whether any emphasis condition that has not been obtained exists or not. If judging that such an emphasis condition exists, the search control unit 111 obtains the emphasis condition that has not been obtained, and performs operations for storing the emphasized characters.

<The Case where the Condition ID is "2">

If judging that the condition ID is "2", the search control unit 111 obtains current time from the clock unit 110. The search control unit 111 obtains all the search keywords whose effective period includes the current time.

The search control unit 111 obtains one program display information set from the work table T161, and judges whether the exclusion flag corresponding to the obtained program display information is "0" or not.

If judging that the exclusion flag is "0", the search control unit 111 judges whether one or more of the search keywords among the search keywords obtained from the keyword managing table T100 are included in the obtained program display information set. If judging that search keywords are included, the search control unit 111 changes the second flag corresponding to the obtained program display information set to "1", extracts character strings that are the same as the search keywords from the obtained display information set, and stores the extracted character strings as the second character strings. Here, if a plurality of character strings are extracted, the search control unit 111 separates the character strings by commas.

If judging that the exclusion flag is not "0", or the search keywords are not included or the extracted character strings are stored as the second character strings, the search control unit 111 judges whether any program display information set that has not been obtained from the work table T161 exists or not. If judging that such a program display information set exists, the search control unit 111 obtains one program display information set that has not been obtained, and performs the above-described operations. If judging that such a program display information set does not exist, in other words, if judging that all the program display information sets are obtained from the work table T161, the search control unit 111 judges whether any emphasis condition that has not been obtained exists or not. If judging that such an emphasis condition exists, the search control unit 111 obtains the emphasis condition that has not been obtained, and performs operations for storing the emphasized characters.

<The Case where Condition ID is "3">

If judging that the condition ID is "3", the search control unit 111 obtains one program display information set stored in the work table T161, and judges whether the exclusion flag corresponding to the obtained program display information set is "0" or not.

If judging that the exclusion flag is "0", the search control unit 111 obtains program information set corresponding to the obtained program display information set from the EPG storing unit 101. The search control unit 111 judges whether the program content of the obtained program display information is the long program which is longer than one hour, using the start time and the end time included in the obtained program information. If judging that the program content is the long program, the search control unit 111 changes the third flag corresponding to the obtained program display information set to "1", and stores the obtained program display information set as the third character strings. Here, if the program display information set is consisted of a program name, only the program name is to be stored as the third character string.

If judging that the exclusive flag is not "0", or the program content corresponding to the program name included in the obtained program display information set is not the long program, or the extracted character strings are stored as the third character strings, the search control unit 111 judges whether any program display information set that has not been obtained from the work table T161 exists or not. If judging that such a program display information set exists, the search control unit 111 obtains one program display information set that has not been obtained, and performs the above-described operations. If judging that such a program display information set does not exist, in other words, if judging that all the program display information sets are obtained from the work table T161, the search control unit 111 judges whether any emphasis condition that has not been obtained exists or not. If judging that such an emphasis condition exists, the search control unit 111 obtains the emphasis condition that has not been obtained, and performs operations for storing the emphasized characters.

(12) Display Control Unit 112

The display control unit 112 performs control relating to displaying of the search result and the EPG displayed on the monitor 20. The display control unit 112 also performs control relating to registration of recording schedule with specification of a program name based on the EPG and the search result displayed on the monitor 20.

The display control unit 112 displays the search result in a list form (hereinafter called "the list display") or a TV guide form (hereinafter called the "TV guide display"), based on the background color and the character color corresponding to the value of the exclusion flag stored in each registration information set stored in the search result table T160, and the first, the second and the third emphasis conditions, and the recommendation rate.

As FIG. 9 shows, a list T180 displayed by the list display includes one or more groups each including a number, a program, a start time, an end time and a CH number.

The number represents the order of the recommendation rate. The program represents the program display information set. The start time and the end time respectively represent the start time and the end time of the program content corresponding to the program name included in the program display information. The CH number represents the channel number at which the program content is to be broadcast. In the list T180, the program in the heavy-line frame is a program selected by the user. In the list T180, note that although only a background color and a single character color is used in this drawing, it is assumed that each group including the number, the program, the start time, the end time and CH number is displayed with a background color and a displayed color corresponding to the recommendation rate.

The TV guide T190 displayed by the TV guide display includes a target date field T191 including date and day of the week, and a result table T192 whose vertical axis represents the time and horizontal axis represents the channel numbers. The result table T192 displays one or more groups each including the number representing the recommendation order and the program representing the program display information set. In the same manner as in the list T180, the program selected by the user is surrounded by a heavy-line frame. Also, although only a single background color and a single character color is used in this drawing, it is assumed that each group including the number, the number and the program are displayed with a background color and a displayed color corresponding to the recommendation rate.

Since the screen image of the EPG is a well-known technique, the explanation thereof is omitted here. However, in the EPG, it is assumed that the program selected by the user is surrounded by the heavy-line frame for identification in the same manner as in the list display. In the following description, the program surrounded by the heavy-line frame is called as a selected program.

The following describes control relating display and control relating to recording schedule registration.

Control Relating to Display

The display control unit 112 receives a change instruction for changing a selected program from the instruction receiving unit 113. The change instruction includes information instructing a movement toward the top by one, or a movement toward the bottom by one, or a movement to the right by one, or a movement to the left by one. Based on the information included in the received change instruction, the display control unit 112 changes the selected program and display the program. If the information included in the change instruction instructs a movement toward the top by one, the display control unit 112 displays a program positioned one level above the program currently display, as the selected program.

Upon receiving an EPG displaying instruction for displaying an EPG, the display control unit 112 obtains an EPG from the EPG storing unit 101, and displays the obtained EPG. Since the displaying of the EPG is a well-known technique, the explanation thereof is omitted here.

The following separately explains the case of the list display and the case of the TV guide display.

<The Case of List Display>

Upon receiving a first search result displaying instruction for displaying a search result in a list form from the instruction receiving unit 113, the display control unit 112 obtains the current time from the clock unit 110. The display control unit 112 obtains, from the search result table T160, all the registration information sets whose exclusion flag is "0" and including a program name whose start time is later than the current time.

The display control unit 112 sorts all the obtained registration information sets by applying the sort condition and the order stored in the sort condition table T130, in the order of the priority. In other words, firstly, the display control unit 112 sorts all the registration information sets according to the recommendation rate as the key, in the descending order, and sorts the registration information sets having a common recommendation rate according to the start time as the key, in the ascending order. Furthermore, the display control unit 112 sorts the registration information sets having a common recommendation rate and star time, according to the CH number as the Key, in the ascending order.

The display control unit 112 adds numbers representing the recommendation rates to the sorted registration information set from the top to the bottom.

The display control unit 112 sets the characters to be emphasized based on the first, second and the third emphasis conditions included in the respective registration information sets.

The display control unit 112 sets the background color and the character color, based on the recommendation rate and the color managing table T170 included in the respective registration information sets.

The display control unit 112 generates the list T180 from all the groups including the number representing the order, the program, the start time, the end time and the CH number, based on the setting (the characters to be emphasized, the background color and the character color) in the order of the numbers, and outputs the generated list T180 to the monitor 20 via the output unit 116. At this moment, the selected program that is initially displayed is the program whose number is "1".

<The Case of TV Guide Display>

Upon receiving a second search result displaying instruction for displaying a search result in a TV guide form from the instruction receiving unit 113, the display control unit 112 further receives a target date from the user, for determining the display target. Here, the target date is a date represented by year, month and day.

The display control unit 112 obtains day of the week of the target date, using the received target date and the clock unit 110.

The display control unit 112 obtains, from the search result table T160, all the registration information sets including the program display information set of the program that is to be broadcast on the received target date and whose exclusion flag is "0".

In the same manner as the case of receiving the first search result displaying instruction, the display control unit 112 performs the sorting, the addition of the numbers indicating the recommendation rate order, the setting of the character strings to be emphasized based on the first, second and third emphasis conditions included in the registration information sets, and the setting of the background color and the character color based on the recommendation rate and the color managing table T170 included in the respective registration information sets.

The display control unit 112 generates the result table T192 from all the groups each including the number representing the order, the program, the start time, the end time and the CH number, based on the set information sets (the character strings to be emphasized, the background color and the character color). Then, using the generated result table T192 and the received target date and the target day of the week, the display control unit 112 generates the TV guide T190, and outputs the generate TV guide 190 to the monitor 20 via the output unit 116. The selected program that is initially displayed is the program whose number is "1".

Control Relating to Recoding Schedule Registration

Upon receiving a preprogramming instruction for scheduling recording with a specification of a program from the instruction receiving unit 113, the display control unit 112 obtains a program name, a start time, an end time and a CH number included in the display information set included in the registration information set indicated by the selected program currently selected by the user.

The display control unit 112 generates a preprogramming information set including the obtained start time, end time and CH number, and outputs the generated preprogramming instruction and a recording schedule registration instruction to the processing unit 115. The display control unit 112 outputs the group including the obtained program name, start time, end time and the CH number, and the history registration instruction for instructing registration of the program name into the history managing table T140, to the information registration unit 114.

(13) Instruction Receiving Unit 113

Upon receiving a user's instruction to display the search result in the list form, the instruction receiving unit 113 outputs the first search result displaying instruction to the display control unit 112.

Upon receiving a user's instruction to display the search result in the TV guide form, the display control unit 112 outputs the second search result displaying instruction to the display control unit 112. Furthermore, the instruction receiving unit 113 receives the target date, and outputs the received target date to the display control unit 112.

Upon receiving a user's instruction to display an EPG, the instruction receiving unit 113 outputs the EPG displaying instruction to the display control unit 112.

Upon receiving a user's instruction to preprogram recording with specification of a program, the instruction receiving unit 113 outputs the preprogramming instruction to the display control unit 112.

Upon receiving a user's instruction to change the selected program, the instruction receiving unit 113 outputs the changing instruction to display control unit 112.

(14) Information Registration Unit 114

The information registration unit 114 writes the program that is scheduled to be recorded by a program specification, in the history managing table T140, and updates the user profile T150.

Upon receiving the history registration instruction and the group including the program name, the start time, the end time and the CH number, the information registration unit 114 writes the received program name into the history managing table T140.

The information registration unit 114 obtains, from the EPG storing unit 101, a program information set including the same information as the received program name, start time, end time and CH number, and extracts all the preference keywords to be registered in the user profile T150, from the obtained program information set. The information registration unit 114 calculates a weight on every preference keyword.

The information registration unit 114 writes the extracted preference keywords and the weights on the preference keywords into the user profile T150 to update the user profile T150. If the extracted keywords are already stored in the user profile T150, the information registration unit 114 replaces the weights for the stored preference keywords with the calculated weights.

The extraction of the preference keywords and the calculation of the weights are disclosed by a U.S. Pat. No. 3,351,058. Therefore, the explanation thereof is omitted.

(15) Processing Unit 115

The processing unit 115 has a preprogramming information storing area for storing a preprogramming information set.

The processing unit 115 performs recording processing of the program contents received by the program search device 100, output processing of the program contents received by the search device 100 to the monitor 20, and playback processing of the program contents recorded on the recording medium 30 attached to the program search device 100.

The recording processing includes recording in accordance with the user's instruction and recording in accordance with preprogramming of the recording. The preprogramming includes two cases. One is the case where the user designates the start time and the end time of the recording. The other one is the case where the user uses the search result and the EPG displayed on the monitor 20 to specify a program to preprogram the recording.

Upon receiving the preprogramming information set and the recording schedule registration instruction, the processing unit 115 stores the received preprogramming information set in the preprogramming information storing area.

Using the clock unit 110, the processing unit 115 checks the preprogramming information set stored in the preprogramming information storing area to judge whether to start the recording.

If judging to start the recording, in other words, if judging that current time is the same as the start time included in the preprogramming information set, the processing unit 115 starts recording, and continues the recording until the end time included in the preprogramming information set. Between the start time and the end time, the processing unit 115 receives the program content broadcast at the channel represented by the CH number included in the preprogramming information set via the receiving unit 108, and records the received program content on the recording medium 30 attached to the program search device 100.

Here, the registration of the recording preprogramming by the user designating the start time and the end time, the recording processing in accordance with the user's instruction, the output processing and the playback processing are well-known techniques. Therefore, the explanations thereof are omitted here.

(16) Output Unit 116

The output unit 116 receives information from the display control unit 12 and the processing unit 115, and outputs the received information to the monitor 20.

The information that the output unit 116 receives from the processing unit 115 includes a program content received by the program search device 100, and a program content recorded on the recording medium 30 attached to the program search device 100.

(17) Input/Output Unit 117

The input/output unit 117 performs input and output of program contents between the processing unit 115 and the recording medium 30 attached to the program search device 100.

3. Operations by Program Search Device 100

The following describes operations performed by the program search device 100.

(1) Operations for Searching Processing

Figure 11:
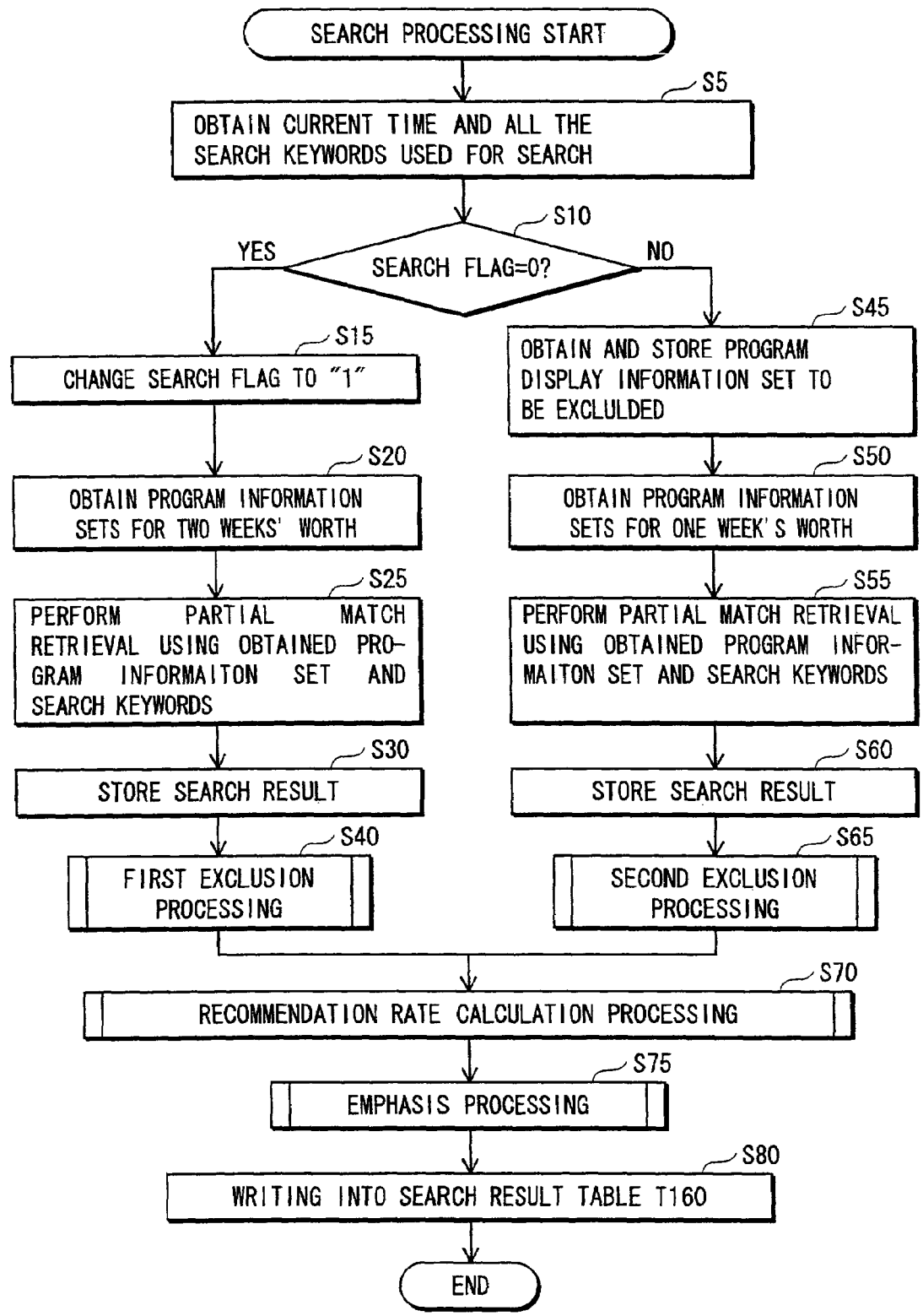
FIG. 11 is a flowchart showing operations for a searching process.

The following describes operations performed by the search control unit 111, with reference to a flowchart shown in FIG. 11.

Upon receiving the search instruction from the EPG registration unit 109, the search control unit 111 obtains a current time from the clock unit 110. Using the obtained current time, the search control unit 111 obtains search keywords that can be used for the search, from the keyword managing table T100 stored in the keyword storing unit 102 (Step S5).

The search control unit 111 judges whether the search flag is "0" or not (Step S10).

If judging that the search flag is "0", ("YES" in Step S10), the search control unit 111 changes the value of the search flag to "1" (Step S15), and obtains the program information sets for two weeks' worth from the EPG storing unit 101 (Step S20).

Using the one or more search keywords obtained from the keyword storing unit 102, the search control unit 111 performs a search (OR search) (Step S25) targeting the obtained two weeks' worth program information sets, and obtains a program display information set partially matching with the search keywords, the start time and the end time of the program, and the channel number. The search control unit 111 writes all the groups each including the obtained program display information set, the start time and the end time and the channel number into the corresponding fields, namely the program, the start time, the end time, the CH number, of the work table T161. Furthermore, the search control unit 111 writes an initial value "0" in the first flag, the second flag, the third flag and the exclusion flag (Step S30).

The search control unit 111 specifies a program display information set to be excluded from the display target by performing the first exclusion processing (Step S40).

If judging that the search flag is not "0" ("NO" in Step S10), the search control unit 111 obtains all the program display information sets whose exclusion flag is "1" from the search result table T160, and stores the obtained program display information sets in the exclusion program storing area (Step S45).

The search control unit 111 obtains program information sets for one week worth from the EPG storing unit 101 (Step S50).

Using the one or more search keywords obtained from the keyword storing unit 102, the search control unit 111 performs a search (OR search) (Step S55) targeting the obtained one week's worth program information sets, and obtains a program display information set partially matching with the search keywords, the start time and the end time of the program, and the channel number. The search control unit 111 writes all the groups each including the obtained program display information set, the start time and the end time and the channel number into the corresponding fields, namely the program, the start time, the end time, the CH number, of the work table T161. Furthermore, the search control unit 111 writes an initial value "0" in the first flag, the second flag, the third flag and the exclusion flag (Step S60).

The search control unit 111 specifies a program display information set to be excluded from the display target by performing the second exclusion processing (Step S65).

After performing the first exclusion processing or the second exclusion processing, the search control unit 111 performs recommendation rate calculation processing to calculate the recommendation rate corresponding to the program display information set as the display garget, and stores the calculated recommendation rate (Step S70). Next, the search control unit 111 performs emphasis processing to extract a character string to be emphasized, and stores the extracted character string (Step S75).

The search control unit 111 writes the contents of the work table T161 into the search result table T160 (Step S80). At this moment, the search control unit 111 deletes the contents of the work table T161. If the exclusion program storing area stores a program display information set to be excluded from the target of displaying, the search control unit 111 deletes the contents stored in the exclusion program storing area as well.

(2) Operations for the First Exclusion Processing

Figure 12:
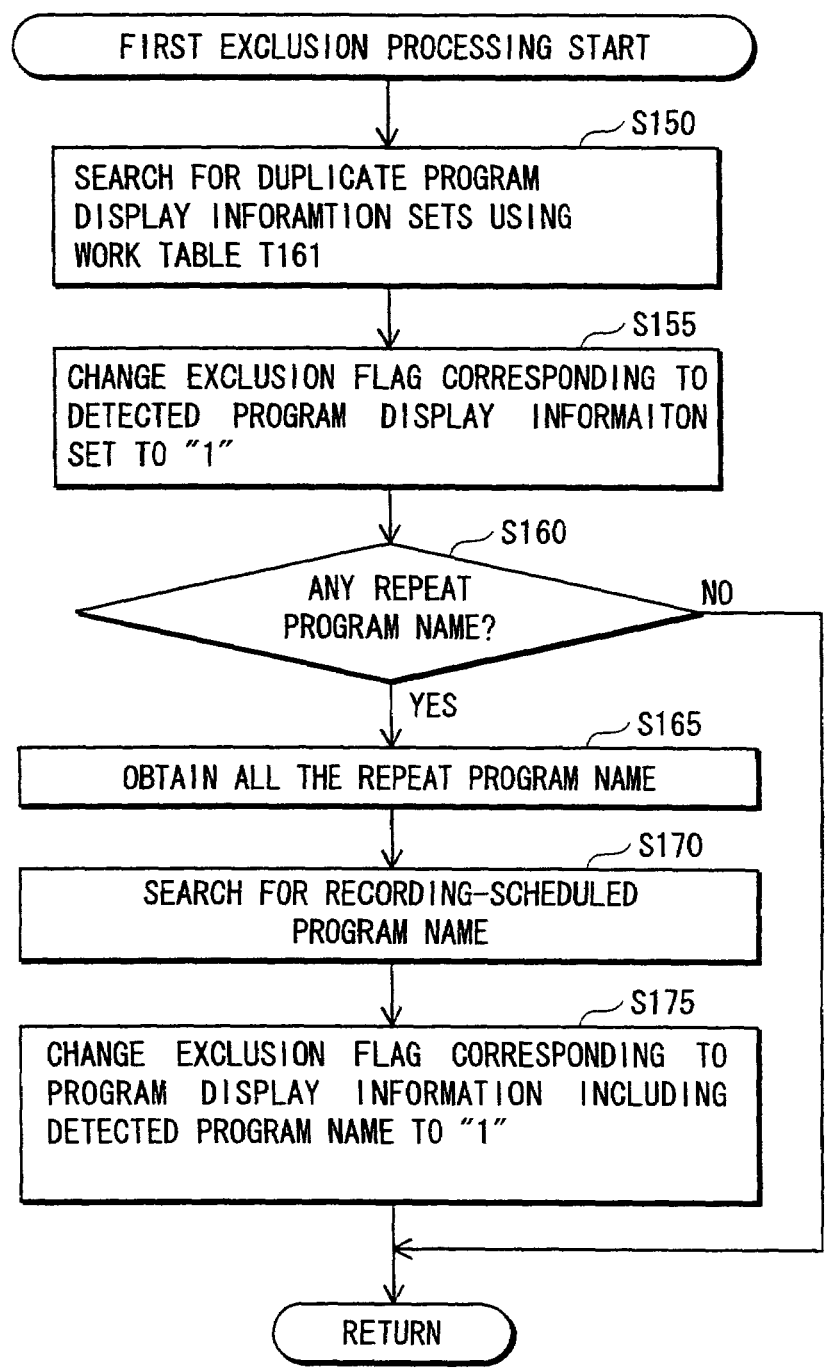
FIG. 12 is a flowchart showing operations for a first excluding process.

The following describes the first exclusion processing shown in FIG. 11, with reference to a flowchart shown in FIG. 12.

Firstly, the search control unit 111 performs an exact match retrieval from one or more program display information sets stored in the work table T161 to judge whether duplicate program display information sets exist or not, based on the first exclusion condition "duplication" (Step S150).

The search control unit 111 changes the exclusion flag corresponding to the program display information set found by the exact match retrieval to "1" (Step S155).

The search control unit 111 judges whether a program display information set including the mode information "repeat" exists in the work table T161 or not, in other words, judges whether a repeat program name exists in the work table T161 or not (Step S160). If judging that such a program exists ("YES" in Step S160), the search control unit 111 obtains all the repeat program names stored in the work table T161 (Step S165). To judge whether a repeat program name that is the same as the program name stored in the recording history storing unit 104 that has been scheduled to be recorded exists, the search control unit 111 searches for a repeat program name that is the same as the program name stored in the recording history storing unit 104 (Step S170). The search control unit 111 changes the exclusion flag corresponding to the program display information set including the repeat program name found by the search to "1" (Step S175).

If judging that such a repeat program name does not exist in the work table T161 ("NO" in Step S160), the search control unit 111 finishes the processing.

(3) Operations for the Second Exclusion Processing

Figure 13:
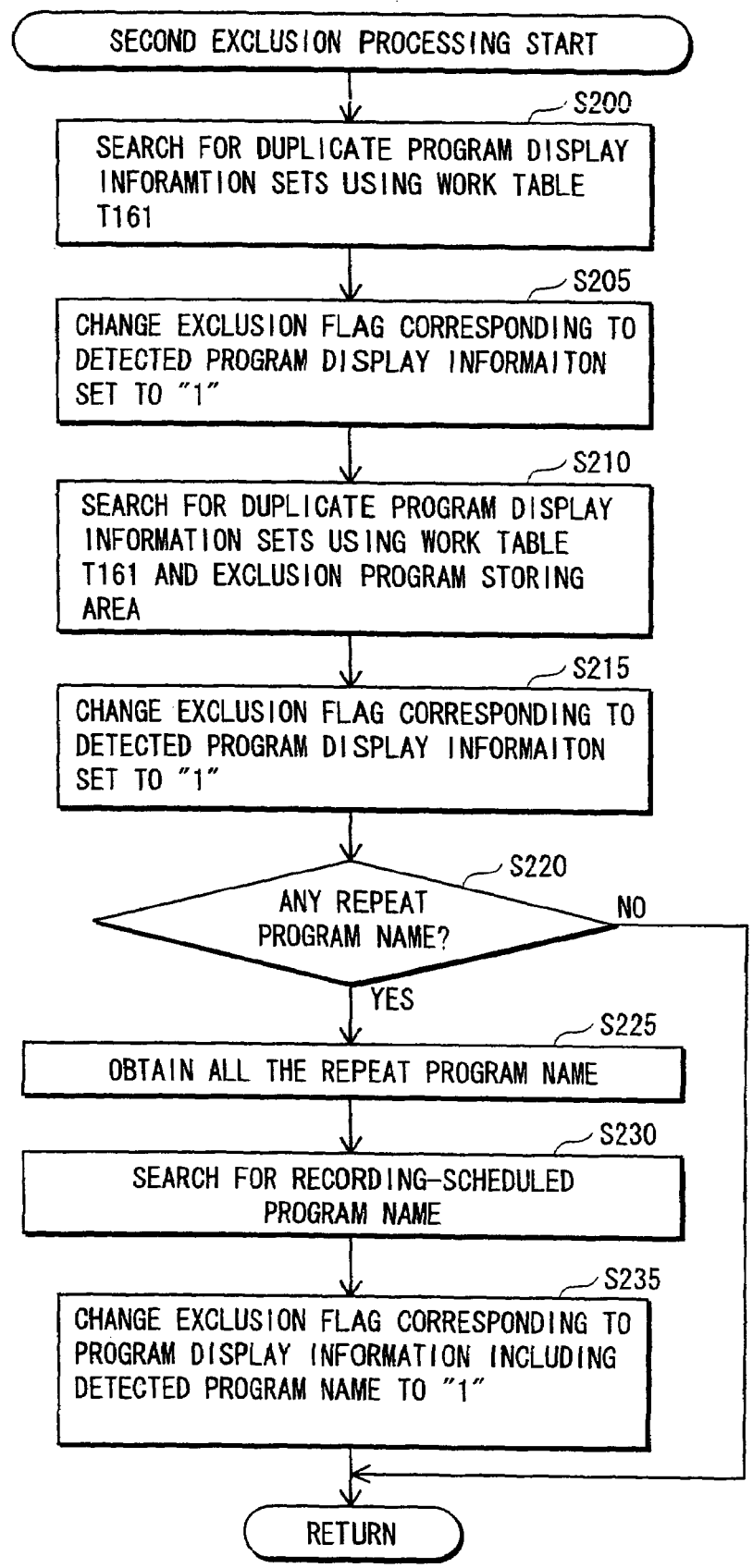
FIG. 13 is a flowchart showing operations for a second excluding process.

The following describes the second exclusion processing shown in FIG. 11, with reference to a flowchart shown in FIG. 13.

To judge whether duplicate display information sets exist within one or more program display information sets stored in the work table T161, the search control unit 111 performs an exact match retrieval (Step S200), and changes the exclusion flag corresponding to the program display information set found in Step S200 to "1" (Step S205).

Next, using the work table T161 and the exclusion program storing area, the program search control unit 111 performs an exact match retrieval of the program display information sets (Step S210), and changes the exclusion flag corresponding to the program display information set found in Step S210 to "1" (Step S215).

The search control unit 111 judges whether a repeat program exists in the work table T161 or not (Step S220). If judging that a repeat program exists ("YES" in Step S220), the search control unit 111 obtains all the repeat program names stored in the work table T161 (Step S225). To judge whether a repeat program name that is the same as the program name stored in the recording history storing unit 104 that is scheduled to be recorded exists or not, the search control unit 111 searches for a repeat program name that is the same as the program name stored in the recording history storing unit 104 that is scheduled to be recorded (Step S230). The search control unit 111 changes the exclusion flag corresponding to the program display information set including the repeat program name found by the search to "1" (Step S235).

If judging that a repeat program name does not exist in the work table T161 ("NO" in Step S220), the search control unit 111 finishes the processing.

(4) Operations for Calculating Recommendation Rate

Figure 14:
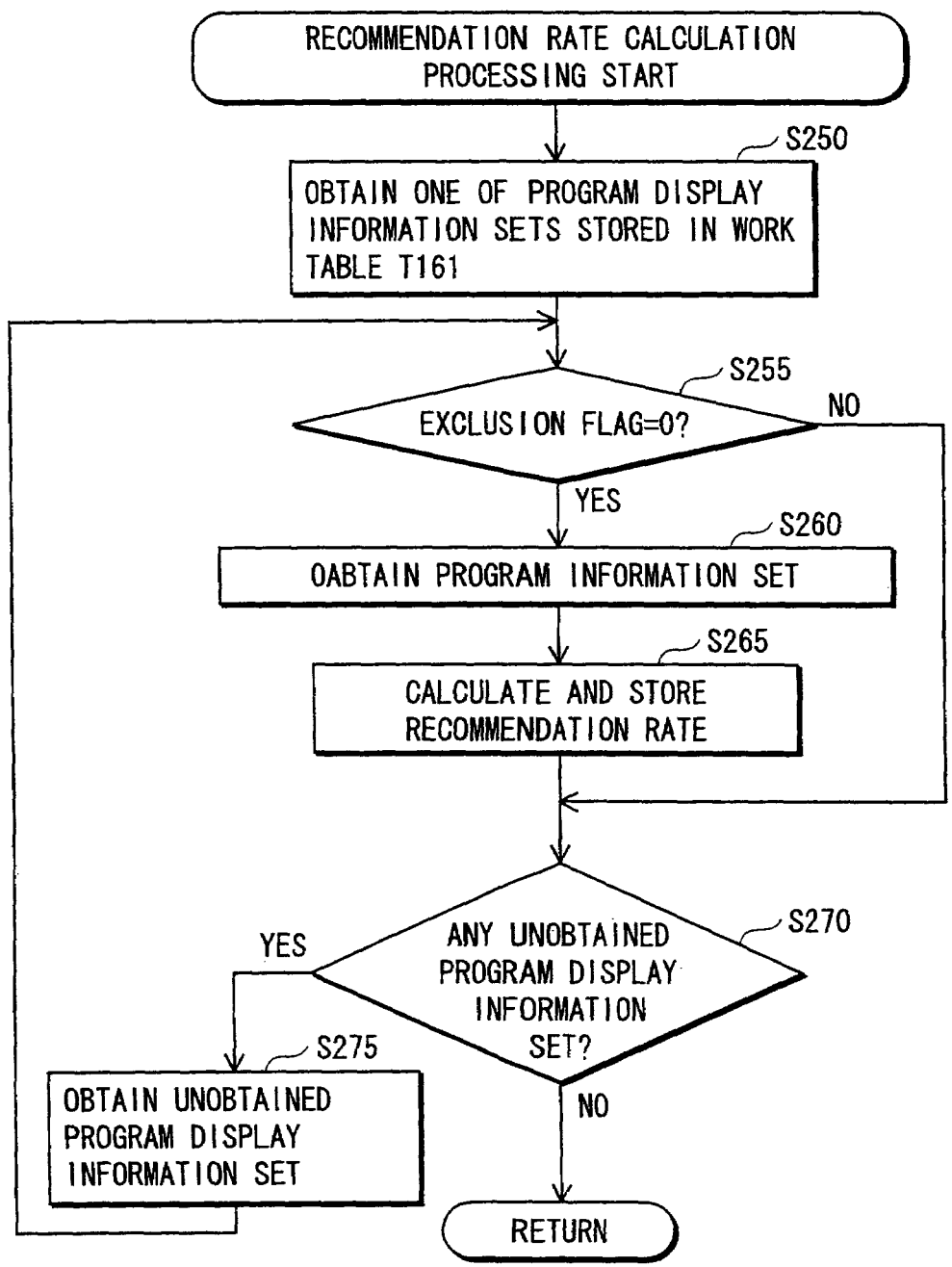
FIG. 14 is flowchart showing operations for calculating a recommendation rate.

The following describes operations for calculating the recommendation rate shown in FIG. 11, with reference to FIG. 14.

The search control unit 111 obtains one of the program display information sets stored in the work table T161 (Step S250), and judges whether the exclusion flag corresponding to the obtained program display information set is "0" or not (Step S255).

If judging that the exclusion flag is "0" ("YES" in Step S255), the search control unit 111 obtains a program information set including the obtained program display information set from the EPG storing unit 101 (Step S260). Targeting the program display information set, the detail information set and the genre included in the obtained program information set, the search control unit 111 extracts a preference keywords included in the search target, obtains a weight corresponding to each of the extracted preference keywords, and stores the total of the weights as a recommendation rate corresponding to the program display information set (Step S265). Note that if no preference keywords have not been extracted from the search target, the search control unit 111 stores a recommendation rate "0" as the recommendation rate corresponding to the program display information set.

In the case of judging that the exclusion flag is not "0" ("NO" in Step S255 and after executing Step S265, the search control unit 111 judges whether any program display information set that has not been obtained from the work table T161 exists or not (Step S270). If judging that such a program display information set exists ("YES" in Step S270), the search control unit 111 obtains one program information display set that has not been obtained (Step S275), and goes back to Step S255. If judging that such a program display information set does not exist, in other words, if judging that all the program display information sets stored in the work table T161 have been obtained ("NO" in Step S270), the search control unit 111 finishes the processing.

(5) Operations for Emphasis Processing

Figure 15:
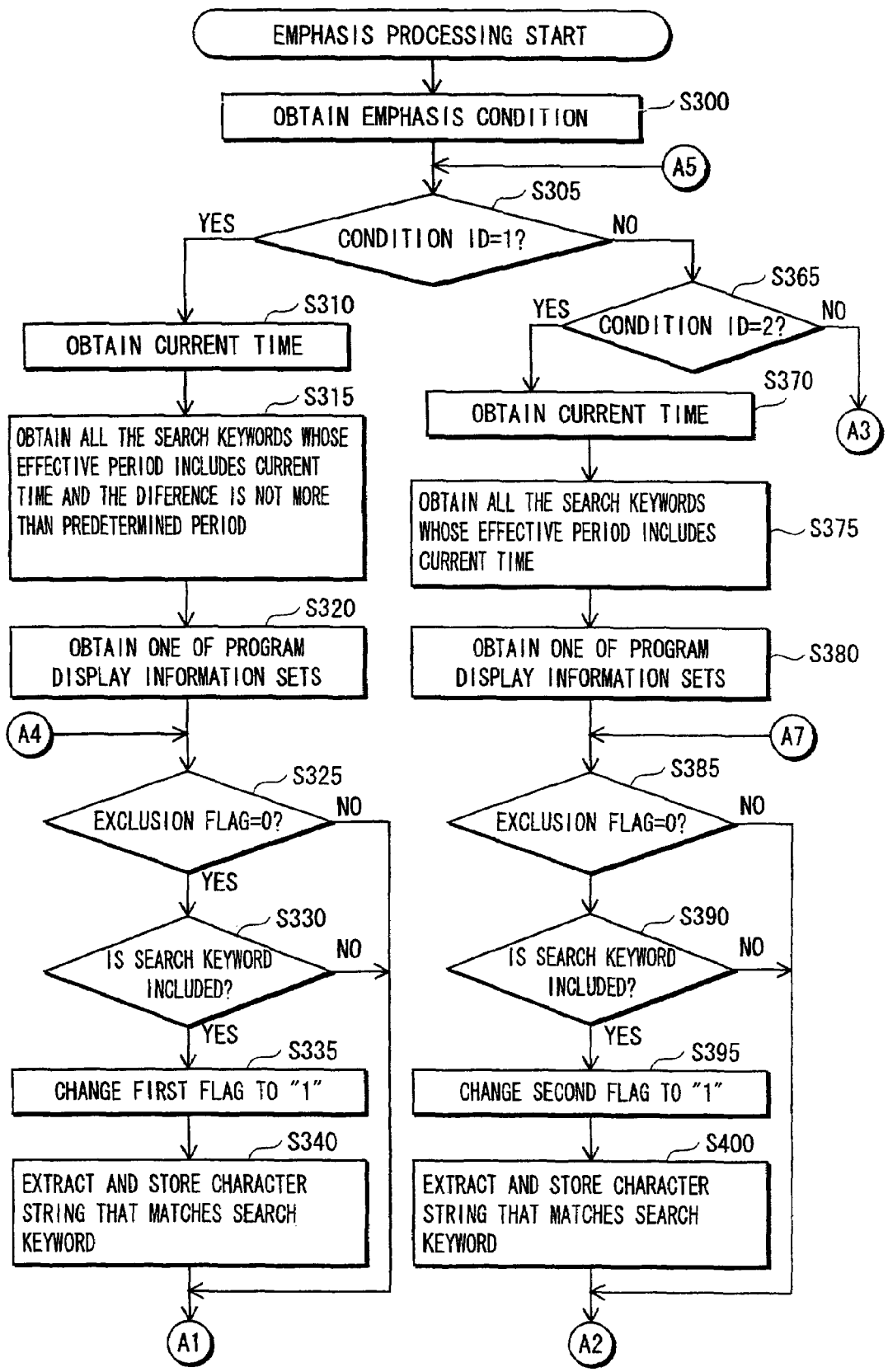
FIG. 15 is a flowchart showing operations for an emphasizing process, followed by FIG. 16.
Figure 16:
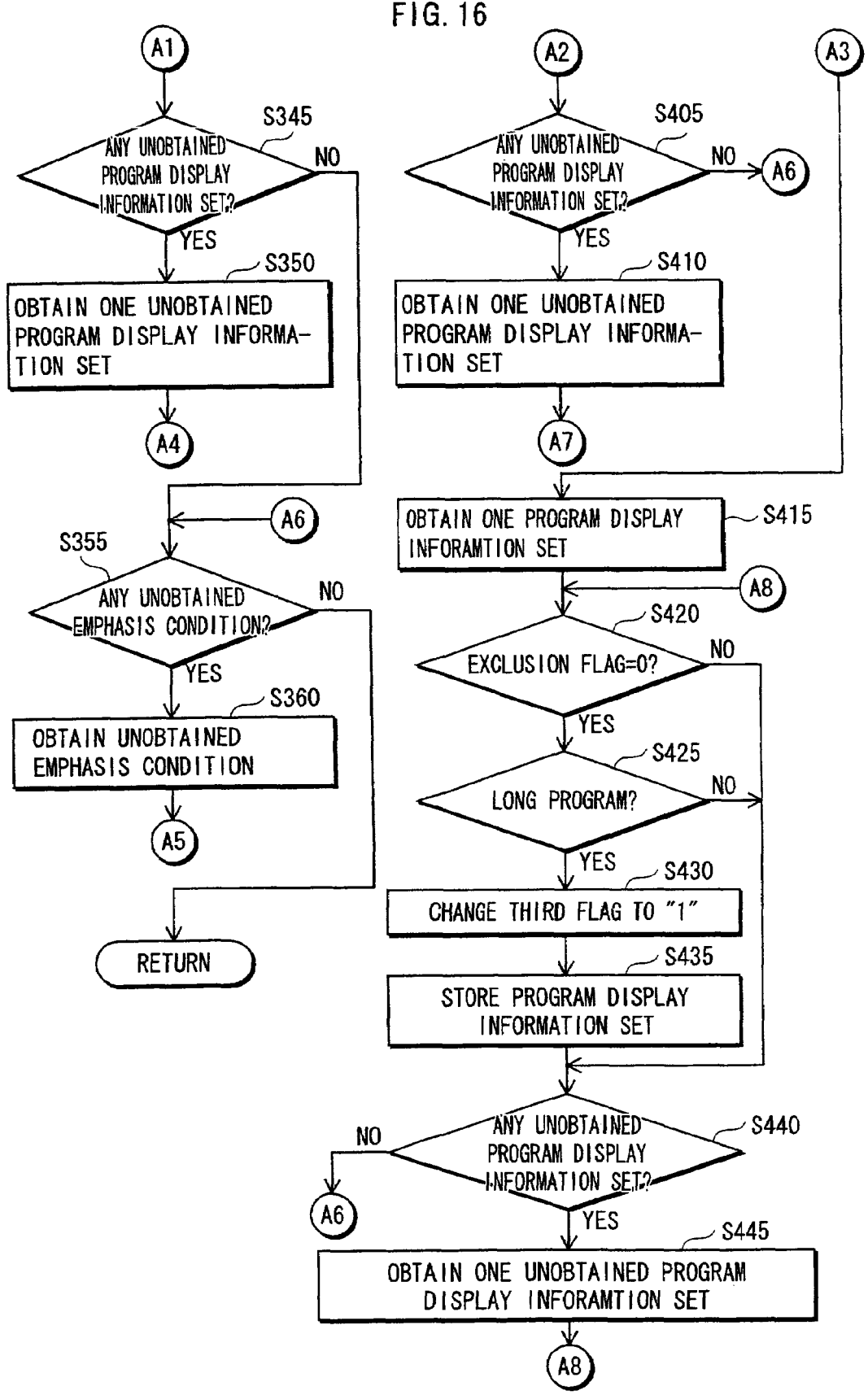
FIG. 16 is a flowchart showing operations for an emphasizing process, continued from FIG. 15.

The following describes operations for emphasis processing shown in FIG. 11, with reference to flowcharts shown in FIG. 15 and FIG. 16.

The search control unit 111 obtains one emphasis condition from the emphasis condition table T110 (Step S300).

The search control unit 111 judges whether the condition ID corresponding to the obtained emphasis condition is "1" or not (Step S305).

If judging that the condition ID is "1" ("YES" in Step S305), the search control unit 111 obtains the current time from the clock unit 110 (Step S310). The search control unit 111 obtains all the search keywords whose effective period includes the obtained current time and the difference "the current time—the start time of the effective period" is not more than a predetermined period (3 days in this embodiment) from the keyword managing table T100 (Step S315).

The search control unit 111 obtains one of the program display information sets stored in the work table T161 (Step S320), and judges whether the exclusion flag corresponding to the obtained program display information set is "0" or not (Step S325).

If judging that the exclusion flag is "0" ("YES" in Step S325), the search control unit 111 judges whether the obtained program display information set includes one or more of the search keywords obtained from the keyword managing table T100 (Step S330). If judging that the search keywords are included ("YES" in Step S330), the search control unit 111 changes the first flag corresponding to the obtained program display information set to "1" (Step S335), extracts a character string that is the same as the search keywords from the obtained program display information set, and stores the extracted character string as the first character string (Step S340).

In the case of judging that the exclusion flag is not "0" ("NO" in Step S325), and in the case of judging that the search keyword is not included ("NO" in Step S330), and after the Step S340 is performed, the search control unit 111 judges whether a program display information set that has not been obtained from the work table T161 exists or not (Step S345). If judging that there is such a program display information set ("YES" in Step S345), the search control unit 111 obtains one program display information set that has not been obtained (Step S350), and goes back to Step S325. If there is not such a program display information set, in other words, if all the program display information sets stored in the work table T161 ("NO" in Step S345), the search control unit 111 judges whether any emphasis condition that has not been obtained exists or not (Step S355). If judging that there is an emphasis condition that has not been obtained ("YES" in Step S355), the search control unit 111 obtains the emphasis condition that has not been obtained (Step S360), and goes back to Step S305. If judging that there is not an emphasis condition that has not been obtained ("NO", Step S355), the control unit finishes the processing.

If judging that the condition ID is not "1" ("NO" in Step S305), the search control unit 111 judges whether the condition ID is "2" or not (Step S365). If the condition ID is "2" ("YES" in Step S365), the search control unit 111 obtains the current time from the clock unit 110 (Step S370). The search control unit 111 obtains all the search keywords whose effective period includes the obtained current time from the keyword managing table T100 (Step S375).

The search control unit 111 obtains one of the program display information sets stored in the work table T161 (Step S380), and judges whether the exclusion flag corresponding to the obtained program display information set is "0" or not (Step S385).

If judging that the exclusion flag is "0" ("YES" in Step S385), the search control unit 111 judges whether the obtained program display information set includes one or more of the search keywords obtained from the keyword managing table T100 (Step S390). If the search keywords are included ("YES" in Step S390), the search control unit 111 changes the second flag corresponding to the obtained program display information set to "1" (Step S395), extracts a character string that is the same as the search keywords from the obtained program display information set, and stores the extracted character string as the second character string (Step S400).

In the case of judging that the exclusion flag is not "0" ("NO" in Step S385), and in the case of judging that the search keyword is not included ("NO" in Step S390), and after the Step S400 is performed, the search control unit 111 judges whether a program display information set that has not been obtained from the work table T161 exists or not (Step S405). If judging that there is such a program display information set ("YES" in Step S405), the search control unit 111 obtains one program display information set that has not been obtained (S410), and goes back to Step S385. If there is not such a program display information set, in other words, if all the program display information sets stored in the work table T161 ("NO" in Step S405), the search control unit 111 performs Step S355 and later.

If judging that the condition ID is not "2" ("NO" in Step S365), the search control unit 111 obtains one of the program display information sets stored in the work table T161 (Step S415), and judges whether the exclusion flag corresponding to the obtained program display information set is "0" or not (Step S420).

If judging that the exclusion flag is "0" ("YES" in Step S420), the search control unit 111 obtains a program information set including the obtained program display information set from the EPG storing unit 101, and judges whether the program content of the obtained program display information set is long program or not, in other words whether the broadcast time is more than on hour or not, using the start time and the end time included in the program information set (Step S425).

If judging that the program content of the obtained program display information set is a long program ("YES" in Step S425), the search control unit 111 changes the third flag corresponding to the obtained program display information set to "1" (Step S430), and stores the obtained program display information set as the third character string (Step S435).

In the case of judging that the exclusion flag is not "0" ("NO" in Step S420), and in the case of judging that the program content of the obtained program display information set is not a long program ("NO" in Step S425), and after the Step S435 is performed, the search control unit 111 judges whether a program display information set that has not been obtained from the work table T161 exists or not (Step S440). If judging that there is such a program display information set ("YES" in Step S440), the search control unit 111 obtains one program display information set that has not been obtained (Step S445), and goes back to Step S420. If there is not such a program display information set, in other words, if all the program display information sets stored in the work table T161 ("NO" in Step S440), the search control unit 111 performs Step S355 and later.

(6) Operations for List Display

Figure 17:
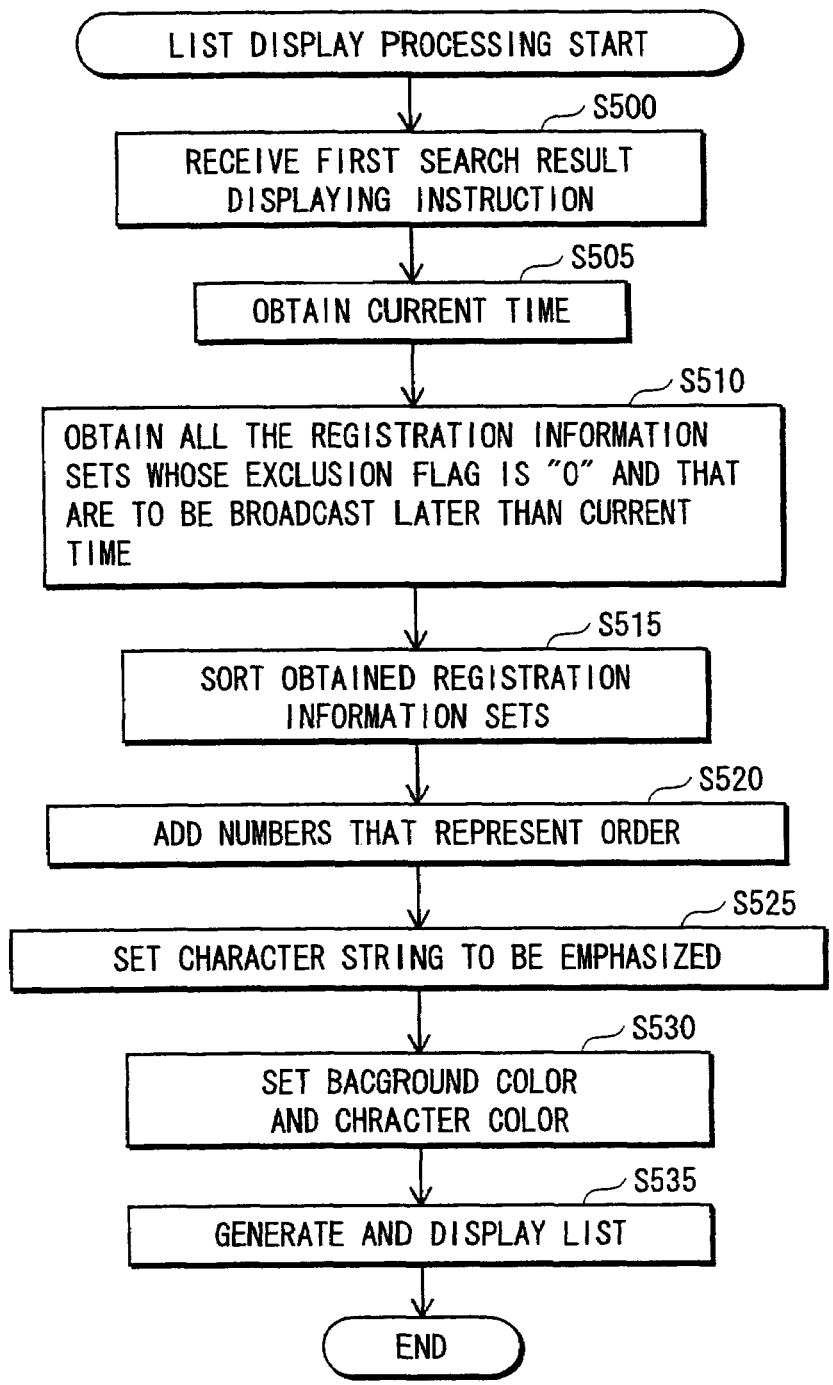
FIG. 17 is flowchart showing operations for a list displaying process.

The following describes the operations for the list display performed by the display control unit 112, with reference to a flowchart shown in FIG. 17.

Upon receiving, from the display control unit 112, the first search result displaying information instructing to display the search result in a list form (Step S500), the display control unit 112 obtains the current time from the clock unit 110 (Step S505). The display control unit 112 obtains, from the search result table T160, all the registration information sets including the program display information set whose exclusion flag is "0" and whose broadcast is to be started later than the obtained current time (Step S510).

The display control unit 112 sorts all the obtained registration information sets by applying the sort condition and the order stored in the sort condition table T130, in the order of the priority (Step S515).

The display control unit 112 adds numbers representing the recommendation rates to the sorted registration information set from the top to the bottom (Step S520).

The display control unit 112 sets the characters to be emphasized based on the first, second and the third emphasis conditions included in the respective registration information sets (Step S525).

The display control unit 112 sets the background color and the character color, based on the recommendation rate and the color managing table T170 included in the respective registration information sets (Step S530).

The display control unit 112 generates the list T180 from all the groups including the number representing the order, the program, the start time, the end time and the CH number, based on the setting (the characters to be emphasized, the background color and the character color) in the order of the numbers, and outputs the generated list T180 to the monitor 20 via the output unit 116 (Step S535).

(7) Operations for TV Guide Display

Figure 18:
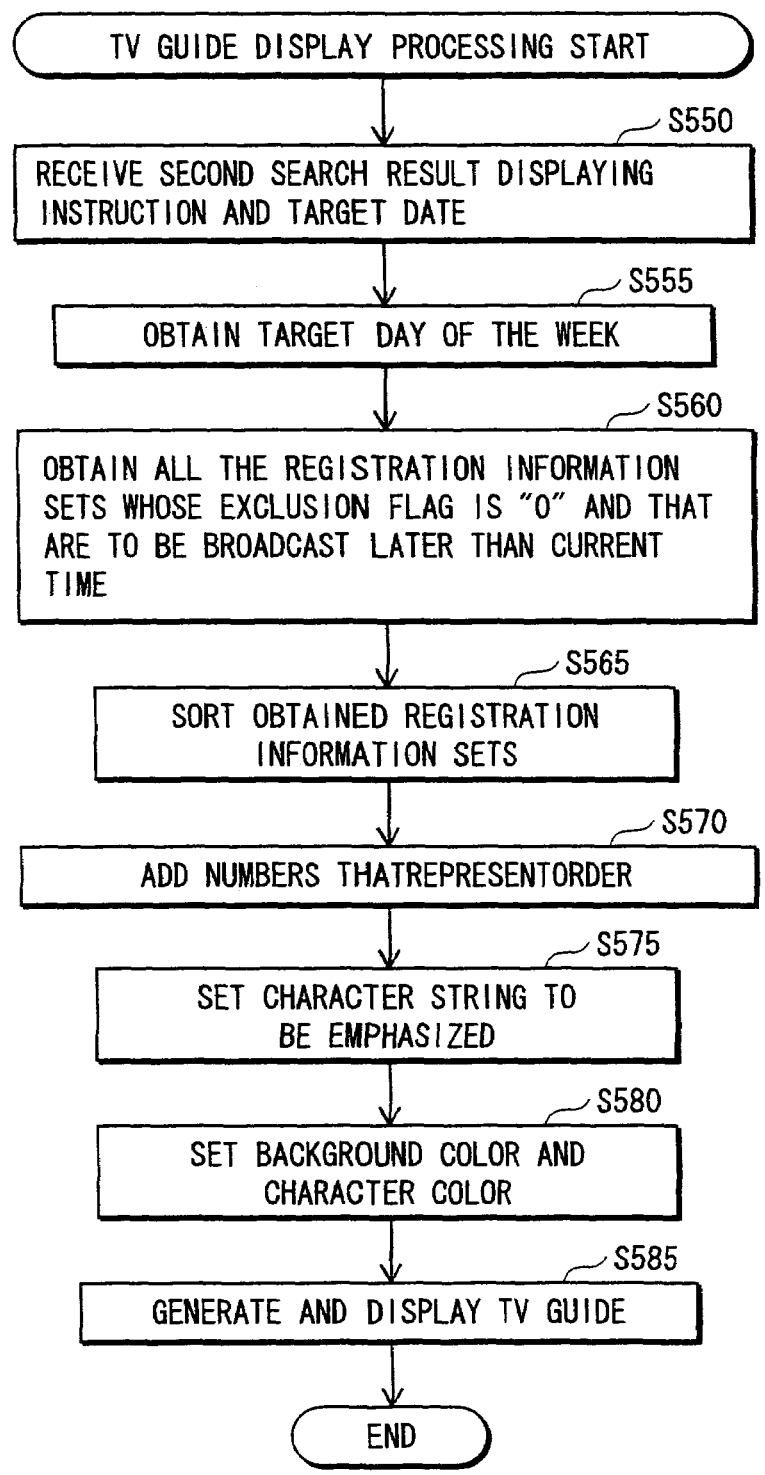
FIG. 18 is a flowchart showing operations for a TV guide displaying process.

The following describes operations performed by the display control unit 112 for displaying the TV guide, with reference to a flowchart shown in FIG. 18.

Upon receiving the second search result displaying instruction for displaying the search result in a form of a TV guide from the instruction receiving unit 113, the display control unit 112 further receives a target date representing a display target from the user (Step S550).

Using the received target date and the clock unit 110, the display control unit 112 obtains a target day of the week representing a day of the week of the target date (Step S555).

The display control unit 112 obtains, from the search result table T160, all the registration information sets including program display information sets whose exclusion flag is "0" and that is to be broadcast on the received target date (Step S560).

The display control unit 112 sorts all the obtained registration information sets by applying the sort condition and the order stored in the sort condition table T130, in the order of the priority (Step S565).

The display control unit 112 adds numbers representing the recommendation rates to the sorted registration information set from the top to the bottom (Step S570).

The display control unit 112 sets the characters to be emphasized based on the first, second and the third emphasis conditions included in the respective registration information sets (Step S575).

The display control unit 112 sets the background color and the character color, based on the recommendation rate and the color managing table T170 included in the respective registration information sets (Step S580).

The display control unit 112 generates the result table T192 from all the groups including the number representing the order, the program, the start time, the end time and the CH number, based on the setting (the characters to be emphasized, the background color and the character color) in the order of the numbers, generates the TV guide T190 using the generated result table T192, the received target date and the obtained target day of the week, and outputs the generated TV guide T190 to the monitor 20 via the output unit 116 (Step S585).

(8) Operations for Registering Recording Schedule

Figure 19:
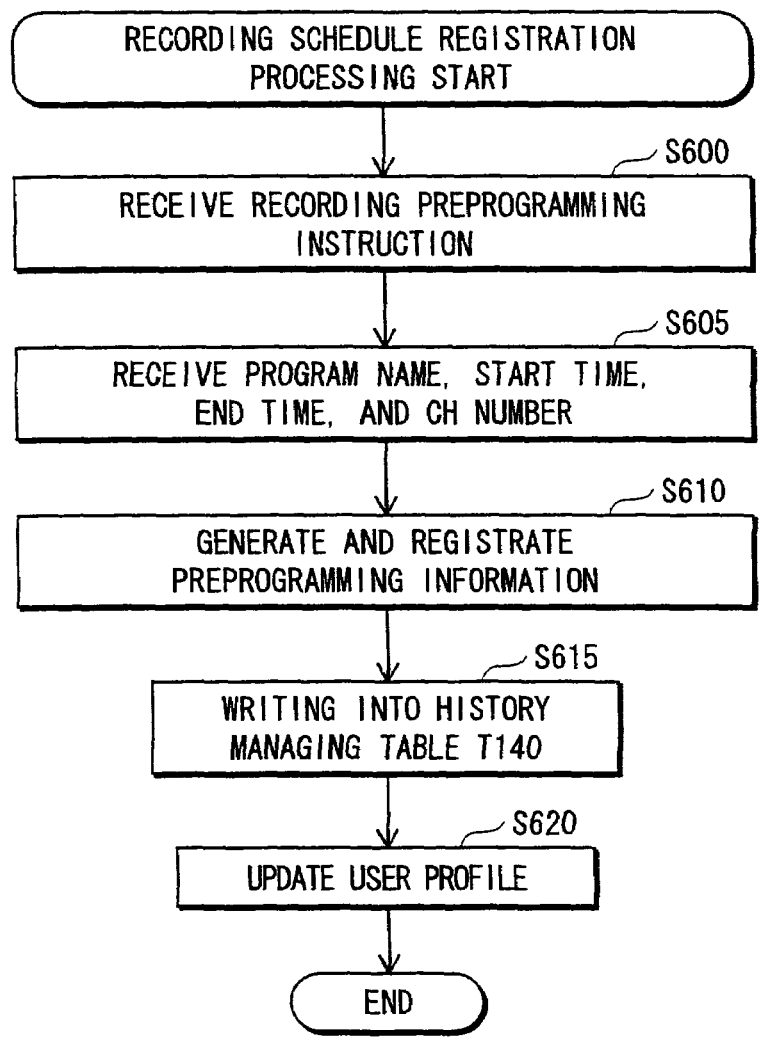
FIG. 19 is a flowchart showing operations for a recording schedule registration process.

The following describes operations for registering a recording schedule performed by the program search device 100, with reference a flowchart shown in FIG. 19.

Upon receiving the recording preprogramming instruction for scheduling recording with a specification of a program from the instruction receiving unit 113 (Step S600), the display control unit 112 obtains a program name, a start time, an end time and a CH number included in the display information set included in the registration information set indicated by the selected program selected currently selected by the user (Step S605).

The display control unit 112 generates a preprogramming information set including the obtained start time, end time and CH number, and outputs the generated preprogramming instruction and a recording schedule registration instruction to the processing unit 115. Upon receiving the preprogramming information set and the recording schedule registration instruction from the display control unit 112, the processing unit 115 stores the received preprogramming information set in the preprogramming information storing area (Step S610).

The display control unit 112 outputs the group including the obtained program name, start time, end time and the CH number, and the history registration instruction for instructing registration of the program name to the information registration unit 114. Upon receiving the group including the obtained program name, start time, end time and the CH number, and the history registration instruction from the display control unit 112, the information registration unit 114 writes the received program name into the history managing table T140 (Step S615).

The information registration unit 114 obtains, from the EPG storing unit 101, a program information set including the same information as the received program name, start time, end time and CH number, and extracts all the preference keywords to be registered in the user profile T150, from the obtained program information set. The information registration unit 114 calculates a weight on every preference keyword. The information registration unit 114 writes the extracted preference keywords and the weights for the preference keywords into the user profile T150 to update the user profile T150 (Step S620).

4. Summary

Conventionally, as a technique for searching for a program from an EPG, the following program managing apparatus is disclosed: A program managing apparatus searches for a program name of a program content that is regularly broadcast (hereinafter called "a regular program name") from all the program names included in the EPG, and then searches for a program name of a special program content and a program name of a new program content from one or more undetected program names which are not the regular program contents.

However, with the method used by the above-described program managing apparatus, if the user wishes to search for a program name of a special program content, the program managing apparatus has to search for a special program content after searching for regular program names from all the program names included in the EPG. In other words, the method above is always required to search for regular program names from all the program names included in the EPG, even in the case where the user wishes to search for a program name of a special program content. This is not an expedient method.

As explained above, the program search device of the present invention searches for program display information sets including a program name corresponding to a specific program content using a search keyword, and searches for a program display information set to be excluded from the program display information sets found by the search, namely exclusion program display information set, using an exclusion condition, and then stores the exclusion program display information set that has been found by the search and is to be excluded from the display target. This means that it is unnecessary to firstly search for, from all the program information sets, program display information sets of program contents that are regularly broadcast. As a result, the program search device can provide a method easier than the conventional search method.

Moreover, by associating a search keyword with an effective period within which the search keyword can be used for a search, for example, it is possible to make a keyword effective only in a season of reformation of programs and not effective out of the season of reformation of programs. For example, if the effective period is the season of reformation of programs and the keyword is "new", it is possible to find a program display information set representing new program content. This is because a character string "new" is recorded in the mode information included in the program display information set indicating a new program content.

Also, by emphasizing a character string that is the same as the search keyword among the character strings included in the program display information sets to be displayed, it is possible to visually display to the user that the program display information set currently displayed is found by what search keyword.

Also, by sorting the program display information according to the recommendation rates of the program display information sets to be displayed, it is possible to display the program display information sets in the order that meets the user's preference.

Also, by changing the character color and the background color in accordance with the calculated recommendation rates of the program display information sets to be display, it is possible to visually display the recommendation rates of the program display information set to the user.

The present invention provides a program search device that searches for broadcast programs corresponding to a current time from an electronic program guide, comprising: a program guide storing unit that prestores an electronic program guide including one or more program display information sets each indicating a broadcast program; a keyword storing unit operable to store one or more extraction keywords and effective periods corresponding thereto; a time obtaining unit operable to obtain a current time; and an extracting unit operable to read an extraction keyword corresponding to an effective period including the obtained current time and extract one or more program display information sets including the read extraction keyword.

For searching a TV program, the conventional keyword search is not always convenient. This is because TV programs change for every season and every month and a special program might be inserted irregularly, and there is no universal search keyword. If a search is performed using a general keyword, accuracy of the search becomes poor, and many undesired TV programs might be found by the search. The program search device of the present invention provides a effective period for a extraction keyword, and this improves the search accuracy compared to the conventional technique.

The present invention also provides a program search device that searches for a program display information set from an electronic program guide including one or more program display information sets indicating broadcast programs, comprising: a program guide storing unit operable to store an electronic program guide; a first extracting unit operable to extract program display information sets each including a character string indicating a particular program; and a second extracting unit operable to extract, from the program display information sets extracted by the first extracting unit, a regular program display information indicating a program broadcast regularly, and extract the rest of the program display information sets as special program display information sets.

With this structure, the program search device can extract one or more program display information sets using a character string representing a specific program, and separately extract a regular program display information set and a special program display information set from the extracted one or more program display information sets. As a result, the program search device can manage the regular program display information set and the specific program display information.

5. Modifications of Search Result Display

The following describes modifications of the way of displaying the search result.

5.1 Changing Background Color

In the above-described embodiment, the background color and the character color are changed in accordance with the recommendation rate. However, the present invention is not limited to this.

The background color and the character color of a program display information set including a keyword that is in the effective period thereof.

The following describes a structure of a program search device 100a for such a case.

Figure 20:
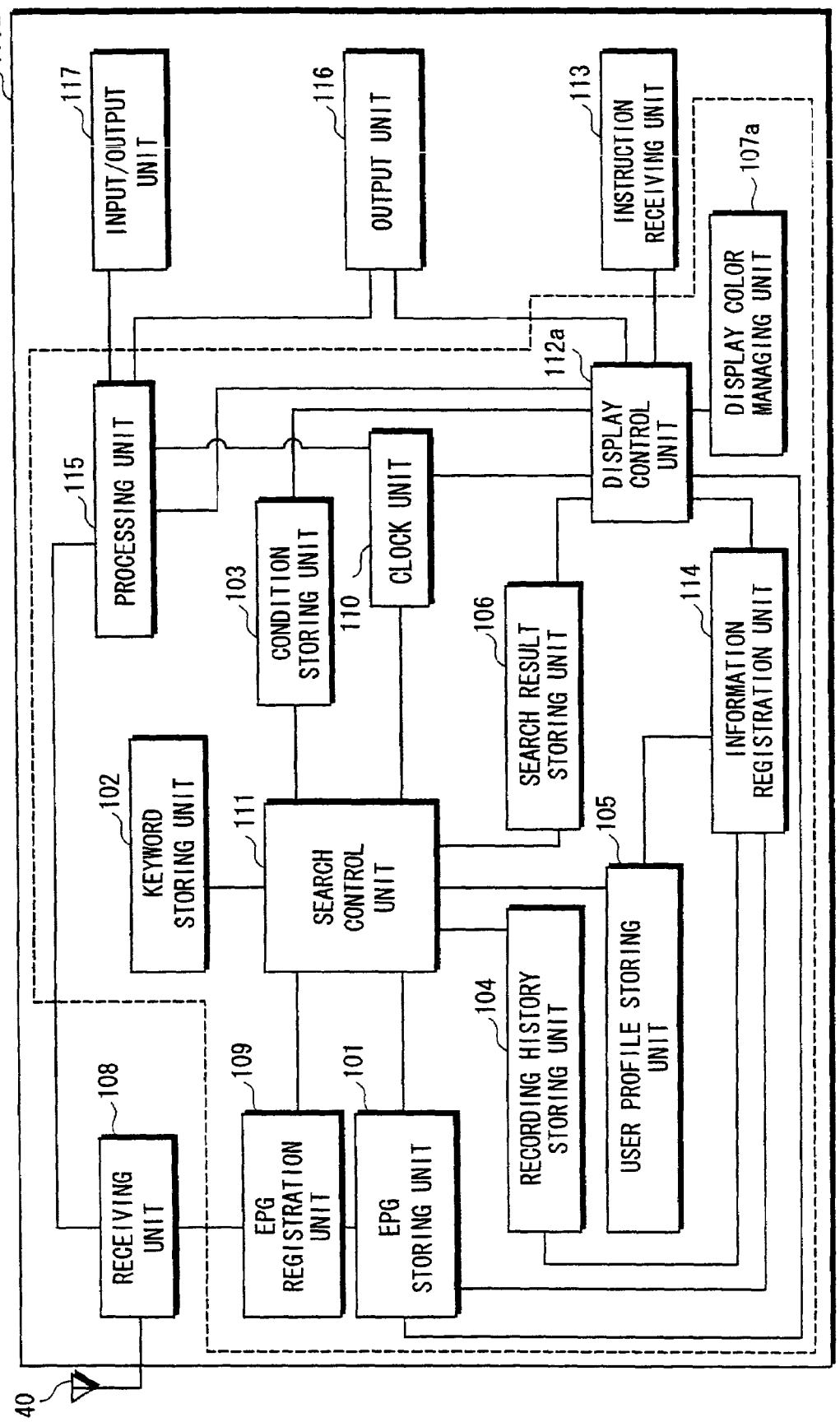

As FIG. 20 shows, the program search device 100a includes an EPG storing unit 101, a keyword storing unit 102, a condition storing unit 103, a recording history storing unit 104, a user profile storing unit 105, a search result storing unit 106, a display color managing unit 107a, a receiving unit 108, an EPG registration unit 109, a clock unit 110, a search control unit 111, a display control unit 112a, an instruction receiving unit 113, an information registration unit 114, a processing unit 115, an output unit 116 and an input/output unit 117.

The program search device 100a is, specifically, a computer system structured from a microprocessor, a ROM, a RAM, a hard disk unit and so on. A computer program is stored in the ROM or the hard disk unit. The functions of the program search device 100a are realized by the microprocessor operating in accordance with the computer program.

The components other than the display color managing unit 107a and the display control unit 112a, namely the EPG storing unit 101, the keyword storing unit 102, the condition storing unit 103, the recording history storing unit 104, the user profile storing unit 105, the search result storing unit 106, the receiving unit 108, the EPG registration unit 109, the clock unit 110, the search control unit 111, the instruction receiving unit 113, the information registration unit 114, the processing unit 115, the output unit 116 and an input/output unit 117 are the same as in the above-described embodiment. Therefore, explanations thereof are omitted here.

(1) Display Color Managing Unit 107a

The display color managing unit 107a stores a color managing table T170 in the same manner as the display color managing unit 107 does.

The color managing table T170 is the same as that in the above-described embodiment. Therefore, explanation thereof is omitted here.

The display color managing unit 107a further stores a keyword color managing table. The keyword color managing table has an area for storing a pair of a character color and a background color.

The character color indicates the color of characters to be displayed, and the background color indicates the color of the background of the characters to be displayed.

For example, the character color is "red" and the background color is "white".

(2) Display Control Unit 112a

The display control unit 112a performs control relating to displaying of the search result and the EPG displayed on the monitor 20. The display control unit 112a also performs control relating to registration of recording schedule with specification of a program name based on the EPG and the search result displayed on the monitor 20.

The display control unit 112a displays the search result in a list form or a TV guide form based on the background color and the character color corresponding to the value of the exclusion flag stored in each registration information set stored in the search result table T160, and the first, the second and the third emphasis conditions, and the recommendation rate.

The list T180 displayed in a form of a list and the TV guide T190 displayed in a form of a TV guide are the same as those in the above-described embodiment. Therefore, explanations thereof are omitted here.

The following describes control relating display and control relating to recording schedule registration.

Control Relating to Displaying

Upon receiving a change instruction for changing a selected program from the instruction receiving unit 113, the display control unit 112a performs the same operations as the display control unit 112 described above performs.

The following separately explains the case of the list display and the case of the TV guide display.

<The Case of List Display>

Upon receiving a first search result displaying instruction for displaying a search result in a list form from the instruction receiving unit 113, the display control unit 112a obtains the current time from the clock unit 110. The display control unit 112a obtains, from the search result table T160, all the registration information sets whose exclusion flag is "0" and including a program name whose start time is later than the current time.

The display control unit 112a sorts all the obtained registration information sets by applying the sort condition and the order stored in the sort condition table T130, in the order of the priority. In other words, firstly, the display control unit 112a sorts all the registration information sets according to the recommendation rate as the key, in the descending order, and sorts the registration information sets having a common recommendation rate according to the start time as the key, in the ascending order. Furthermore, the display control unit 112a sorts the registration information sets having a common recommendation rate and star time, according to the CH number as the Key, in the ascending order.

The display control unit 112a adds numbers representing the recommendation rates to the sorted registration information set from the top to the bottom.

The display control unit 112a sets the characters to be emphasized based on the first, second and the third emphasis conditions included in the respective registration information sets.

The display control unit 112a sets the background color and the character color, based on the recommendation rate and the color managing table T170 included in the respective registration information sets.

Regarding each registration information set, the display control unit 112a judges whether the second flag included in the second emphasis condition of the search result table T160 is "1" or not.

If judging that the flag is "1", the display control unit 112a sets the character color and the background color stored in the keyword color managing table to the corresponding registration information set. If judging that the flag is "0", the display control unit 112a does not perform any operation.

The display control unit 112a generates the list T180 from all the groups including the number representing the order, the program, the start time, the end time and the CH number, based on the setting (the characters to be emphasized, the background color and the character color) in the order of the numbers, and outputs the generated list T180 to the monitor 20 via the output unit 116. At this moment, the selected program that is initially displayed is the program whose number is "1".

<The Case of TV Guide Display>

Upon receiving a second search result displaying instruction for displaying a search result in a TV guide form from the instruction receiving unit 113, the display control unit 112a further receives a target date from the user, for determining the display target. Here, the target date is a date represented by year, month and day.

The display control unit 112a obtains day of the week of the target date, using the received target date and the clock unit 110.

The display control unit 112a obtains, from the search result table T160, all the registration information sets including the program display information set of the program that is to be broadcast on the received target date and whose exclusion flag is "0".

In the same manner as the case of receiving the first search result displaying instruction, the display control unit 112a performs the sorting, the addition of the numbers indicating the recommendation rate order, the setting of the character strings to be emphasized based on the first, second and third emphasis conditions included in the registration information sets, and the setting of the background color and the character color based on the recommendation rate and the color managing table T170 included in the respective registration information sets.

Regarding each registration information set, the display control unit 112a judges whether the second flag included in the second emphasis condition of the search result table T160 is "1" or not.

If judging that the flag is "1", the display control unit 112a sets the character color and the background color stored in the keyword color managing table to the corresponding registration information set. If judging that the flag is "0", the display control unit 112a does not perform any operation.

The display control unit 112a generates the result table T192 from all the groups each including the number representing the order, the program, the start time, the end time and the CH number, based on the set information sets (the character strings to be emphasized, the background color and the character color). Then, using the generated result table T192 and the received target date and the target day of the week, the display control unit 112a generates the TV guide T190, and outputs the generate TV guide T190 to the monitor 20 via the output unit 116. The selected program that is initially displayed is the program whose number is "1".

Control Relating to Recoding Schedule Registration

This control is the same as that in the embodiment above. Therefore, explanation thereof is omitted here.

(3) Operations for List Display

The following describes only the difference from the above-described operations for the list display.

After Step S530 for list display processing shown in FIG. 17 is performed, setting processing which is described later is performed, and then Step S535 is performed.

(4) Operations for TV Guide Display

The following describes only the difference from the above-described operations for the TV guide display.

After Step S580 for TV guide display processing shown in FIG. 18 is performed, setting processing which is described later is performed, and then Step S585 is performed.

(5) Setting Processing

Figure 21:
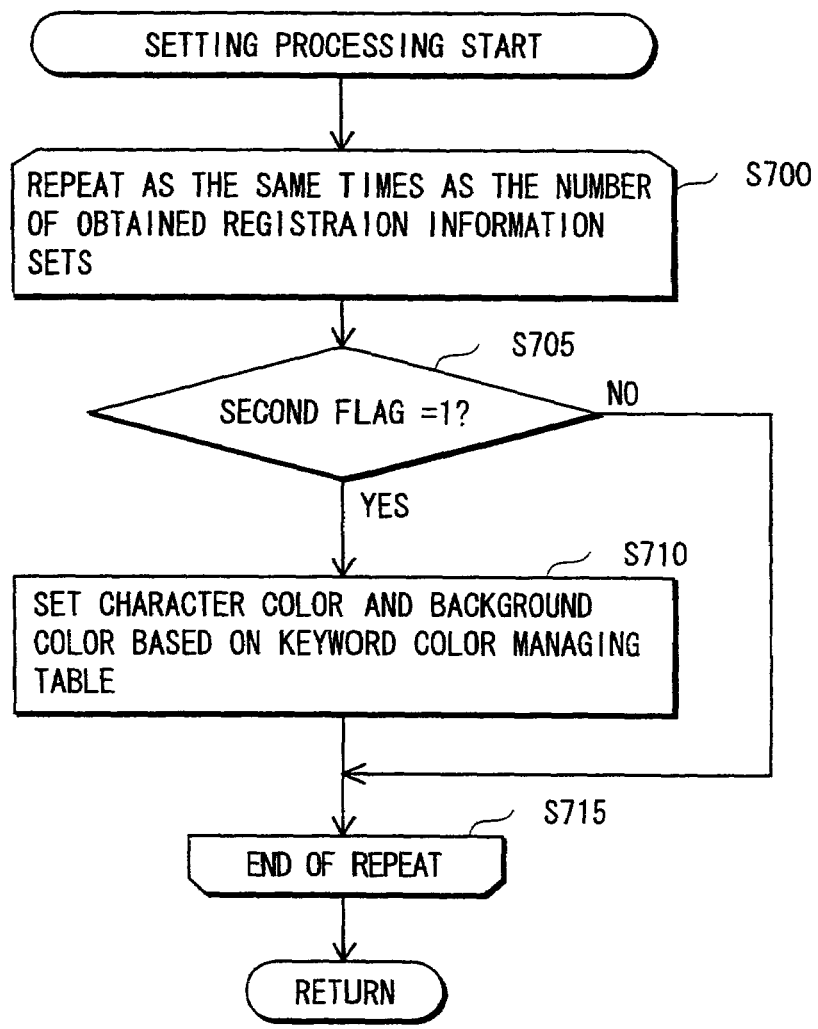
FIG. 21 is a flowchart showing operations for a setting process.

The following describes the setting processing with reference to a flowchart shown in FIG. 21.

The display control unit 112a performs repeats Step S705 to Step S715 as the same times as the number of the obtained registration information sets (Step S700).

Regarding one of the registration information sets, the display control unit 112a judges whether the second flag included in the second emphasis condition of the search result table T160 is "1" or not (Step S705).

If judging that the flag is "1" ("YES" in Step S705), the display control unit 112a sets the character color and the background color stored in the keyword color managing table to the corresponding registration information set (Step S710).

If judging that the flag is "0" ("NO" in Step S705), the processing moves to Step S715.

As a result, by repeating the above-described operations for each of the obtained registration information sets, the display control unit 112a can change the character color and the background color based on the information of the keyword color managing table when displaying the program display information set including the keyword whose effective period includes the current time.

(6) Other Modifications

In the above-described embodiment, for the list display, the setting processing is performed after Step S530 shown in FIG. 17 is performed. However, the present invention is not limited to this.

The setting processing may be performed instead of Step S530. If this is the case, the program display information set not including the keyword whose effective period includes the current time may be displayed with a background color "white" and the character color "black".

Also in the case of the TV guide display, the setting processing may be performed instead of Step S580 shown in FIG. 18.

5.2 Display with Adding Icons

In the above-described embodiment, the program display information set including a keyword whose effective period includes the current time is displayed with changing the background color and the character color. However, the present invention is not limited to this.

An icon indicating that the effective period of the keyword includes the current time may be added to the program display information set including such a keyword.

FIGS. 22, 23 24 and 25 shown examples of icons to be added.

FIG. 22 is an example of a list display to which an icon is added. In this example, the icons represent a season corresponding to the effective period. For example, FIG. 22 shows a list T180b, showing that the search is performed at 18:00 on April 2, and then the first search result displaying instruction is received. In this case, the keywords "NEW" and "SPRING" are keywords whose respective effective periods include the current time. Therefore, icons T181 and T182 each representing that an effective keyword is included are added to the "new yellow days" including the keyword "NEW" and the "spring special drama" including the keyword "SPRING" respectively.

Figure 23:
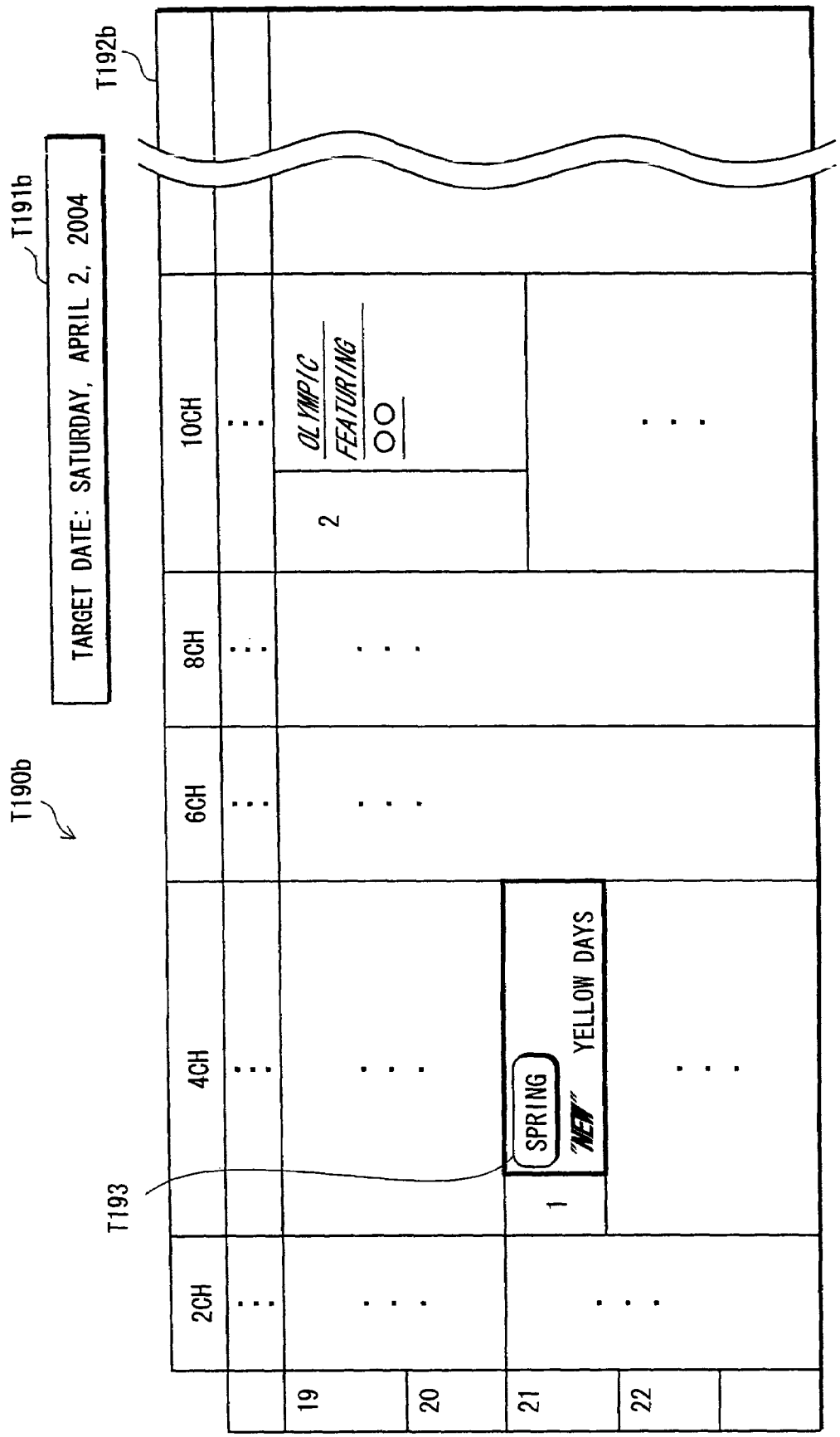
FIG. 23 shows an example of a TV guide T190b into which an icon is added.

FIG. 23 shows a list T180b, showing that the search is performed at 18:00 on April 2, and then the second search result displaying instruction is received. In this case, the keyword "NEW" is the keyword whose effective period includes the current time. Therefore, an icon T193 representing that an effective keyword is included is added to the "new yellow days" including the keyword "NEW".

An icon representing a season "spring" (hereinafter called "the first icon") is added to a keyword whose effective period is included in a period between March 1 and May 31.

An icon representing a season "summer" (hereinafter called "the second icon") is added to a keyword whose effective period is included in a period between June 1 and August 31.

An icon representing a season "autumn" (hereinafter called "the third icon") is added to a keyword whose effective period is included in a period between September 1 and November 30.

An icon representing a season "winter" (hereinafter called "the fourth icon") is added to a keyword whose effective period is included in a period between December 1 and February 29.

For example, FIG. 24A shows a list T185b, showing that the search is performed at 18:00 on July 31, and then the first search result displaying instruction is received. In this case, since the program display information set "summer holiday animation" includes a keyword "SUMMER", a second icon T200 is added to the display information set.

For example, FIG. 24B shows a list T186b, showing that the search is performed at 18:00 on October 1, and then the first search result displaying instruction is received. In this case, since the program display information set "autumn special drama" includes a keyword "AUTUMN", a third icon T201 is added to the display information set.

For example, FIG. 24C shows a list T187b, showing that the search is performed at 18:00 on December 9, and then the first search result displaying instruction is received. In this case, since the program display information set "winter special drama" includes a keyword "WINTER", a fourth icon T202 is added to the display information set.

For example, FIG. 25 shows a list T195b, showing that the search is performed at 18:00 on July 31, and then the first search result displaying instruction and a target date (Aug. 8, 2004, in this example) are received. In this case, a second icon T203 is added to the display information set "summer holiday animation".

The following describes the structure of the program search device 100b.

Figure 26:
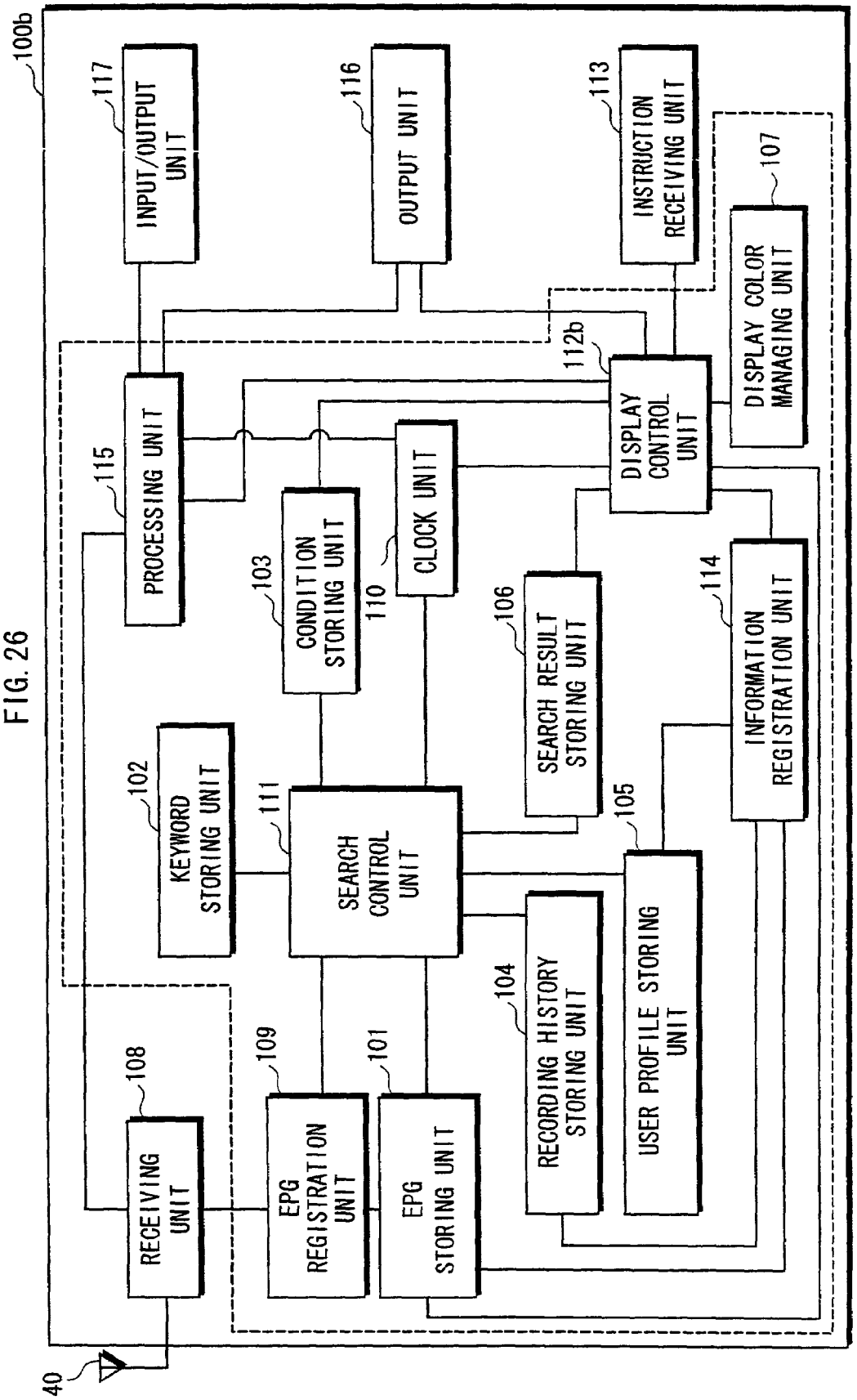
FIG. 26 is a block diagram showing a structure of a program search device 100b.

As FIG. 26 shows, the program search device 100b includes an EPG storing unit 101, a keyword storing unit 102, a condition storing unit 103, a recording history storing unit 104, a user profile storing unit 105, a search result storing unit 106, a display color managing unit 107, a receiving unit 108, an EPG registration unit 109, a clock unit 110, a search control unit 111, a display control unit 112b, an instruction receiving unit 113, an information registration unit 114, a processing unit 115, an output unit 116 and an input/output unit 117.

The program search device 100b is, specifically, a computer system structured from a microprocessor, a ROM, a RAM, a hard disk unit and so on. A computer program is stored in the ROM or the hard disk unit. The functions of the program search device 100b are realized by the microprocessor operating in accordance with the computer program.

The components other than the display control unit 112b, namely the EPG storing unit 101, the keyword storing unit 102, the condition storing unit 103, the recording history storing unit 104, the user profile storing unit 105, the search result storing unit 106, the display color managing unit 107, the receiving unit 108, the EPG registration unit 109, the clock unit 110, the search control unit 111, the instruction receiving unit 113, the information registration unit 114, the processing unit 115, the output unit 116 and the input/output unit 117 are the same as in the above-described embodiment. Therefore, explanations thereof are omitted here.

The following describes the display control unit 112b.
(1) Display Control Unit 112b The display control unit 112b performs control relating to displaying of the search result and the EPG displayed on the monitor 20. The display control unit 112b also performs control relating to registration of recording schedule with specification of a program name based on the EPG and the search result displayed on the monitor 20.

The display control unit 112b displays the search result in a list form or a TV guide form based on the background color and the character color corresponding to the value of the exclusion flag stored in each registration information set stored in the search result table T160, and the first, the second and the third emphasis conditions, and the recommendation rate.

Also, the display control unit 112b stores first, second, third and fourth icon information sets to generate first, second, third and forth icons respectively.

The following describes control relating display and control relating to recording schedule registration.
Control Relating to Displaying Upon receiving a change instruction for changing a selected program from the instruction receiving unit 113, the display control unit 112b performs the same operations as the display control unit 112 described above performs.

Upon receiving an EPG displaying instruction for displaying an EPG, the display control unit 112b performs the same operations as the display control unit described above performs.

The following separately explains the case of the list display and the case of the TV guide display.
<The Case of List Display>

Upon receiving a first search result displaying instruction for displaying a search result in a list form from the instruction receiving unit 113, the display control unit 112b obtains the current time from the clock unit 110. The display control unit 112b obtains, from the search result table T160, all the registration information sets whose exclusion flag is "0" and including a program name whose start time is later than the current time.

The display control unit 112b sorts all the obtained registration information sets by applying the sort condition and the order stored in the sort condition table T130, in the order of the priority. In other words, firstly, the display control unit 112a sorts all the registration information sets according to the recommendation rate as the key, in the descending order, and sorts the registration information sets having a common recommendation rate according to the start time as the key, in the ascending order. Furthermore, the display control unit 112b sorts the registration information sets having a common recommendation rate and star time, according to the CH number as the Key, in the ascending order.

The display control unit 112b adds numbers representing the recommendation rates to the sorted registration information set from the top to the bottom.

The display control unit 112b sets the characters to be emphasized based on the first, second and the third emphasis conditions included in the respective registration information sets.

The display control unit 112b sets the background color and the character color, based on the recommendation rate and the color managing table T170 included in the respective registration information sets.

Regarding each registration information set, the display control unit 112b judges whether the second flag included in the second emphasis condition of the search result table T160 is "1" or not.

If judging that the flag is "1", the display control unit 112b determines an icon (e.g. the first icon) to be added to the program display information set based on the current time, and obtains an icon information set (e.g. the first icon information set) to generate the determined icon. Based on the obtained icon information set, the display control unit 112b generates an icon, and adds the icon to the program display information set. If judging that the flag is "0", the control unit 112b does not perform any operation.

The display control unit 112b generates the list T180b from all the groups including the number representing the order, the program, the start time, the end time and the CH number, based on the setting (the characters to be emphasized, the background color and the character color, an icon is added to the program display information set including the keyword whose effective period includes the current time.) in the order of the numbers, and outputs the generated list T180b to the monitor 20 via the output unit 116. At this moment, the selected program that is initially displayed is the program whose number is "1".
<The Case of TV Guide Display>

Upon receiving a second search result displaying instruction for displaying a search result in a TV guide form from the instruction receiving unit 113, the display control unit 112b further receives a target date from the user, for determining the display target. Here, the target date is a date represented by year, month and day.

The display control unit 112b obtains day of the week of the target date, using the received target date and the clock unit 110.

The display control unit 112b obtains, from the search result table T160, all the registration information sets including the program display information set of the program that is to be broadcast on the received target date and whose exclusion flag is "0".

In the same manner as the case of receiving the first search result displaying instruction, the display control unit 112b performs the sorting, the addition of the numbers indicating the recommendation rate order, the setting of the character strings to be emphasized based on the first, second and third emphasis conditions included in the registration information sets, and the setting of the background color and the character color based on the recommendation rate and the color managing table T170 included in the respective registration information sets.

Regarding each registration information set, the display control unit 112b judges whether the second flag included in the second emphasis condition of the search result table T160 is "1" or not.

If judging that the flag is "1", the display control unit 112b determines an icon (e.g. the first icon) to be added to the program display information set based on the current time, and obtains an icon information set (e.g. the first icon information set) to generate the determined icon. Based on the obtained icon information set, the display control unit 112b generates an icon, and adds the icon to the program display information set. If judging that the flag is "0", the control unit 112b does not perform any operation.

The display control unit 112b generates the list T192b from all the groups including the number representing the order, the program, the start time, the end time and the CH number, based on the setting (the characters to be emphasized, the background color and the character color, an icon is added to the program display information set including the keyword whose effective period includes the current time.) in the order of the numbers. Using the generated list T192b and the received target date and the obtained day of the week, the display control unit 112b generates a TV guide T190b, and outputs the generated TV guide T190b to the monitor 20 via the output unit 116. At this moment, the selected program that is initially displayed is the program whose number is "1".

Control Relating to Recoding Schedule Registration

This control is the same as that in the embodiment above. Therefore, explanation thereof is omitted here.

(2) Setting Processing

The following describes the setting processing performed for adding an icon to the program display information set, with regard to only the difference from the setting processing shown in FIG. 21.

Here, the following operations are performed instead of Step S710.

The display control unit 112b determines an icon to be added to the program display information set based on the current time, and obtains an icon information set for generating the determined icon. The display control unit 112b generates an icon based on the obtained icon information set, and adds the generated icon to the program display information set.

As a result, by repeating the above-described operations for each of the obtained registration information sets, the display control unit 112b can add an icon representing a season within the effective period when displaying the program display information set including the keyword whose effective period includes the current time.

(3) Other Modifications

In the above described embodiment, the characters "spring", "summer", "autumn" and "winter" representing seasons are used as icons to be added to program display information sets. However, the present invention is not limited to this.

Any other characters may be used as long as they represent feeling of seasons. Also, pictures representing feeling of seasons may be used instead.

For the season representing year end and new year (e.g. 15 December to 15 January), an icon representing as such (e.g. "year") may be added to the program display information set including a keyword that is effective within the period, instead of the icon representing "winter".

Also, in the above-described embodiment, the effective periods (March 1 to May 31, June 1 to August 31, September 1 to November 30, and December 1 to February 29 respectively) corresponding to the first to fourth icons do not overlap each other. However, the present invention is not limited to this. The periods may overlap each other.

For example, the effective period corresponding to the first icon may be March 1 to June 15, and the effective period corresponding to the second period may be June 1 to August 31. If this is the case, the period from June 1 to June 15 is the overlapping period. In this case, the program search device 100b may display the first and the second icons with the program display information set including the keyword that is effective within the overlapping period. Alternatively, a priority level may be assigned to each effective period, and the icon with a higher priority level may be displayed.

In the above-described embodiment, an effective period is assigned to each season. However, the present invention is not limited to this. the effective period of a keyword may be assigned regardless of the seasons. For example, if the effective period is assigned to each month, icons representing months (e.g. If the effective period is "May", an icon representing "May") may be displayed.

When the end of the effective period of a keyword approaches, a message representing that the end of the effective period approaches (e.g. "Close to the end of the effective period") may be displayed with the icon. Alternatively, when the end of the effective period of a keyword approaches, the icon may be displayed with being colored with a warning color (e.g. red). Here, for example, when the effective period becomes not effective within three days, it is assumed that the end of the effective period of a keyword approaches.

Regarding the effective period corresponding to a season of baseball and the season of reformation of programs, an icon representing relative meanings may be displayed. For example, an icon representing a bat and a ball may be displayed.

Also, when setting effective periods of keywords, the user may associate a favorite icon to the effective period. Such an icon may be selected from icons prestored in the program search device, or may be created by the user.

5.3 Displaying of Program Display Information Set of Regular Program and Program Display Information Set of Recording-Scheduled Program In the above-described embodiment, the program included in the registration information set whose exclusion flag is 1 is not displayed. In other words, the program display information set of the regular program and the program display information set of the recording-scheduled program are not displayed. However, the present invention is not limited.

The program search device may display the program included in the registration information set whose exclusion flag is 1 in distinction from specific program contents (special program contents and new program contents).

The following describes a structure of a program search device 100c for such a case.

Figure 27:
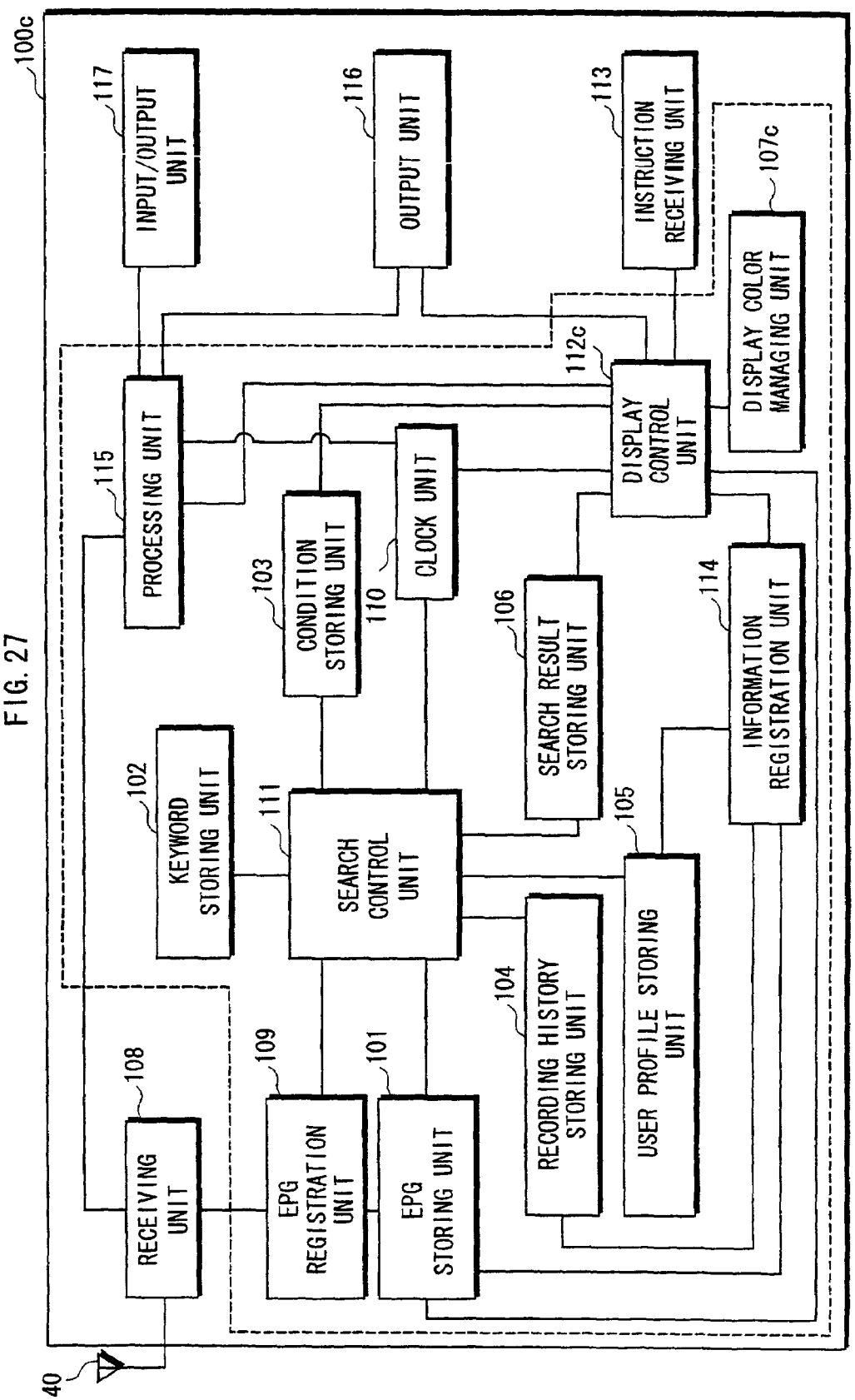
FIG. 27 is a block diagram showing a structure of a program search device 100c.

As FIG. 27 shows, the program search device 100c includes an EPG storing unit 101, a keyword storing unit 102, a condition storing unit 103, a recording history storing unit 104, a user profile storing unit 105, a search result storing unit 106, a display color managing unit 107c, a receiving unit 108, an EPG registration unit 109, a clock unit 110, a search control unit 111, a display control unit 112c, an instruction receiving unit 113, an information registration unit 114, a processing unit 115, an output unit 116 and an input/output unit 117.

The program search device 100c is, specifically, a computer system structured from a microprocessor, a ROM, a RAM, a hard disk unit and so on. A computer program is stored in the ROM or the hard disk unit. The functions of the program search device 100c are realized by the microprocessor operating in accordance with the computer program.

The components other than the display color managing unit 107c and the display control unit 112c, namely the EPG storing unit 101, the keyword storing unit 102, the condition storing unit 103, the recording history storing unit 104, the user profile storing unit 105, the search result storing unit 106, the receiving unit 108, the EPG registration unit 109, the clock unit 110, the search control unit 111, the instruction receiving unit 113, the information registration unit 114, the processing unit 115, the output unit 116 and an input/output unit 117 are the same as in the above-described embodiment. Therefore, explanations thereof are omitted here.

(1) Display Color Managing Unit 107c

The display color managing unit 107c stores a color managing table T170 in the same manner as the display color managing unit 107 does.

The color managing table T170 is the same as that in the above-described embodiment. Therefore, explanation thereof is omitted here.

The display color managing unit 107c further stores an exclusion program color managing table. The exclusion program color managing table has an area for storing a pair of a character color and a background color.

The character color indicates the color of characters to be displayed, and the background color indicates the color of the background of the characters to be displayed.

For example, the character color is "red" and the background color is "white".

(2) Display Control Unit 112c

The display control unit 112c performs control relating to displaying of the search result and the EPG displayed on the monitor 20. The display control unit 112c also performs control relating to registration of recording schedule with specification of a program name based on the EPG and the search result displayed on the monitor 20.

The display control unit 112c displays the search result in a list form or a TV guide form based on the background color and the character color corresponding to the value of the exclusion flag stored in each registration information set stored in the search result table T160, and the first, the second and the third emphasis conditions, and the recommendation rate.

The list T180 displayed in a form of a list and the TV guide T190 displayed in a form of a TV guide are the same as those in the above-described embodiment. Therefore, explanations thereof are omitted here.

The following describes control relating display and control relating to recording schedule registration.

Control Relating to Displaying

Upon receiving a change instruction for changing a selected program from the instruction receiving unit 113, the display control unit 112c performs the same operations as the display control unit 112 described above performs.

Upon receiving the EPG displaying instruction for displaying an EPG, the display control unit 112c performs the same operations as the display control unit 112 described above performs.

The following separately explains the case of the list display and the case of the TV guide display.

<The Case of List Display>

Upon receiving a first search result displaying instruction for displaying a search result in a list form from the instruction receiving unit 113, the display control unit 112c obtains the current time from the clock unit 110. The display control unit 112c obtains, from the search result table T160, all the registration information sets whose exclusion flag is "0" and including a program name whose start time is later than the current time.

The display control unit 112c sorts all the obtained registration information sets by applying the sort condition and the order stored in the sort condition table T130, in the order of the priority. In other words, firstly, the display control unit 112c sorts all the registration information sets according to the recommendation rate as the key, in the descending order, and sorts the registration information sets having a common recommendation rate according to the start time as the key, in the ascending order. Furthermore, the display control unit 112c sorts the registration information sets having a common recommendation rate and star time, according to the CH number as the Key, in the ascending order. Here, the recommendation rate included in the registration information set whose exclusion flag is 1 is set to be 0.

The display control unit 112c adds numbers representing the recommendation rates to the sorted registration information set from the top to the bottom.

The display control unit 112c sets the characters to be emphasized based on the first, second and the third emphasis conditions included in the respective registration information sets.

The display control unit 112c sets the background color and the character color, based on the recommendation rate and the color managing table T170 included in the respective registration information sets.

Regarding each registration information set, the display control unit 112c judges whether the second flag included in the second emphasis condition of the search result table T160 is "1" or not.

If judging that the flag is "1", the display control unit 112c sets the character color and the background color stored in the exclusion program color managing table to the corresponding registration information set. If judging that the flag is "0", the display control unit 112c does not perform any operation.

The display control unit 112c generates the list T180 from all the groups including the number representing the order, the program, the start time, the end time and the CH number, based on the setting (the characters to be emphasized, the background color and the character color) in the order of the numbers, and outputs the generated list T180 to the monitor 20 via the output unit 116. At this moment, the selected program that is initially displayed is the program whose number is "1".

<The Case of TV Guide Display>

Upon receiving a second search result displaying instruction for displaying a search result in a TV guide form from the instruction receiving unit 113, the display control unit 112c further receives a target date from the user, for determining the display target. Here, the target date is a date represented by year, month and day.

The display control unit 112c obtains day of the week of the target date, using the received target date and the clock unit 110.

The display control unit 112c obtains, from the search result table T160, all the registration information sets including the program display information set of the program that is to be broadcast on the received target date and whose exclusion flag is "0".

In the same manner as the case of receiving the first search result displaying instruction, the display control unit 112c performs the sorting, the addition of the numbers indicating the recommendation rate order, the setting of the character strings to be emphasized based on the first, second and third emphasis conditions included in the registration information sets, and the setting of the background color and the character color based on the recommendation rate and the color managing table T170 included in the respective registration information sets.

Regarding each registration information set, the display control unit 112c judges whether the second flag included in the second emphasis condition of the search result table T160 is "1" or not.

If judging that the flag is "1", the display control unit 112c sets the character color and the background color stored in the exclusion program color managing table to the corresponding registration information set. If judging that the flag is "0", the display control unit 112c does not perform any operation.

The display control unit 112c generates a result table T222, which is described later, from all the groups each including the number representing the order, the program, the start time, the end time and the CH number, based on the set information sets (the character strings to be emphasized, the background color and the character color). Then, using the generated result table T222 and the received target date and the target day of the week, the display control unit 112c generates the TV guide T220, and outputs the generate TV guide T220 to the monitor 20 via the output unit 116. The selected program that is initially displayed is the program whose number is "1".

Control Relating to Recoding Schedule Registration

This control is the same as that in the embodiment above. Therefore, explanation thereof is omitted here.

(3) Operations for List Display

The following describes only the difference from the above-described operations for the list display.

After Step S530 for list display processing shown in FIG. 17 is performed, setting processing of an exclusion program which is described later is performed, and then Step S535 is performed.

(4) Operations for TV Guide Display

The following describes only the difference from the above-described operations for the TV guide display.

After Step S580 for TV guide display processing shown in FIG. 18 is performed, setting processing of an exclusion program which is described later is performed, and then Step S585 is performed.

(5) Setting Processing of Exclusion Program

Figure 28:
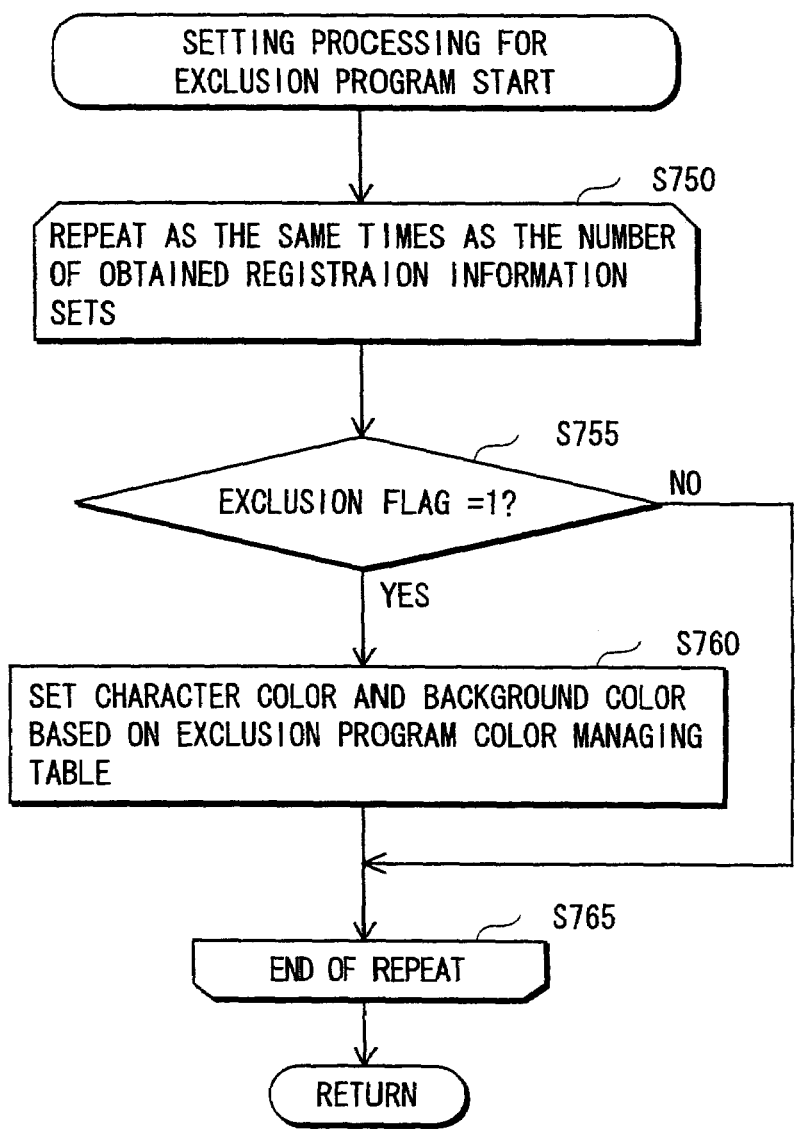
FIG. 28 is a flowchart showing operations for setting programs to be excluded.

The following describes the setting processing of exclusion program with reference to a flowchart shown in FIG. 28.

The display control unit 112c performs repeats Step S755 to Step S765 as the same times as the number of the obtained registration information sets (Step S750).

Regarding one of the registration information sets, the display control unit 112c judges whether the second flag included in the second emphasis condition of the search result table T160 is "1" or not (Step S755).

If judging that the flag is "1" ("YES" in Step S755), the display control unit 112c sets the character color and the background color stored in the exclusion program color managing table to the corresponding registration information set (Step S760).

If judging that the flag is "0" ("NO" in Step S755), the processing moves to Step S765.

As a result, by repeating the above-described operations for each of the obtained registration information sets, the display control unit 112c can change the character color and the background color based on the information of the exclusion program color managing table when displaying the program display information set of the exclusion program.

(6) Specific Example of Displaying

The following describes a specific example of list display and TV guide display, using the search result table T160 of the above-described embodiment shown in FIG. 7.

FIG. 29 shows a list T210 generated using the search result table T160.

In the list T210, the program display information set of a regular program "MHK special" and the program display information set including the program name that is scheduled to be recorded ""REPEAT" comedy special" are displayed using black as the background color and white as the character color.

FIG. 30 is a TV guide T220 generated using the search result table T160.

A target date filed T221 in the TV guide T220 represents that the target date is "Apr. 2, 2004". In this case, in the result table T221, the program display information set of the regular program "MHK special" is to be displayed using black as the background color and white as the character color.

(7) Other Modifications (7-1) In the description above, the program search device 100c displays all the programs in a form of a list if a plurality of the same program display information sets are included in the search result table T160. However, the present invention is not limited to this.

If a plurality of the same program display information sets exist, the program search device 100c may display one of the same program display information sets, and the start time, the end time and the CH number relating to the program display information set. In the modification above, the program display information set "MHK special" to be started at "21:00, Apr. 2, 2004" and the program display information set "MHK special" to be started at "21:00, Apr. 3, 2004" are displayed in a form of a list. In this modification, for example, the program search device 100c displays "MHK special" to be started at "21:00, Apr. 2, 2004" and the start time "21:00, Apr. 2, 2004", the end time "21:50, Apr. 2, 2004" and the CH number "2" relating to the program display information set.

Also, the program search device 100c may display a broadcast frequency of the program display information set, together with one of the same program display information sets, and the start time, the end time and the CH number relating to the program display information set.

Here, the broadcast frequency represents a cycle of a regular program. For example, the broadcast frequency indicates that the regular program is broadcast "everyday", "once in a week", "from Monday to Friday", or the like.

If this is the case, the program search device 100c searches for an exclusion program from the search result table T160 by performing the search from top to bottom. If one exclusion program is found by the search, the program search device 100c searches for a registration information set including the same program display information set in the following procedures. If two or more exclusion programs are found by the search, the program search device 100c calculates the broadcast frequency based on the start time of the exclusion program firstly found by the search and the start times of the exclusion programs relating to the same program display information sets found later. The program search device 100c displays the broadcast frequency in a list form together with the exclusion programs to be displayed.

Also in the case of the TV guide display, the broadcast frequency may be displayed together with the program display information sets of the regular program.

In this modification, the program search device 100c displays a broadcast frequency of the program display information set, together with one of the same program display information sets, and the start time, the end time and the CH number relating to the program display information set. However, the present invention is not limited to this. The program search device 100c may display the broadcast frequencies of all the program display information sets, together with all the same program display information sets, and the start times, the end times and the CH numbers relating to the program display information sets respectively.

(7-2) In the modification above, the program display information set of the regular program and the program display information set of the recording-scheduled program are displayed without emphasis. However, the present invention is not limited to this.

The program search device 100c may display the program display information set of the regular program and the program display information set of the recording-scheduled program with emphasis.

The following describes the differences from the emphasis processing shown in FIG. 15 and FIG. 16.

After performing Step S320 shown in FIG. 15, the program search device 100c executes Step S330 and later. In other words, the program search device 100c does not execute Step S325.

After performing Step S380 shown in FIG. 15, the program search device 100c executes Step S390 and later. In other words, the program search device 100c does not execute Step S385.

After performing Step S415 shown in FIG. 16, the program search device 100c executes Step S425 and later. In other words, the program search device 100c does not execute Step S420.

(7-3) In the modification above, the background color and the character color used when displaying the program display information set of the regular program and the program display information set of the recording-scheduled program are black and white respectively. However, the present invention is not limited to this. The background color and the character color used when displaying the program display information set of the regular program and the program display information set of the recording-scheduled program may be any color as long as they are different from those for the program display information set of the special program.

6. Modifications of Searching

The following describes modifications of searching.

Program contents are broadcast in a different manner for every country. For example, in some countries, broadcast prohibited periods are provided by law. In the broadcast prohibited period, program contents are usually not broadcast. To broadcast a program contents in the prohibited period, the broadcast is required to obtain permission. After obtaining permission, the broadcaster can broadcast such a special program.

The following describes a program search device 100d that broadcast a special program content that is broad cast in the above-described broadcast prohibited period, in addition to the searching method of the above-described embodiment.

Figure 31:
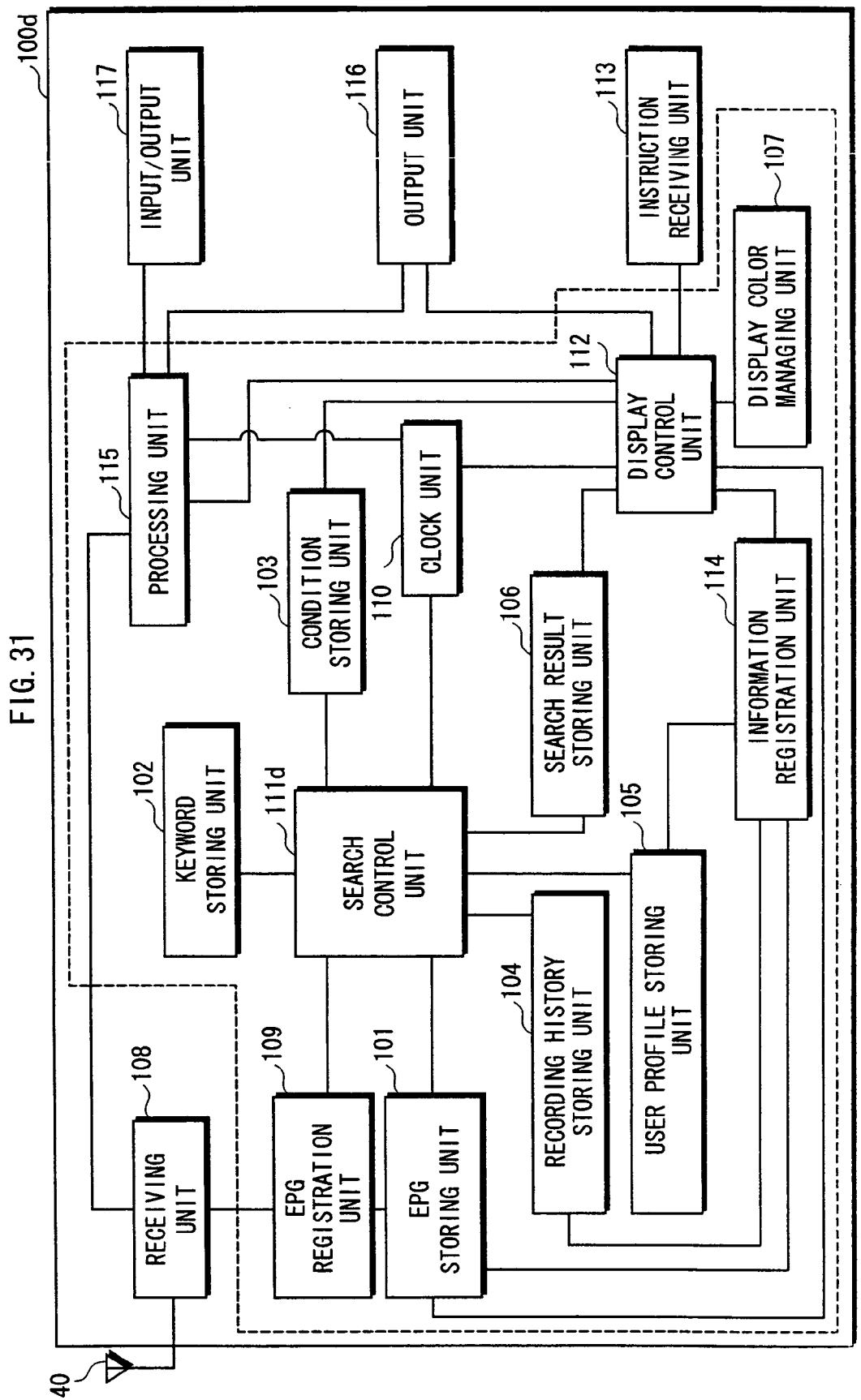
FIG. 31 is a block diagram showing a structure of a program search device 100d.

As FIG. 31 shows, the program search device 100d includes an EPG storing unit 101, a keyword storing unit 102, a condition storing unit 103, a recording history storing unit 104, a user profile storing unit 105, a search result storing unit 106, a display color managing unit 107, a receiving unit 108, an EPG registration unit 109, a clock unit 110, a search control unit 111d, a display control unit 112, an instruction receiving unit 113, an information registration unit 114, a processing unit 115, an output unit 116 and an input/output unit 117.

The program search device 100d is, specifically, a computer system structured from a microprocessor, a ROM, a RAM, a hard disk unit and so on. A computer program is stored in the ROM or the hard disk unit. The functions of the program search device 100d are realized by the microprocessor operating in accordance with the computer program.

The components other than the search control unit 111d, namely the EPG storing unit 101, the keyword storing unit 102, the condition storing unit 103, the recording history storing unit 104, the user profile storing unit 105, the search result storing unit 106, the display color managing unit 107, the receiving unit 108, the EPG registration unit 109, the clock unit 110, the display control unit 112, the instruction receiving unit 113, the information registration unit 114, the processing unit 115, the output unit 116 and an input/output unit 117 are the same as in the above-described embodiment. Therefore, explanations thereof are omitted here.

The search control unit 111d extracts, from keyword managing table T100, one or more keywords to be used for a search. Then, the search control unit 111d detects the specific program display information sets from the program information sets included in the EPG, by performing search using the extracted keywords. Moreover, the search control unit 111d extracts, from the detected one or more program display information sets, a program display information set to be excluded from the target of displaying, calculates the recommendation rate of the program content indicated by the excluded program display information set, extracts emphasis characters, and then writes the results in the search result table T160.

Furthermore, the search control unit 111d judges whether the program content is broadcast in the broadcast prohibited period. If judging affirmatively, the search control unit 111d considers the program content as a specific program content, and then, obtains the specific program display information set of the specific program content, calculates the recommendation rate, extracts emphasis characters. Then, the search control unit 111d writes the results in the search result table T160.

The search control unit 111d stores a work table T161 in the same manner as in the above-described embodiment.

The search control unit 111 has an exclusion program storing area for storing one or more excluded program display information recorded sets in the search result table T160.

The search control unit 111d has a country ID storing area for storing a country ID identifying the country where the program search device 100d is used.

Also, as FIG. 32 shows, the search control unit 111d pre-stores a broadcast prohibited time table T300. The broadcast prohibited time table t300 includes areas for storing one or more groups of the country ID, the CH number and a time period. The country ID is an identifier identifying the country. The CH number represents a CH number. The time period represents the broadcast prohibited time period. Note that each group including the country ID, the CH number and the time period is hereinafter called the time period information set.

For example, a period "12:00-16:00" is the prohibited period corresponding to the CH number "2" of the country A identified by the country ID "1".

The search control unit 111*d* has a search flag in the same manner as in the above-described embodiment. The explanation thereof is omitted here.

Upon receiving a search instruction from the EPG registration unit 109, the search control unit 111*d* obtains current time from the clock unit 110.

Using the obtained current time and the effective periods respectively corresponding to the search keywords, the search control unit 111*d* obtains, from the keyword managing table T100 stored in the keyword storing unit 102, all the keywords whose effective period includes the current time, in other words, all the keywords that can be used for the search. The search control unit 111*d* judges whether a search has already been performed or not. In other words, the search control unit 111 judges whether the search flag is "0" or "1".

<The Case where the Search Flag is "0">

In the same manner as described in the embodiment above, the search control unit 111*d* firstly extracts the registration information set using the search keyword, and extracts the program display information set of the exclusion program based on the two exclusion conditions.

Next, the search control unit 111*d* reads the country ID from the country ID storing area, and obtains one or more time period information sets including the country ID that is the same as the obtained country ID.

Using the EPG, the search control unit 111*d* searches for a program information set of a program content broadcast at/in the CH number and the time period included in one of the obtained time period information sets. If a program information set is found by the search, the search control unit 111*d* extracts a group of the program display information set, the start time, the end time and the CH number included in the program information set found by the search. Then, the search control unit 111*d* writes the extracted group into the corresponding fields of the work table T161. Furthermore, the search control unit 111*d* writes a value "0" as values of the first flag, the second flag, the third flag and the exclusion flag. The search control unit 111*d* performs these operations for each time period information set.

Next, the search control unit 111*d* calculates the recommendation rate and extracts the character string to be displayed with emphasis, in the same manner as in the above-described embodiment.

The search control unit 111*d* registers the contents of the work table T161 in the search result table T160. In other words, the search control unit 111*d* replaces the contents of the search result table T160 with the contents of the work table T161.

Further, the search control unit 111*d* deletes the contents of the work table T161.

<The Case where the Search Flag is "1">

In the same manner as described in the embodiment above, the search control unit 111*d* firstly extracts the registration information set using the search keyword, and extracts the program display information set of the exclusion program based on the two exclusion conditions.

Next, the search control unit 111*d* reads the country ID from the country ID storing area, and obtains one or more time period information sets including the country ID that is the same as the obtained country ID.

Using the EPG, the search control unit 111*d* searches for a program information set of a program content broadcast at/in the CH number and the time period included in one of the obtained time period information sets. If a program information set is found by the search, the search control unit 111*d* extracts a group of the program display information set, the start time, the end time and the CH number included in the program information set found by the search. Then, the search control unit 111*d* writes the extracted group into the corresponding fields of the work table T161. Furthermore, the search control unit 111*d* writes a value "0" as values of the first flag, the second flag, the third flag and the exclusion flag. The search control unit 111*d* performs these operations for each time period information set.

Next, the search control unit 111*d* calculates the recommendation rate and extracts the character string to be displayed with emphasis, in the same manner as in the above-described embodiment.

The search control unit 111*d* registers the contents of the work table T161 in the search result table T160. In other words, the search control unit 111*d* replaces the contents of the search result table T160 with the contents of the work table T161.

Further, the search control unit 111*d* deletes the contents of the work table T161.

(2) Search Processing

The following describes only the differences from the search processing shown in FIG. 11.

After performing Step S40 or Step S65 for the search processing shown in FIG. 11, the search control unit 111*d* performs search processing within the broadcast prohibited time period described later, and then performs Step S70.

(3) Search Processing within Broadcast Prohibited Time Period

Figure 33:
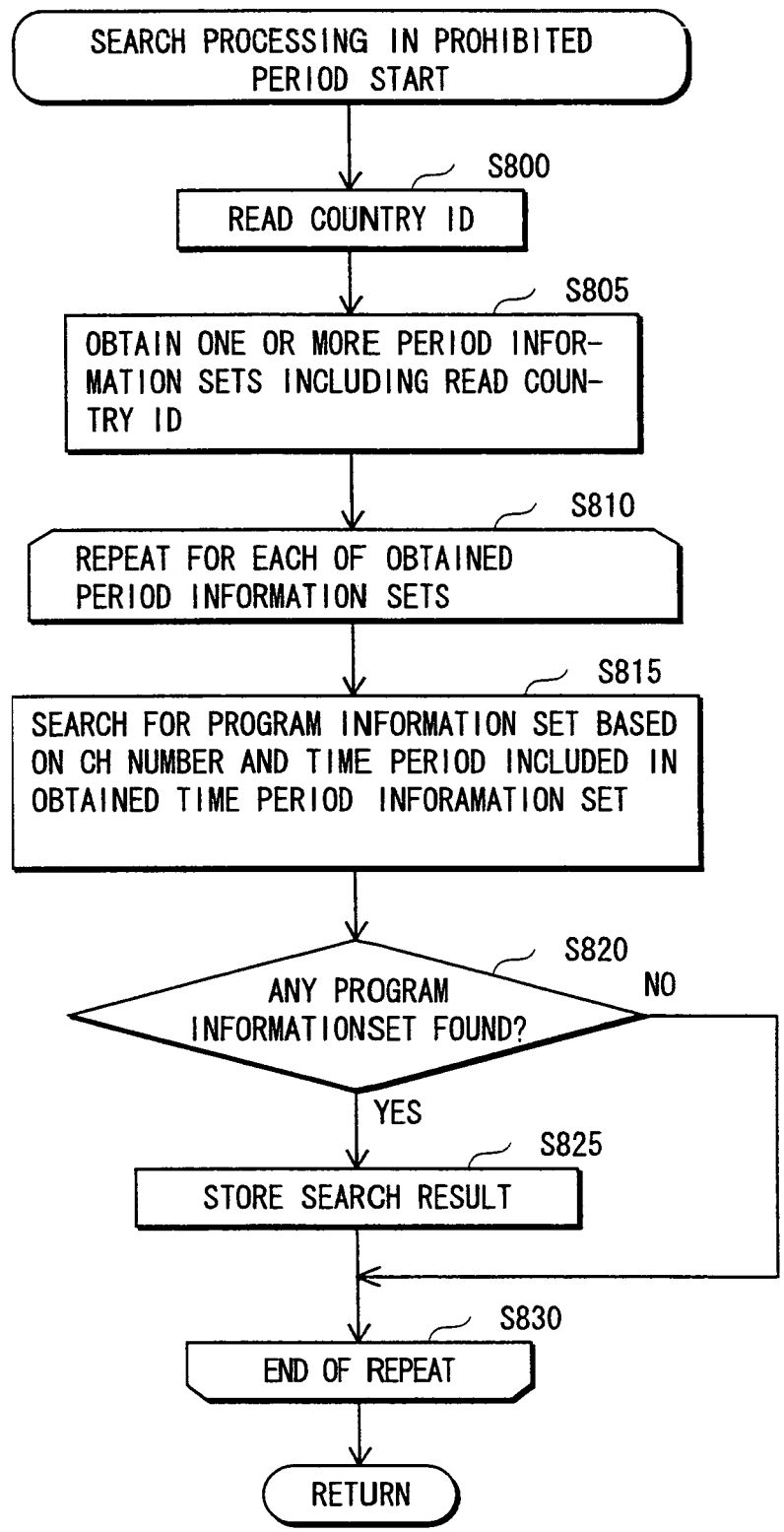
FIG. 33 is a flowchart showing operations for searching within a time slot that is a broadcast prohibition period.

The following describes the search processing within the broadcast prohibited time period, with reference a flowchart shown in FIG. 33.

The search control unit 111*d* reads the country ID from the country ID storing area (Step S800), and obtains one or more time period information sets including the country ID that is the same as the obtained country ID (Step S805).

The search control unit 111*d* repeats Step S815 to Step S830 for each of the obtained time period information sets (Step S810).

Using the EPG, the search control unit 111*d* searches for a program information set of a program content broadcast at/in the CH number and the time period included in the obtained time period information set (Step S815).

The search control unit 111*d* judges whether a program information set is found by the search performed in Step S815 (Step S820).

If judging that a program information set is found by the search ("YES" in Step S820), the search control unit 111*d* extracts a group of the program display information set, the start time, the end time and the CH number included in the program information set found by the search. Then, the search control unit 111*d* writes the extracted group into the corresponding fields of the work table T161. Furthermore, the search control unit 111*d* writes a value "0" as values of the first flag, the second flag, the third flag and the exclusion flag. The search control unit 111*d* performs these operations for each time period information set (Step S825).

If judging that a program information set is not found by the search ("NO" in Step S820), the search control unit 111*d* performs Step S830.

(4) Other Modifications

In the above-described embodiment, the country ID is used. However, the present invention is not limited to this. A country name may be used instead of the country ID. In other words, the program search device 100d may prestore country names, and the broadcast prohibited time table T300 stores one or more groups each including the country name, the CH number and the time period.

Also, the search processing within the broadcast prohibited time period may be performed by using a program search device exclusively the each country. For example, a program search device dedicated to a country corresponding to a country ID "1" stores one or more groups (time period information sets) including the CH number and the time period corresponding to the country ID "1" among a plurality of time period information sets indicated by the broadcast prohibited time table T300. After extracting programs to be excluded from the display target, the program search device performs search processing within the broadcast prohibited time period, using one or more of the stored time period information sets.

7. Other Modifications

The present invention is described above based on the embodiment and the modifications. However, the present invention is not limited to the embodiment and the modifications. The following cases are also included in the present invention.

(1) In the above-described embodiment, the program search device 100 performs both the search for the specific program and the displaying of the search result. However, the present invention is not limited to this. The search for the specific program may be performed by a server device, and the displaying of the search result may be performed by the server device and a terminal device (e.g. a mobile phone) connected to the server device via a network.

If this is the case, the server device stores the search result. The terminal device transmits the first search result displaying instruction and the second search result displaying instruction to the server device. The terminal device transmits the target date to the server device, together with the first search result displaying instruction and the second search result displaying instruction.

Upon receiving the first search result displaying instruction, the server device generates the list T180 in the same manner as in the above-described embodiment, and transmits the generated list T180 to the terminal device. Upon receiving the list T180 from the server device, the terminal device displays the received list T180.

Upon receiving the second search result displaying instruction and the target date from the terminal device, the server device generates the TV guide T190 in the same manner as in the above-described embodiment, and transmits the generated TV guide T190 to the terminal device. Upon receiving the TV guide T190 from the server device, the terminal device displays the received TV guide T190.

(2) The program search device 100 may be able to register search keywords in accordance with the user's instruction. Alternatively, the program search device 100 may be able to be connected to a network, and register the search keywords received from an external device via the network.

Also, the program search device 100 may be able to register exclusion conditions in accordance with the user's instruction. Alternatively, the program search device 100 may be able to be connected to a network, and register the exclusion conditions received from an external device via the network.

Also, the program search device 100 may be able to register sort conditions and priorities in accordance with the user's instruction. Alternatively, the program search device 100 may be able to be connected to a network, and register the sort conditions and the priorities received from an external device via the network.

(3) In the above-described embodiment, the recommendation rate corresponding to the program display information set to be displayed is calculated using the user profile T150, and the calculated recommendation rate is stored. However, the present invention is not limited to this. The program search device 100 may be able to connected to a network such as the Internet, receive the recommendation rate corresponding to the program display information set to be displayed from an external device via the network, and stores the received recommendation rate.

When transmitting an EPG, the broadcast device 10 may adds a recommendation rate corresponding to the program information set included in the EPG to be transmitted. In this case, the program search device 100 stores the received program information set and the recommendation rate in association with each other, in the EPG storing unit 101, and when storing the recommendation rate in the search result table T160, the program search device 100 obtains the recommendation rate corresponding to the program information set including the program display information set to be displayed, and stores the obtained recommendation rate as the recommendation rate corresponding to the program display information set to be displayed.

(4) In the above-described embodiment, the searches performed the second time or later are performed using the program information sets for one week's worth. However, the present invention is not limited to this. The searches performed the second time and later may be performed using the program information sets for two weeks' worth in the same manner as the search performed the first time.

(5) The genre of the program content corresponding to the program display information set to be displayed may be added to the emphasis condition. If this is the case, the program search device 100 receives the genre to be the emphasis condition in accordance with the user's instruction.

The CH number may be added to the exclusion condition. If this is the case, the program search device 100 receives the CH number to be the exclusion condition in accordance with the user's instruction.

(6) In the above-described embodiment, the program information set for two weeks' worth beginning with that of the date when the search is performed is used for the search performed the first time. However, the present invention is not limited to this.

The program information set for two weeks' worth may include the program information set for one week's worth in the past one week, and the program information set for one week's worth in the feature.

(7) The program information sets for two cycles' worth may be used for the search performed the first time, and the program information sets for one week's worth may be used for the search performed the second time and later. Here, the "cycle" means a cyclic period in which the program content corresponding to the program display information set including the program name of a program periodically broadcast. For example, if a program content is broadcast everyday, the cycle is one day, and if a program content is broadcast once in a week, the cycle is one week. If a program content is broadcast twice in a day, the cycle is a half day. In the above-described embodiment, the cycle is one week.

(8) In the above described embodiment, the specific program display information set is searched for every time the program search device 100 receives the EPG from the broadcast device 10. However, the present invention is not limited to this. The program search device 100 may receive an instruction to start a search input by the user.

(9) In the above-described embodiment, the search for the specific program display information set is performed for the program information sets of all the broadcast stations. However, the present invention is not limited to this. The search for the specific program display information set may be separately performed for each broadcast station.

(10) In the above-described embodiment, in the searches performed the second time and later, the search control unit 111 obtains all the program display information sets whose exclusion flag is "1" from the search result table T160, and stores the obtained program display information sets in the exclusion program storing area. However, the search control unit 111 may store only the program names included in the obtained program display information sets, in the exclusion program storing area. If this is the case, the search control unit 111 judges whether a program display information set that is the same as any of the program display information sets stored in the exclusion program storing area exists or not, using the program names included in the program display information sets obtained from the EPG.

(11) In the above-described embodiment, the program contents and the EPG are obtained from the broadcast wave. However, the present invention is not limited to this. The program search device 100 and the broadcast device 10 may be connected with each other via a network, and the program search device 100 may receive the program contents and the EPG from the broadcast device 10 via the network.

(12) In this embodiment, part or all the function blocks surrounded by dashed lines in FIG. 2, FIG. 20, FIG. 26 and FIG. 27 and FIG. 31 may be realized by an LSI, which is a large-scale integrated circuit. Each of the function blocks may be individually realized as one-chip circuits. Alternatively, part or all of the function blocks may be realized as a one-chip circuit.

Note that though LSI is used as an integrated circuit for controlling the program search device, the circuit may be variously described as IC, system LSI, super LSI or ultra LSI depending on the level of integration.

Note also that the technique used to make an integrated circuit for the encryption device 200 does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

(13) In the above-described embodiment, each of the search keywords shown in FIG. 3 is just an example. Any search keywords may be used as long as they are included in the program information set of a specific program content.

For example, a keyword "extravaganza" may be used as the search keyword. The effective period of the keyword "extravaganza" is, for example, "April 1 to April 15", "July 1 to July 15", "October 1 to October 15" and "January 1 to January 15".

(14) A time may be added to the effective period in the above-described embodiment. For example, the effective period of the search keyword "roundup" may be "4:00, December 1 to 24:00 December 31".

(15) The effective period "unspecified" of search keywords in the above-described embodiment may mean the same as "January 1 to December 31".

(16) In the present invention, the idea of the exact match retrieval is included in the idea of the partial match retrieval.

(17) In the above-described embodiment, the duplicate programs are searched with use of the EPG including program information sets for two weeks' worth. However, the present invention is not limited to this. An EPG including program information sets for three weeks' worth may be used.

(18) In the above-described embodiment, among the repeat programs, the recording-scheduled programs are excluded. However, the present invention is not limited to this. Whether to exclude the program may be determined based only on whether the program is the recording-scheduled program or not, or only on whether the program is the repeat program or not.

(19) In the above-described embodiment, only the program display information sets of the specific programs are displayed. However, the present invention is not limited to this.

Only the program display information sets of the regular programs may be displayed. If this is the case, the program search device extracts and displays the program display information sets whose exclusion flag is "1"

As a modification of the item 5.3 described above, the program display information set not found by the keyword search may be added to what is to be displayed. To make it possible for the user to recognize that the program display information set belongs the program not found by the search, the background color and the character color of such a program display information set is set to be different from that of the other program display information sets (found by the keyword search).

(20) The present invention may be the methods indicated above. Further, these methods may be a computer program executed by a computer and further be the digital code of the computer program.

Further, the present invention may be the above-mentioned computer program and the digital code recorded onto a recording medium that can be read by a computer. Examples of such recording media include, flexible disk, hard disk, CD-ROM, MO, DVD, DVD-ROM, DVD-RAM, BD (Blu-ray Disc), semiconductor memory and the like.

Further, the present invention may be realized such that the computer program and the digital code are transmitted across telecommunications networks, wired and wireless, such as the Internet and the like.

Further, the present invention may be a computer system having a microprocessor and a memory, the memory holding the above-mentioned computer program and the microprocessor performing operations according to the computer program.

Further, the computer program and the digital code may be installed on an independent computer system by either recording the digital code one of the recording medium and transferring the recording medium, or transferring the computer program and digital code via one of the networks.

(21) The present invention may include various combinations of the embodiment and the modifications.

INDUSTRIAL APPLICABILITY

The program search device described above can be used for business purposes i.e., can be used repeatedly and continuously, in the industry where the program search device is manufactured and sold.

The invention claimed is:

1. A program search device that searches for broadcast programs corresponding to a current time from an electronic program guide, the program search device comprising:
a program guide storing unit that prestores an electronic program guide comprising one or more program display information sets, each of the program display information sets indicating a broadcast program that is a regular program or a special program;
a keyword storing unit that prestores one or more extraction keywords, which are at least included in a program display information set that shows the special program and are used for detecting at least one program from the electronic program guide, together with an effective period information set, corresponding to each extraction keyword, that indicates an effective period represented by months and dates in which an extraction keyword is available for use in a program search and based on the effective period in the program display information set that shows when the special program will be broadcast;
a time obtaining unit operable to obtain a current time upon receipt of a search start instruction;
a search control unit operable to:
read extraction keywords corresponding to the effective period information set that shows the effective period that includes the obtained current time, from the keyword storing unit, and not read any extraction keywords corresponding to a different effective period information set that shows an effective period that does not include the obtained current time;
detect, from the electronic program guide, one or more program display information sets that include the read extraction keyword; and
extract, from among the detected program display information sets, each of the program display information sets that indicates the regular program, as a regular program display information set, and each of the program display information sets that indicates the special program, as a special program display information set;
an excluding unit operable to exclude the regular program display information set extracted by the search control unit; and
a program name storing unit that prestores a recording-scheduled program name for a recording that has been scheduled by a user, wherein
keywords corresponding to future effective periods remain in the keyword storing unit,
the search control unit further searches for the program display information set indicated by the recording-scheduled program name stored in the program name storing unit within the detected program display information sets, and obtains the found program display information set as a recording-scheduled program display information set, and
the excluding unit further excludes the recording-scheduled program display information set obtained by the search control unit.

2. The program search device of claim 1, wherein
the regular program indicated by the regular program display information set is broadcast in cycles,
the electronic program guide includes one or more program display information sets each indicating a program broadcast in the cycles,
the regular program display information set is a program display information set of a program redundantly broadcast in the cycles, and
the search control unit searches for redundant program display information sets from the detected one or more program display information sets, and defines each of the redundant program display information sets found by the search as the regular program display information set.

3. The program search device of claim 1, wherein
the regular program indicated by the regular program display information set is broadcast in cycles,
the electronic program guide includes one or more program display information sets each indicating a program broadcast in each of the cycles, and
the search control unit comprises:
a regular program name storing subunit that prestores a regular program name indicating the regular program; and
a regular program obtaining subunit operable to search for a program display information set indicating a program that is broadcast in each cycle and indicated by the regular program name from the detected one or more program display information sets, and obtain the program display information set found by the search as the regular program display information set.

4. The program search device of claim 1, further comprising:
a displaying unit operable to display the special program display information sets and the regular program display information set in different display modes, wherein
the search control unit defines a program display information set indicating a regular program as the regular program display information set, and defines the remaining program display information sets as the special program display information sets.

5. The program search device of claim 4, wherein
the displaying unit prestores a character color and a background color used for displaying the special program display information sets, and
the displaying unit displays the special program display information sets based on the character color and the background color.

6. The program search device of claim 4, wherein
the displaying unit prestores image information sets corresponding to the effective periods respectively, and
the displaying unit (i) obtains dates relating to displaying special program display information sets, (ii) determines effective periods respectively corresponding to the obtained dates, (iii) obtains image information sets respectively corresponding to the determined effective periods, and (iv) displays the special program display information sets in correspondence with the obtained image information sets.

7. The program search device of claim 4, wherein
the displaying unit prestores a character color and a background color used for displaying the regular program display information set, and
the displaying unit displays the regular display information set based on the character color and the background color.

8. The program search device of claim 7, wherein the displaying unit obtains a broadcast frequency of a program represented by the regular program display information set, and displays the regular program display information set and the broadcast frequency in association with each other.

9. The program search device of claim 4, further comprising:

a sort key storing unit that prestores a sort key for sorting the regular program display information set and the special program display information sets; and a result generating unit operable to sort the regular program display information set and the special program display information sets based on the sort key, and generate a result information set comprising the sorted regular program display information set, or each of the sorted special program display information sets, and a number representing an order, for the regular program display information set and each of the special program display information sets, wherein the displaying unit displays, based on the generated result information set, the special program display information sets and the regular program display information set in the different display modes.

10. The program search device of claim 9, wherein the result generating unit generates the result information set such that each of the sorted special program display information sets, or the regular program display information, and the number forms a row in a table.

11. The program search device of claim 9, wherein the result generating unit generates the result information set, comprising each of the sorted special program display information sets, or the regular program display information, and the number representing the order, as a two-dimensional table comprising a first axis indicating channel numbers of broadcast programs and a second axis, orthogonal to the first axis, indicating times.

12. The program search device of claim 4, further comprising:

an emphasis condition storing unit that prestores an emphasis character string, to be displayed with emphasis, together with a corresponding character type of the emphasis character string;

a character string obtaining unit operable to search for a special program display information set comprising the emphasis character string, and obtain a character string to be emphasized that is the same as the emphasis character string from the special program display information set found by the search, if the special program display information set including the emphasis character string is found by the search, wherein each of the special program display information sets comprises a character string indicating a name of a broadcast program, and the displaying unit sets the corresponding character type for the emphasis character string for the character string to be emphasized obtained by the character string obtaining unit, and displays the character string to be emphasized in the corresponding character type.

13. The program search device of claim 12, wherein the keyword storing unit prestores a plurality of extraction keywords and the effective period information sets respectively corresponding thereto, the emphasis character string is an emphasis keyword whose start time of the effective period differs from the current time obtained by the time obtaining unit by a predetermined period or a period shorter than the predetermined period, and the character string obtaining unit searches for a special program display information set including the emphasis keyword, and defines the emphasis keyword included in the obtained special program display information set as the character string to be emphasized, if the special program display information set including the emphasis keyword is found by the search.

14. The program search device of claim 12, wherein the keyword storing unit prestores a plurality of extraction keywords and the effective period information sets respectively corresponding thereto, the emphasis character string is an effective keyword whose effective period information set shows an effective period that includes the current time obtained by the time obtaining unit, and the character string obtaining unit searches for a special program display information set including the effective keyword, and defines the effective keyword included in the obtained special program display information set as the character string to be emphasized, if the special program display information set including the effective keyword is found by the search.

15. The program search device of claim 9, further comprising:

a recommendation rate obtaining unit operable to obtain a recommendation rate for the regular program display information set and each of the special program display information sets, wherein the sort key is the recommendation rate, and the result generating unit sorts the regular program display information set and each of the special program display information sets based on the recommendation rate.

16. The program search device of claim 15, wherein the electronic program guide further comprises attachment information sets respectively corresponding to the program display information sets, and the recommendation rate obtaining unit comprises:

a preference information storing subunit that prestores a preference information set comprising a preference keyword indicating the user's preference and a preference value indicating a weight of the preference keyword, a keyword detecting subunit operable to detect a character string including the preference keyword, based on the regular program display information set, each of the special program display information sets, and the attachment information sets respectively corresponding to the regular program display information set and each of the special program display information sets, and a calculating subunit operable to calculate and obtain the recommendation rate based on the preference value corresponding to the preference keyword included in the character string detected by the keyword detecting unit.

17. The program search device of claim 15, wherein the search result generating unit further prestores a character color and a background color corresponding to each recommendation rate, the search result generating unit sets the character color and the background color corresponding to each recommendation rate as the character color and the background color used for displaying the special program display information sets, and generates the result information sets each comprising each of the sorted special program display information sets and the number representing the order, such that the special program display information sets are displayed using the set character color and the set background color.

18. The program search device of claim 4, wherein the program search device is connected with a terminal device via a network, the displaying unit displays the special program display information sets and the regular program display information set by outputting a display information set to the terminal device, and the display information set is used for displaying the special program information sets and the regular program display information set in the different display modes.

19. The program search device of claim 4, wherein
the program display information set further comprises a new-program information set indicating that a program indicated by the program display information set is a new program, and
the search control unit defines the program display information set, comprising the new-program information set, as the special program display information set, if the extraction keyword is included in the new program information set.

20. An integrated circuit for a program search device that searches for broadcast programs corresponding to a current time from an electronic program guide, the integrated circuit comprising:
a program guide storing unit that prestores an electronic program guide including one or more program display information sets each indicating a broadcast program that is a regular program or a special program;
a keyword storing unit that prestores one or more extraction keywords, which are at least included in a program display information set that shows the special program and are used for detecting at least one program from the electronic program guide, together with an effective period information set, corresponding to each extraction keyword, that indicates an effective period represented by months and dates in which an extraction keyword is available for use in a program search and based on the effective period in the program display information set that shows when the special program will be broadcast;
a time obtaining unit operable to obtain a current time upon receipt of a search start instruction;
a search control unit operable to:
read an extraction keyword corresponding to an effective period information set that shows the effective period that includes the obtained current time from the keyword storing unit, and not to read an extraction keyword corresponding to an effective period information set that shows an effective period that does not include the obtained current time;
detect, from the electronic program guide, one or more program display information sets that include the read extraction keyword; and
extract, from among the detected program display information sets, each of the program display information sets that indicates the regular program, as a regular program display information set, and each of the program display information sets that indicates the special program, as a special program display information set;
an excluding unit operable to exclude the regular program display information set extracted by the search control unit; and
a program name storing unit that prestores a recording-scheduled program name for a recording that has been scheduled by a user, wherein
keywords corresponding to future effective periods remain in the keyword storing unit,
the search control unit further searches for the program display information set indicated by the recording-scheduled program name stored in the program name storing unit within the detected program display information sets, and obtains the found program display information set as a recording-scheduled program display information set, and the excluding unit further excludes the recording-scheduled program display information set obtained by the search control unit.

21. A search method used by a program search device that searches for broadcast programs corresponding to a current time from an electronic program guide,
wherein the program search device comprises:
a program guide storing unit that prestores an electronic program guide including one or more program display information sets each indicating a broadcast program that is a regular program or a special program;
a keyword storing unit that prestores one or more extraction keywords, which are at least included in a program display information set that shows the special program and are used for detecting at least one program from the electronic program guide, together with an effective period information set, corresponding to each extraction keyword, that indicates an effective period represented by months and dates in which an extraction keyword is available for use in a program search and based on the effective period in the program display information set that shows when the special program will be broadcast; and
a program name storing unit that prestores a recording-scheduled program name for a recording that has been scheduled by a user,
wherein the search method comprises:
an obtaining step of obtaining a current time upon receipt of a search start instruction;
a search control step of
reading extraction keywords corresponding to the effective period information set that shows the effective period represented by months and dates that includes the obtained current time, from the keyword storing unit, and not reading any extraction keywords corresponding to a different effective period information set that shows an effective period that does not include the obtained current time,
detecting, from the electronic program guide, one or more program display information sets that include the read extraction keyword, and
extracting, from among the detected program display information sets, each of the program display information sets that indicates the regular program, as a regular program display information set, and each of the program display information sets that indicates the special program, as a special program display information set; and
an excluding step of excluding the regular program display information set extracted by the search control step,
wherein keywords corresponding to future effective periods remain in the keyword storing unit,
the search control step further searches for the program display information set indicated by the recording-scheduled program named stored in the program name storing unit within the detected program display information sets, and obtains the found program display information set as a recording-scheduled program display information set, and
the excluding step further excludes the recording-scheduled program display information set obtained by the search control step.

22. A non-transitory computer-readable recording medium having a search program recorded thereon, the search causing a program search device to search for broadcast programs corresponding to a current time from an electronic program guide,
wherein the program search device comprises:
a program guide storing unit that prestores an electronic program guide including one or more program display information sets each indicating a broadcast program that is a regular program or a special program;
a keyword storing unit that prestores one or more extraction keywords, which are at least included in a program display information set that shows the special program and are used for detecting at least one program from the electronic program guide, together with an effective period information set, corresponding to each extraction keyword, that indicates an effective period represented by months and dates in which an extraction keyword is available for use in a program search and based on the effective period in the program display information set that shows when the special program will be broadcast; and
a program name storing unit that prestores a recording-scheduled program name for a recording that has been scheduled by a user,
wherein the search program causes the program search device to execute a method comprising:
an obtaining step of obtaining a current time upon receipt of a search start instruction;
a search control step of
reading extraction keywords corresponding to the effective period information set that shows the effective period represented by months and dates that includes the obtained current time, from the keyword storing unit, and not reading any extraction keywords corresponding to a different effective period information set that shows an effective period that does not include the obtained current time,
detecting, from the electronic program guide, one or more program display information sets that include the read extraction keyword, and
extracting, from among the detected program display information sets, each of the program display information sets that indicates the regular program, as a regular program display information set, and each of the program display information sets that indicates the special program, as a special program display information set; and
an excluding step of excluding the regular program display information set extracted by the search control step,
wherein keywords corresponding to future effective periods remain in the keyword storing unit,
the search control step further searches for the program display information set indicated by the recording-scheduled program name stored in the program name storing unit within the detected program display information sets, and obtains the found program display information set as a recording-scheduled program display information set, and
the excluding step further excludes the recording-scheduled program display information set obtained by the search control step.

* * * * *